(12) United States Patent
Yeager

(10) Patent No.: US 6,216,200 B1
(45) Date of Patent: *Apr. 10, 2001

(54) ADDRESS QUEUE

(75) Inventor: Kenneth Yeager, Sunnyvale, CA (US)

(73) Assignee: MIPS Technologies, Inc., Mountain View, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/404,625

(22) Filed: Mar. 14, 1995

Related U.S. Application Data

(63) Continuation-in-part of application No. 08/324,129, filed on Oct. 14, 1994, now abandoned.

(51) Int. Cl.[7] ............................................. G06F 9/20
(52) U.S. Cl. ............................ 711/100; 711/3; 711/202; 711/104; 711/118
(58) Field of Search ............................ 395/800, 375, 395/24, 491, 650, 427, 440, 413, 412, 104, 403, 431, 392, 676, 389; 711/3, 5, 4, 202, 203, 150, 100

(56) References Cited

U.S. PATENT DOCUMENTS

| | | | |
|---|---|---|---|
| 4,466,061 | * 8/1984 | DeSantis et al. | 395/650 |
| 5,134,561 | * 7/1992 | Liptay | 395/491 |
| 5,201,057 | * 4/1993 | Uht | 395/800 |
| 5,377,336 | * 12/1994 | Eicknemeyer et al. | 395/375 |
| 5,467,473 | * 11/1995 | Kahle et al. | 395/800 |
| 5,471,593 | * 11/1995 | Branigin | 395/24 |
| 5,488,729 | * 1/1996 | Vegesna et al. | 395/800 |
| 5,511,175 | * 4/1996 | Favor et al. | 395/375 |

OTHER PUBLICATIONS

Cocke, et al., "The Evolution of RISC Technology at IBM," IBM J. Res. Develop., vol. 34, No. 1 p. 4–36 (Jan. 1990).
Grohoski, "Machine Organization of the IBM RISC System/6000 Processor," IBM J. Res. Develop., vol. 34, No. 1 p. 37–58 (Jan., 1990).

* cited by examiner

Primary Examiner—David K. Moore
Assistant Examiner—Than V. Nguyen

(57) ABSTRACT

An address queue in a processor having the capability to track memory-dependencies of memory-access instructions is disclosed. The queue includes a first matrix of RAM cells that tracks a first dependency relationship between a plurality of instructions based upon matching virtual addresses (that identify a common cache set) and the order of instructions in the queue. To facilitate out-of-order instruction execution, dependencies may be tracked before virtual addresses are actually calculated based upon a presumption of dependency. Such dependency is dynamically corrected as addresses become available. The same comparison mechanism used to determine matching virtual addresses for the dependency relationship may also be used to read status bits of a cache set being accessed. The queue also includes a second matrix of RAM cells that tracks a second dependency relationship between a plurality of instructions based upon matching virtual addresses (that identify a common cache set, common doubleword and overlapping byte), the order of instructions in the queue and instruction type. Also disclosed is a method for processing memory instructions that uses a single comparison step between first and second virtual addresses (calculated from instructions) to indicate a dependency relationship between the instructions and to read memory status bits. The status bits are read to determine accessibility of a way within an addressed cache set.

22 Claims, 46 Drawing Sheets

JUMP (AND LINK).
J, JAL

| 31 | 26 25 | 0 |
|---|---|---|
| op | TARGET | |
| 00001x | | |

JUMP REGISTER (AND LINK).
JR, JALR

| 31 | 26 25 | 21 20 | 16 15 | 11 10 | 6 5 | 0 |
|---|---|---|---|---|---|---|
| SPECIAL | rs | 0 | rd | 0 | FUNCTION | |
| 000000 | | | | | 00100x | |

BRANCH — COMPARE TWO REGISTERS.
BEQ, BNE, BLEZ, BGTZ
BEQL, BNEL, BLEZL, BGTZL

| 31 | 26 25 | 21 20 | 16 15 | 0 |
|---|---|---|---|---|
| op | rs | rt | OFFSET | |
| 0x01xx | | | | |

BRANCH ON REGISTER VALUE.
BLTZ, BGEZ, BLTZAL, BGEZAL
BLTZL, BGEZL,

| 31 | 26 25 | 21 20 | 16 15 | 0 |
|---|---|---|---|---|
| REGIMM | rs | FUNCTION | OFFSET | |
| 000001 | | 0x0xx | | |

BRANCH ON FLOATING-PT CONDITION
BCzT, BCzF.
BCzTL, BCzFL

| 31 | 26 25 | 21 20 | 18 | 16 15 | 0 |
|---|---|---|---|---|---|
| COPz | BC | CC | L T | OFFSET | |
| 0100xx | 01000 | | | | |

(FLOATING-POINT CONDITION CODE SELECT CC IS USED ONLY IN MIPS-4 ARCHITECTURE. L='LIKELY'. T='TRUE'.)

LOAD/STORE FROM MEMORY
LB, LBU, LH, LHU,
LW, LWL, LWR, LL
LD, LDL, LDR, LLD
SB, SH, SW, SWL, SWR, SC
SD, SDL, SDR, SCD
oLWCz, SWCz, LDCz, SDCz

| 31 | 26 25 | 21 20 | 16 15 | 0 |
|---|---|---|---|---|
| op | BASE | rt | OFFSET | |

01101x
1xxxxx
DESTINATION

IMMEDIATE OPERAND
ADDI, ADDIU, SLTI, SLTIU,
ANDI, ORI, XORI, LUI
DADDI, DADDIU

| 31 | 26 25 | 21 20 | 16 15 | 0 |
|---|---|---|---|---|
| op | rs | rt | IMMEDIATE | |

001xxx
01100x
DESTINATION

ARITHMETIC (REGISTER-TO-REGISTER)
ADD, ADDU, SUB, SUBU,
DADD, DADDU, DSUB, DSUBU
SLT, SLTU, AND, OR, XOR, NOR

| 31 | 26 25 | 21 20 | 16 15 | 11 10 | 6 5 | 0 |
|---|---|---|---|---|---|---|
| SPECIAL | rs | rt | rd | 0 | FUNCTION | |

000000
DESTINATION
10xxxx

SHIFT
SLL, SRL, SRA,
SLLV, SRLV, SRAV,
DSLLV, DSRLV, DSRAV,
DSLL, DSRL, DSRA, ...32

| 31 | 26 25 | 21 20 | 16 15 | 11 10 | 6 5 | 0 |
|---|---|---|---|---|---|---|
| SPECIAL | rs | rt | rd | sa | FUNCTION | |

000000
DESTINATION
000xxx
0101xx
111xxx

INTEGER MULTIPLY/DIVIDE
MULT, MULTU, DIV, DIVU
DMULT, DMULTU,
DDIV, DDIVU

| 31 | 26 25 | 21 20 | 16 15 | 11 10 | 6 5 | 0 |
|---|---|---|---|---|---|---|
| SPECIAL | rs | rt | 0 | 0 | FUNCTION | |

000000
(DEST=SPECIAL PURPOSE HI AND LO REGISTER PAIR.)
011xxx

FIG.5B

| 31 | 26 25 | 21 20 | 16 15 | 11 10 | 6 5 | 0 |
|---|---|---|---|---|---|---|
| SPECIAL | 0 | 0 | DESTINATION | 0 | FUNCTION | |
| 000000 | | | rd | | 0100x0 | |

MOVE FROM HI/LO
MFHI,MFLO

| 31 | 26 25 | 21 20 | 16 15 | 11 10 | 6 5 | 0 |
|---|---|---|---|---|---|---|
| SPECIAL | rs | 0 | 0 | 0 | FUNCTION | |
| 000000 | (DEST=SPECIAL PURPOSE HI OR LO REGISTER.) | | | | 0100x1 | |

MOVE TO HI/LO
MTHI, MTLO

| 31 | 26 25 | 21 20 | 16 15 | 11 10 | 6 5 | 0 |
|---|---|---|---|---|---|---|
| SPECIAL | rs | rt | 0 | 0 | FUNCTION | |
| 000000 | | | | | 0011xx | |
| | | | | | 110xxx | |

TRAP/SYSTEM CALL
BREAK, SYSCALL, SYNC
TEQ, TNE
TGE, TGEU, TLT, TLTU

| 31 | 26 25 | 21 20 | 16 15 | 0 |
|---|---|---|---|---|
| REGIMM | rs | FUNCTION | IMMEDIATE | |
| 000001 | | 01xxx | | |

TRAP IMMEDIATE
TEQI, TNEI
TGEI, TGEIU, TLTI, TLTIU

| 31 | 26 25 | 21 20 | 16 15 | 11 10 | 6 5 | 0 |
|---|---|---|---|---|---|---|
| COPz | FUNCTION | rt | rd | 0 | 0 | |
| 0100xx | 00xx0 | DEST-INT INT. REG. | DEST-FLT.PT. FLT.PT.REG. | | | |

MOVE TO/FROM COPROCESSOR
MT, MF, CT, CF
(COP0 = CONTROL.)
(COP1 = FLOATING-POINT.)

| 31 | 26 25 | 21 20 | 16 15 | 11 10 | 6 5 | 0 |
|---|---|---|---|---|---|---|
| COPz | fmt | ft | fs | fd | FUNCTION (fa) | |
| 010001 | | | | DESTINATION | | |

FLOATING-POINT
ADD, SUB, MUL, DIV, SQRT.
ABS, MOV, NEG, CVT ...

FIG. 6

DOUBLE-INDEXED LOAD/STORE
LWXCI, LDXCI
SWXCI, SDXCI,
PREFETCH (fs IS 'HINT'.)

| 31 | 26 25 | 21 20 | 16 15 | 11 10 | 6 5 | 0 |
|----|-------|-------|-------|-------|-----|---|
| COPIX | BASE | INDEX | fs | fd | FUNCTION |
| 010011 | | | STORE | LOAD | 00xx00x |
| | | | | DESTINATION | 000111 |

CONDITIONAL MOVE
INTEGER MOVT, MOVF.
INTEGER MOVZ, MOVN.

| 31 | 26 25 | 21 20 | 18 16 15 | 11 10 | 6 5 | 0 |
|----|-------|-------|----------|-------|-----|---|
| SPECIAL | rs | CC 0 T | rd | | FUNCTION |
| 000000 | SOURCE • • • | | DESTINATION rt | | |

FLOATING-POINT MOVT, MOVF.
FLOATING-POINT MOVZ, MOVN.

| 31 | 26 25 | 21 20 | 18 16 15 | 11 10 | 6 5 | 0 |
|----|-------|-------|----------|-------|-----|---|
| COPI | fmt | CC 0 T | fs | fd | FUNCTION |
| 010001 | | SOURCE • • • | | DESTINATION rt | | |

FLOATING-POINT MULTIPLY-ADD
MADD, MSUB,
NMADD, NMSUB.

| 31 | 26 25 | 21 20 | 16 15 | 11 10 | 6 5 | 3 2 0 |
|----|-------|-------|-------|-------|-----|-------|
| COPIX | fr | ft | fs | fd | FUNCT | fmt |
| 010011 | | | | DESTINATION | 1xx00x | |

(FLOATING-POINT RECIPROCAL RECIP AND RECIPROCAL-SQUARE-ROOT RSQRT HAVE FORMATS SIMILAR TO DIVIDE.)

FLOATING-POINT COMPARE
C.COND.

| 31 | 26 25 | 21 20 | 16 15 | 11 10 | 8 7 6 5 | 4 3 0 |
|----|-------|-------|-------|-------|---------|-------|
| COPI | fmt | ft | fs | CC 0 | FUNC | cond |
| 010001 | | | | | | |

(FLOATING-POINT CONDITION CODE SELECT CC IS USED ONLY IN MIPS-4 ARCHITECTURE.)

| INSTRUCTION | OPERAND A (BASE REG.) | OPERAND B (INDEX REG.) (INT.STORE) | OPERAND C (FLT.STORE) | IMMEDIATE (OFFSET) | DESTINATION REGISTER | FUNCTION (MODIFIED) OPCODE INSTR[31:26] FUNCTION INSTR[5:0] SUBFUNCTION INSTR[20:16] |
|---|---|---|---|---|---|---|
| LOAD (LEFT/RIGHT) LPF PREFETCH | V rs | 0 - V rd (OLD) | 0 - 0 rd (OLD) | INSTR [15:6] | D0 NEW rt 0h (HINT) | nnnnnn aaaaaa xxxxx 100x10 aaaaaa xxxxx 111011 aaaaaa xxxxx |
| LOAD FLT.PT. (MIPS-2).2 | V rs | 0 - FLTHI=HIGH HALF | 0 - 1 fd (OLD) | INSTR[15:6] | D0 NEW ft 0h (HINT) | 110n01 aaaaaa xxxxx |
| LOAD INDEX¹ (MIPS-2).2 PFETCH | V rs | V rt FLTHI=HIGH HALF | 0 - 1 fd (OLD) | (UNUSED) | 11 NEW fd 0h (HINT) | 011011 000nnn xxxxx 011011 000111 xxxxx |
| CACHE OP | V rs | 0 - | 0 - | INSTR[15:6] | 00 - | 101111 aaaaaa nnn cc |
| STORE | V rs | V rt | 0 rt | INSTR[15:6] | 00 - | nnnnnn aaaaaa xxxxx |
| STORE COND. | V rs | V rt | 0 rt | INSTR[15:6] | D0 NEW rt | 000n00 aaaaaa xxxxx |
| STORE FLT.PT (MIPS-2).2 | V rs | 0 - FLTHI=HIGH HALF | 1 ft | INSTR[15:6] | 00 - | 111n01 aaaaaa xxxxx |
| STORE INDEX¹ (MIPS-2).2 | V rs | V rt FLTHI=HIGH HALF | 1 fd | (UNUSED) | 00 - | 101111 001nnn xxxxx |

FIG.8

FUNC[6]=0   MAJOR OPCODE   INSTR[31:26]

|   | 0 | 1 | 2 | 3 | 4 | 5 | 6 | 7 |
|---|---|---|---|---|---|---|---|---|
| 0 | SC (op=70) | | | | SC (op=74) | | | |
| 1 | SYNC (op=00 func=57) | | | | | | | |
| 2 | | LWCI (op=61) | (ldr) | COP1X (op=23 NON) (no dest) | | | | |
| 3 | | | | SWC3 (op=23) cop1x | | LDCI (op=65) | | |
| 4 | | | | (COP1X) (op=23 dst) (ldr) | | | | |
| 5 | LB | LH | LWL | LW | LBU | LHU | LWR | LWU |
| 6 | SB | SH | SWL | SW | SDL | SDR | SWR | CACHE |
| 7 | LL | | LDL (op=32) (lwc2) | LDR (op=33) (lpf) | LLD | (ldc1) | (ldc2) | LD |
| 8 | (sc) | SWC1 | SWC2 &LWC2 (op=62) | LPF (op=63) (swc3) | (scd) | SDC1 | SDC2 & LDC2 (op=66) | LD |

FIG.10A

|    | 0 | 1 | 2 | 3 | 4 | 5 | 6 | 7 |
|----|---|---|---|---|---|---|---|---|
|    |   |   |   | FUNC[6:5]=10 | COP1X fnct | INSTR[5:0] |   |   |
| 10 | LWXC1 | LDXC1 | | | | | | PFETCH |
| 11 | SWXC1 | SDXC1 | | | | | | |
| 12 | | | | | | | | |
| 13 | | | | | | | | |
|    |   |   |   | FUNC[6:5]=11 | CACHE op | INSTR[20:16] |   |   |
| 14 | IndexInv IC | IndexInv DC | | IndexInv SC | IndexLdT IC | IndexLdT DC | | IndexLdT SC |
| 15 | IndexStT IC | IndexStT DC | | IndexStT SC | | | | |
| 16 | HitInv IC | HitInv DC | | HitInv SC | | HitWrInv DC | | HitWrInv SC |
| 17 | IndexLdD IC | IndexLdD DC | | IndexLdD SC | IndexStD IC | IndexStD DC | | IndexStD SC |

FIG. 10B

EACH REQUEST IS FOR ONE BANK OF DATA CACHE ONLY:

CYCLE "C0"
1. EXTERNAL INTERFACE (DECODE EXODCmd). (EXOAdr[5] SELECTS EITHER BANK.) "FREELOAD"
2. OLDEST STORE INSTRUCTION, IF GUARANTEED TO GRADUATE.
3. RETRY FROM ADDRESS QUEUE. TAG (& MAYBE DATA).
   DATA ONLY. "JUSTLOAD"

CYCLE "C1"
4. OLDEST STORE INSTRUCTION, IF IT MIGHT GRADUATE.
5. NEW INSTRUCTION FROM ADDRESS CALCULATE. (VAdr[5] SELECTS EITHER BANK.)

LEGEND: CACHE ARRAYS: EACH REQUESTOR ACCESS ONLY ONE BANK OF THE DATA CACHE.

▨ THIS ARRAY OR RESOURCE IS REQUIRED. (EXTERNAL INTERFACE SPECIFIES WHICH ARRAYS IT NEEDS.)
▨ THIS ARRAY OR RESOURCE IS REQUIRED ONLY IN SPECIAL CASES.
☐ THIS ARRAY OR RESOURCE IS NOT USED.

DEPENDENCY CHECKS DURING TAG CHECK CYCLES

| LOCK | | ARRAY STATUS USE | | DEP | | HIT | | CACHE TAGS LRU | STATE | | ACTION LOCK | | USE | | CACHE ACTION | COMMENTS |
|---|---|---|---|---|---|---|---|---|---|---|---|---|---|---|---|---|
| A | B | A | B | D | L | A | B | | A | B | A | B | A | B | | |
| 0 | 0 | 0 | 0 | — | L | 1 | 0 | • | E | — | C | — | — | — | — | FIRST ACCESS TO THIS SET. |
| 0 | 0 | 0 | 0 | — | L | 0 | 1 | — | — | E | — | C | — | — | — | HIT. LOCK INTO SIDE A, UNLESS STORED DEPENDENCY. |
| 0 | 0 | 0 | 0 | — | 0 | 0 | 0 | 0 | A | R | S | — | — | — | REFILL | HIT. LOCK INTO SIDE B, UNLESS STORE DEPENDENCY. |
| 0 | 0 | 0 | 0 | — | 0 | 0 | 0 | — | A | A | S | — | — | — | REFILL | BEGIN REFILL OF CACHE INTO SIDE A. (LRU=0.) |
| 0 | 0 | 0 | 0 | — | 0 | 0 | 0 | 1 | — | A | — | — | — | — | REFILL | (IGNORE LRU BIT IF B IS NOT AVAILABLE.) |
| 0 | 0 | 0 | 0 | — | 1 | 0 | 0 | — | R | R | — | — | — | — | REFILL | BEGIN REFILL OF CACHE INTO SIDE B. (LRU=0.) |
| 0 | 0 | 0 | 0 | — | 1 | 0 | 0 | 0 | R | A | — | — | — | — | WAIT | (IGNORE LRU BIT IF A IS NOT AVAILABLE.) |
| 0 | 0 | 0 | 0 | — | 1 | 0 | 0 | 1 | A | A | — | — | — | — | REFILL | BOTH CACHE BLOCKS ARE BUSY BUT NOT LOCKED. |
| 0 | 0 | 0 | 0 | — | 1 | 0 | 0 | 0 | A | A | — | — | — | — | REFILL | BEGIN REFILL OF CACHE INTO SIDE A. (LRU=0.) |
| 0 | 0 | 0 | 0 | — | — | 0 | 0 | 0 | R | — | — | — | — | — | WAIT | BEGIN REFILL OF CACHE INTO SIDE B. (LRU=1.) |
| 0 | 0 | 0 | 0 | — | — | 0 | 0 | — | — | R | — | — | — | — | WAIT | WAIT IF EITHER SIDE IS BEING REFILLED. |
| | | | | | | | | | | | | | | | | WAIT IF EITHER SIDE IS BEING REFILLED. SECOND ACCESS TO THIS SET (SIDE A). |
| 1 | 0 | 0 | 0 | — | — | 1 | 0 | — | E | — | S | — | — | — | — | (FIRST ACCESS IS HIT ON SIDE A. DUPLICATE FOR SIDE B.) HIT. BLOCK IS ALREADY LOCKED. LOCK INTO SIDE A CHECK FOR STORE-TO-LOAD BYPASS. |
| 1 | 0 | 0 | 0 | 0 | — | 0 | 0 | — | E | A | — | — | — | — | REFILL | MISS. REFILL. SEQUENTIAL USE OF SIDE B. |
| 1 | 0 | 0 | 0 | 0 | — | 0 | 0 | — | E | R | — | — | — | — | WAIT | MISS. OTHER BLOCK IS BUSY REFILLING UNWANTED DATA. |
| 1 | 0 | 0 | 0 | 0 | — | 0 | 1 | — | E | E | — | — | — | S | — | HIT. SEQUENTIAL USE OF SIDE B. |
| 1 | 0 | 0 | 0 | 1 | — | 0 | 0 | — | E | — | — | — | — | S | WAIT | MISS. MUST WAIT FOR DEPENDENCY TO BE REMOVED. |
| 1 | 0 | 1 | 0 | — | — | 0 | 0 | — | E | — | — | — | — | — | WAIT | MISS. SET IS BUSY. WAIT FOR PREVIOUS TO GRADUATE. (DEPENDENT ON SET WHICH SET "USE" BIT.) |

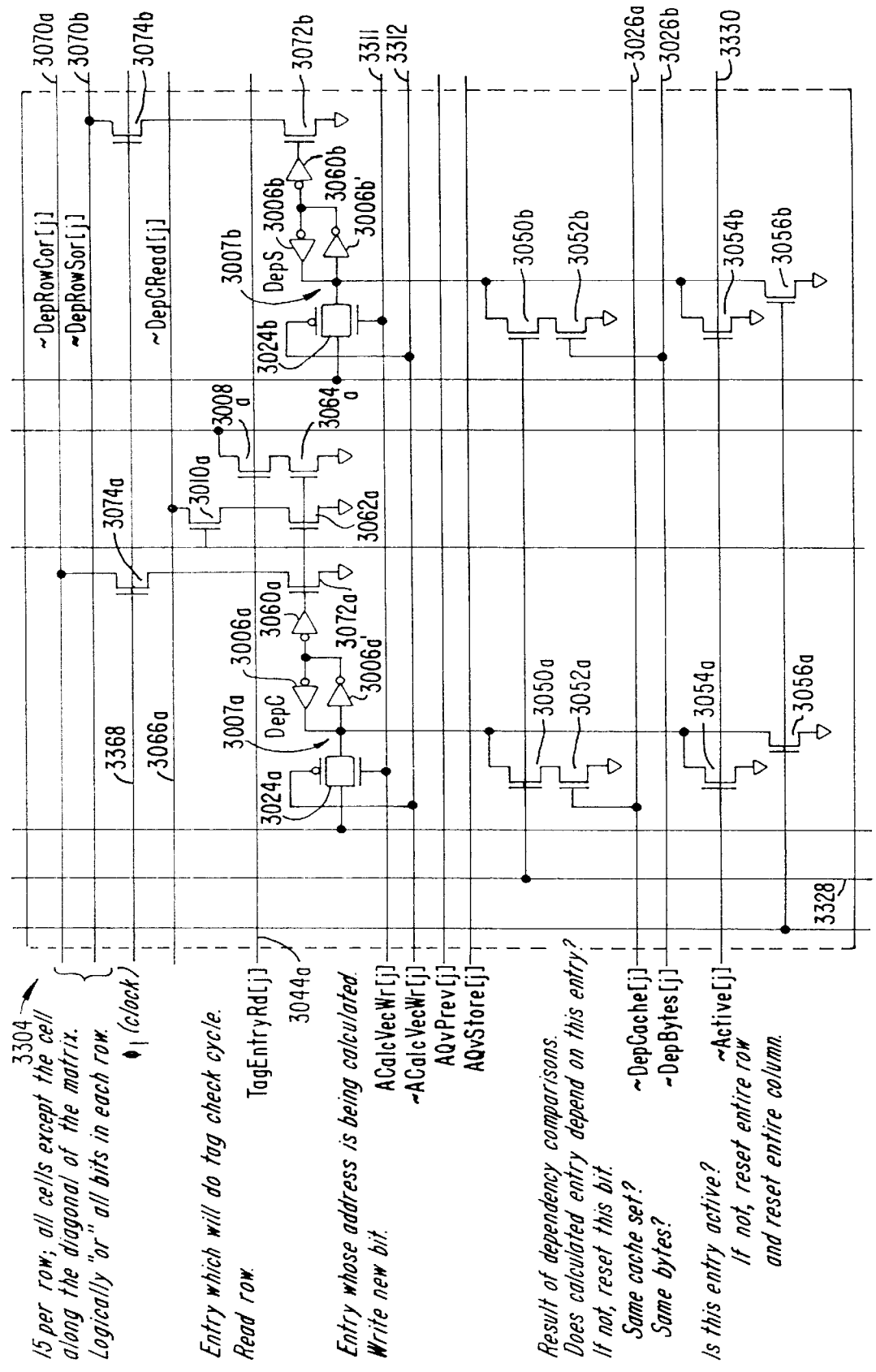
FIG. 33B. Note: Some signal wires pass through a cell to maintain continuity, although the signals are not connected within the cell.

ADDRESS QUEUE

This is a continuation-in-part application of application Ser. No. 08/324,129, filed Oct. 14, 1994, and entitled ADDRESS QUEUE, now abandoned.

A preferred embodiment of the present invention is incorporated in a superscalar processor identified as "R10000," which was developed by Silicon Graphics, Inc., of Mountain View, Calif. Copies of Chapters 11, 12 and 13 of the design notes describing the R10000 are included as an appendix to this application and are hereby incorporated by reference in their entirety for all purposes.

BACKGROUND OF THE INVENTION

This invention relates in general to computers capable of executing instructions out of order and, in particular, to a computer capable of tracking dependencies between out-of-order instructions that are used to access memory.

From the perspective of a programmer, instructions in a conventional processor are executed sequentially. When an instruction loads a new value into its destination register, that new value is immediately available for use by subsequent instructions. This is not true, however, for pipelined computer hardware because some results are not available for many clock cycles. Sequencing becomes more complicated in a superscalar processor, which has multiple execution pipelines running in parallel. But the hardware must behave as if each instruction were completed sequentially.

Each instruction depends on previous instructions which produced its operands, because it cannot begin execution until those operands become valid. These dependencies determine the order in which instructions can be executed. The actual execution order depends on the organization of the processor. In a typical pipelined processor, instructions are executed only in program order. The next sequential instruction may begin execution during the next cycle provided all its operands are valid. Otherwise, the pipeline stalls until the operands become valid. Because instructions execute in order, stalls usually delay all subsequent instructions. A sophisticated compiler can improve performance by re-arranging instructions to reduce the frequency of these stall cycles.

In an in-order superscalar processor, several consecutive instructions may begin execution simultaneously, if all their operands are valid, but the processor stalls at any instruction whose operands are still busy. In an out-of-order superscalar processor, each instruction is eligible to begin execution as soon as its operands become valid, independently of the original instruction sequence. In effect, the hardware re-arranges instructions to keep its execution units busy. This process is called "dynamic issuing."

Dynamic issue and execution of pipelined instructions creates a special need to monitor and resolve data dependencies between instructions. A newly-issued instruction is dependent on a previous instruction if, for example, the newly-issued instruction must use an output of the previous instruction as an operand. Such dependency inserts a restriction on the order of instruction execution.

Similarly, when out-of-order instructions are used in memory-access operations, the execution order of such instructions is restricted, at least in part, by memory dependency (i.e., two instructions accessing and altering the same memory location). Accordingly, there is a need for tracking the memory-dependency of memory-access instructions which may be executed out of order to maintain data integrity.

SUMMARY OF THE INVENTION

The present invention offers a highly efficient apparatus for tracking memory dependencies of memory-access instructions that may be executed out of order. This apparatus also provides for special identification of portions of a memory cache set to prevent unnecessary cache thrashing.

In one embodiment, the present invention provides an address queue for holding a plurality of entries used to access a set-associative data cache. This queue includes a comparator circuit, first matrix of RAM cells and second matrix of RAM cells. The comparator circuit compares a newly calculated partial address derived from a new queue entry with a previously calculated partial address derived from one of a number of previous entries. The first matrix of RAM cells tracks all of the previous entries in the queue that use a cache set that is also used by the new queue entry, The second matrix of RAM cells tracks queue entries that are store instructions which store a portion of data in the data cache which is accessed by a subsequent load instruction. The address queue may also assign status bits to certain blocks stored in the cache to identify the type of access allowed; i.e., random or sequential.

A better understanding of the nature and advantages of the present invention may be had with reference to the detailed description and the drawings below.

BRIEF DESCRIPTION OF THE DRAWINGS

FIG. 4 illustrates format of improved branch instruction formats;

FIGS. 5A and 5B (collectively referred to as "FIG. 5") illustrate instruction set format;

FIG. 6 illustrates new instruction formats in Mips-4 ISA;

FIG. 8 discloses instruction fields sent to the address queue and address stack;

FIGS. 10A and 10B (collectively referred to as "FIG. 10") define the 7-bit operation codes stored in the address queue;

FIG. 12 illustrates priority protocol for using the data cache;

FIG. 26 discloses dependency checks during tag check cycles;

FIGS. 33A and 33B (collectively referred to as "FIG. 33") disclose dependency matrix logic cells where the two matrixes of FIG. 31 are laid out in a single array.

DESCRIPTION OF THE PREFERRED EMBODIMENT

Contents

I. Superscalar Processor Architecture
   A. Superscalar Processor Overview
   B. Operation
   C. Instruction Queues
   D. Coprocessors
   E. Instruction Formats
II. Address Queue
   A. Contents
   B. Address Calculation Sequence
   C. Issuing Instructions to the Data Cache
   D. Retry Accesses
   E. State Changes Within Address Queue
III. Address Stack
IV. Memory Dependency
   A. Memory Dependency Checks
   B. Dependency Logic
   C. Dependency Logic—Alternative Embodiment
   D. Uncached Memory Dependency

I. SUPERSCALAR PROCESSOR ARCHITECTURE

In the following discussion, the same signal may be identified with and without a letter suffix (i.e., "AQvStore [j]" and "AQvStore" can refer to the same signal). The suffix expressly identifies one of many signals bearing the same name. The same signal name without a letter suffix implicitly identifies one of many signals bearing the same name.

Figure 1:
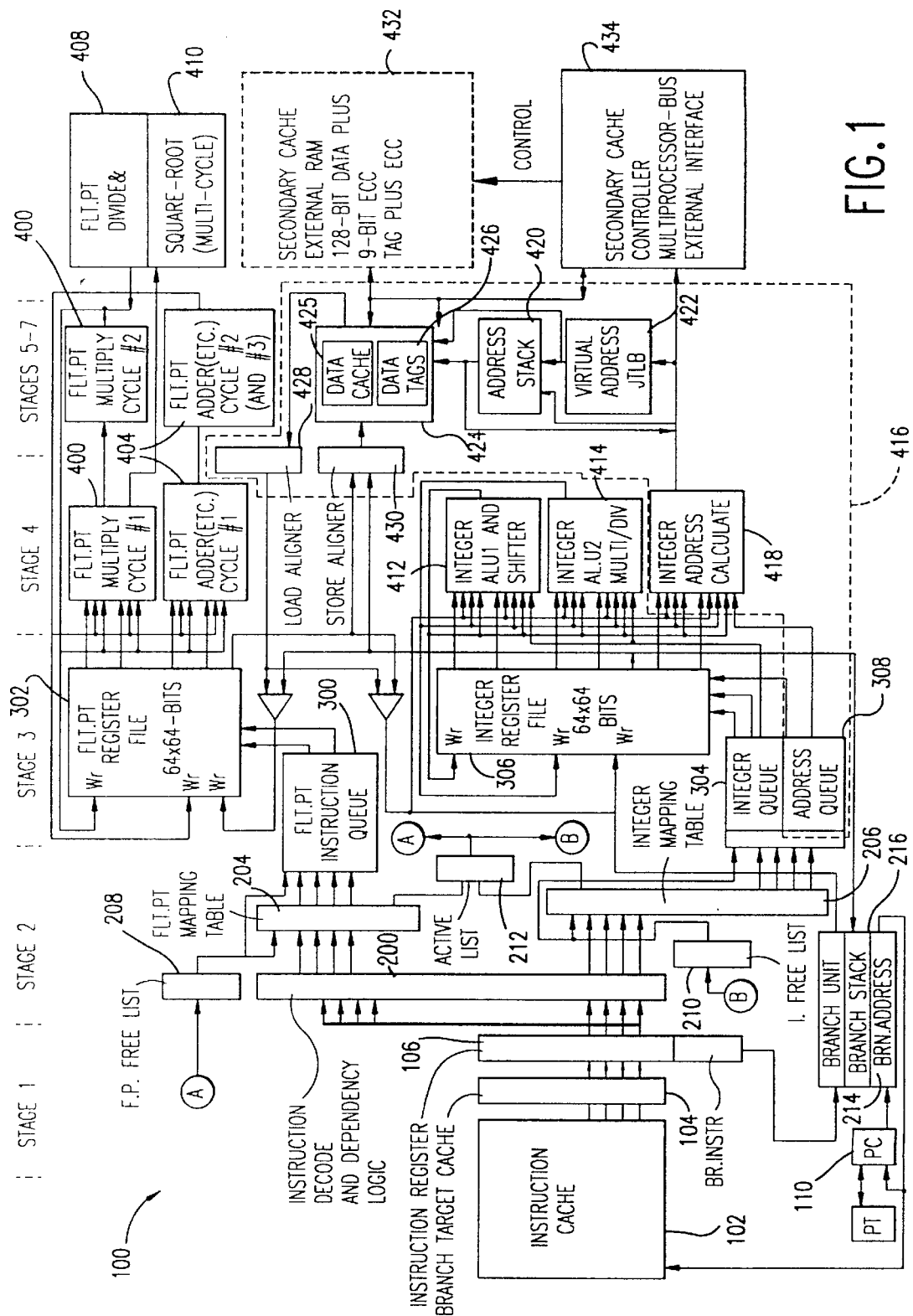
FIG. 1 discloses a functional block diagram of a superscalar processor.

FIG. 1 discloses a functional block diagram of a superscalar processor 100 which incorporates an address queue built and operating in accordance with the present invention. As discussed below, this address queue enables, among other things, the tracking of memory dependencies in a processor that provides for out-of-order execution of instructions. Processor 100, which generally represents the R10000 Super-Scalar Processor developed by Silicon Graphics, Inc., of Mountain View, Calif., provides only one example of an application for the address queue of the present invention. This processor is described in J. Heinrich, *MIPS R10000 Microprocessor User's Manual*, MIPS Technologies, Inc., (1994), which is hereby incorporated by reference in its entirety for all purposes.

A. Superscalar Processor Overview

A superscalar processor can fetch and execute more than one instruction in parallel. Processor 100 fetches and decodes four instructions per cycle. Each decoded instruction is appended to one of three instruction queues. These queues can issue one new instruction per cycle to each of five execution pipelines.

The block diagram of FIG. 1 is arranged to show the stages of an instruction pipeline and illustrates functional interconnectivity between various processor elements. Generally, instruction fetch and decode are carried out in stages 1 and 2; instructions are issued from various queues in stage 3; and instruction execution is performed in stages 4–7.

Referring to FIG. 1, a primary instruction cache 102 reads four consecutive instructions per cycle, beginning on any word boundary within a cache block. A branch target cache 104, instruction register 106 and instruction decode and dependency logic 200, convey portions of issued instructions to floating point mapping table 204 (32 word by 6 bit RAM) or integer mapping table 206 (33 word by 6 bit RAM). These tables carry out a "register renaming" operation, which renames logical registers identified in an instruction with a physical register location for holding values during instruction execution. A redundant mapping mechanism is built into these tables to facilitate efficient recovery from branch mispredictions. The architecture and operation of mapping tables 204, 206 and the associated redundant mapping mechanism is described in detail in commonly-owned, co-pending patent application Ser. No. 08/324,127, which is hereby incorporated by reference in its entirety for all purposes.

Mapping tables 204 and 206 also receive input from a floating point free list 208 (32 word by 6 bit RAM) and an integer free list 210 (32 word by 6 bit RAM), respectively. Output of both mapping tables is fed to active list 212 which, in turn, feeds the inputs of free lists 208 and 210.

A branch unit 214 also receives information from instruction register 106, as shown in FIG. 1. This unit processes no more than one branch per cycle. The branch unit includes a branch stack 216 which contains one entry for each conditional branch. Processor 100 can execute a conditional branch speculatively by predicting the most likely path and decoding instructions along that path. The prediction is verified when the condition becomes known. If the correct path was taken, processing continues along that path. Otherwise, the decision must be reversed, all speculatively decoded instructions must be aborted, and the program counter and mapping hardware must be restored.

Referring again to FIG. 1, mapping tables 204 and 206 support three general pipelines, which incorporate five execution units. A floating-point pipeline is coupled to floating-point mapping table 204. The floating-point pipeline includes a sixteen-entry instruction queue 300 which communicates with a sixty-four-location floating point register file 302. Register file 302 and instruction queue 300 feed parallel multiply unit 400 and adder 404 (which performs, among other things, comparison operations to confirm floating-point branch predictions). Multiply unit 400 also provides input to a divide unit 408 and square root unit 410.

Second, an integer pipeline is coupled to integer mapping table 206. The integer pipeline includes a sixteen-entry integer instruction queue 304 which communicates with a sixty-four-location integer register file 306. Register file 306 and instruction queue 304 feed two arithmetic logic units ("ALU"); ALU#1 412 (which contains an ALU, shifter and integer branch comparator) and ALU#2 414 (which contains an ALU, integer multiplier and divider).

Third, a load/store pipeline (or load/store unit) 416 is coupled to integer mapping table 206. This pipeline includes a sixteen-entry address queue 308 which communicates with register file 306. Address queue 308 is built and operates in accordance with the present invention.

Register file 306 and address queue 308 feed integer address calculate unit 418 which, in turn, provides virtual-address index entries for address stack 420. These virtual addresses are converted to physical addresses in translation lookaside buffer (TLB) 422, and used to access a data cache 424 that holds data 425 and tags 426. These physical addresses are also stored in address stack 420. The architecture of TLB 422 is described in detail in commonly-owned, co-pending patent application, Ser. No. 08/324,128, now abandoned, which is hereby incorporated by reference in its entirety for all purposes.

Data input to and output from data cache 424 pass through store aligner 430 and load aligner 428, respectively. Data cache 424 and surrounding architecture is described in detail in commonly-owned, co-pending patent application, Ser. No. 08/324,124, now abandoned which is hereby incorporated by reference in its entirety for all purposes.

Address stack 420 and data cache 424 also communicate with secondary cache controller and external interface 434. Further, data cache 424 and controller-interface 434 communicate with secondary cache 432. External interface 434 sends a 4-bit command (DCmd[3:0]) to data cache 424 and address queue 308 (connection not shown) to indicate what operation the cache will perform for it. Address queue 308 derives signals which control reading and writing from data cache 424.

B. Operation

Processor 100 uses multiple execution pipelines to overlap instruction execution in five functional units. As described above, these units include the two integer ALUs 412, 414, load/store unit 416, floating-point adder 404 and floating-point multiplier 400. Each associated pipeline includes stages for issuing instructions, reading register operands, executing instructions, and storing results. There are also three "iterative" units (i.e., ALU#2 414, floating-point divide unit 408 and floating-point square root unit 410) which compute more complex results.

Register files 302 and 306 must have multiple read and write ports to keep the functional units of processor 100 busy. Integer register file 306 has seven read and three write ports; floating-point register file 302 has five read and three write ports. The integer and floating-point execution units each use two dedicated operand ports and one dedicated result port in the appropriate register file. Load/store unit 416 uses two dedicated integer operand ports for address calculation. It must also load or store either integer or floating-point values, sharing a result port and a read port in both register files. These shared ports are also used to move data between the integer and floating-point register files, and for "Jump and Link" and "Jump Register" instructions.

In a pipeline, the execution of each instruction is divided into a sequence of simpler operations. Each operation is performed by a separate hardware section called a stage. Each stage passes its result to the next stage. Usually, each instruction requires only a single cycle in each stage, and each stage can begin a new instruction while previous instructions are being completed by later stages. Thus, a new instruction can often begin during every cycle.

Pipelines greatly improve the rate at which instructions can be executed. However, the efficient use of a pipeline requires that several instructions be executed in parallel. The result of each instruction is not available for several cycles after that instruction entered the pipeline. Thus, new instructions must not depend on the results of instructions which are still in the pipeline.

Processor 100 fetches and decodes instructions in their original program order, but may execute and complete these instructions out of order. Once completed, instructions are "graduated" in their original program order. Instruction fetching is carried out by reading instructions from instruction cache 102, shown in FIG. 1. Instruction decode operation includes dependency checks and register renaming, performed by instruction decode and dependency logic 200 and mapping tables 204 or 206, respectively. The execution units identified above compute an arithmetic result from the operands of an instruction. Execution is complete when a result has been computed and stored in a temporary register identified by register file 302 or 306. Finally, graduation commits this temporary result as a new permanent value.

An instruction can graduate only after it and all previous instructions have been successfully completed. Until an instruction has graduated, it can be aborted, and all previous register and memory values can be restored to a precise state following any exception. This state is restored by "unnaming" the temporary physical registers assigned to subsequent instructions. Registers are unnamed by writing an old destination register into the associated mapping table and returning a new destination register to the free list. Renaming is done in reverse program order, in the event a logical register was used more than once. After renaming, register files 302 and 306 contain only the permanent values which were created by instructions prior to the exception. Once an instruction has graduated, however, all previous values are lost.

Active list 212 is a list of "active" instructions in program order. It records status, such as which instructions have been completed or have detected exceptions. Instructions are appended to its bottom when they are decoded. Completed instructions are removed from its top when they graduate.

C. Instruction Queues

Figure 2:
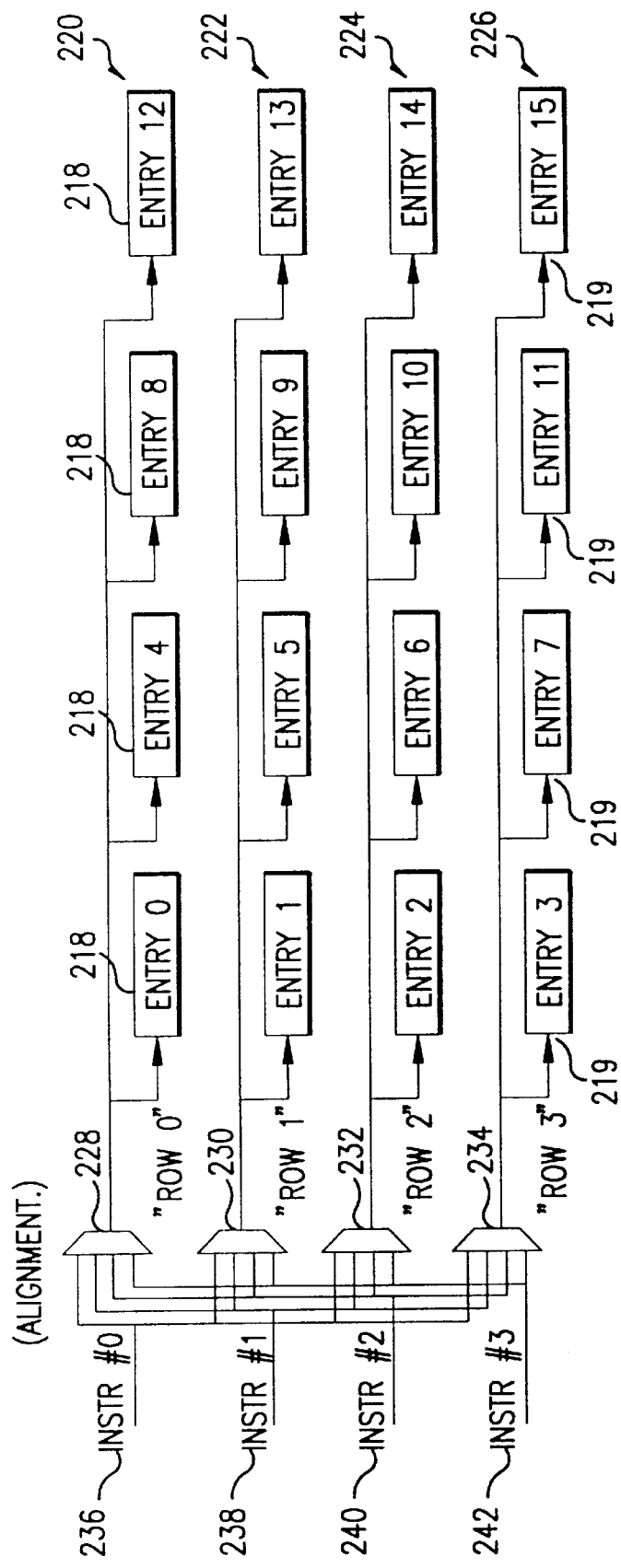
FIG. 2 discloses rows in the address queue disclosed herein.
Figure 3:
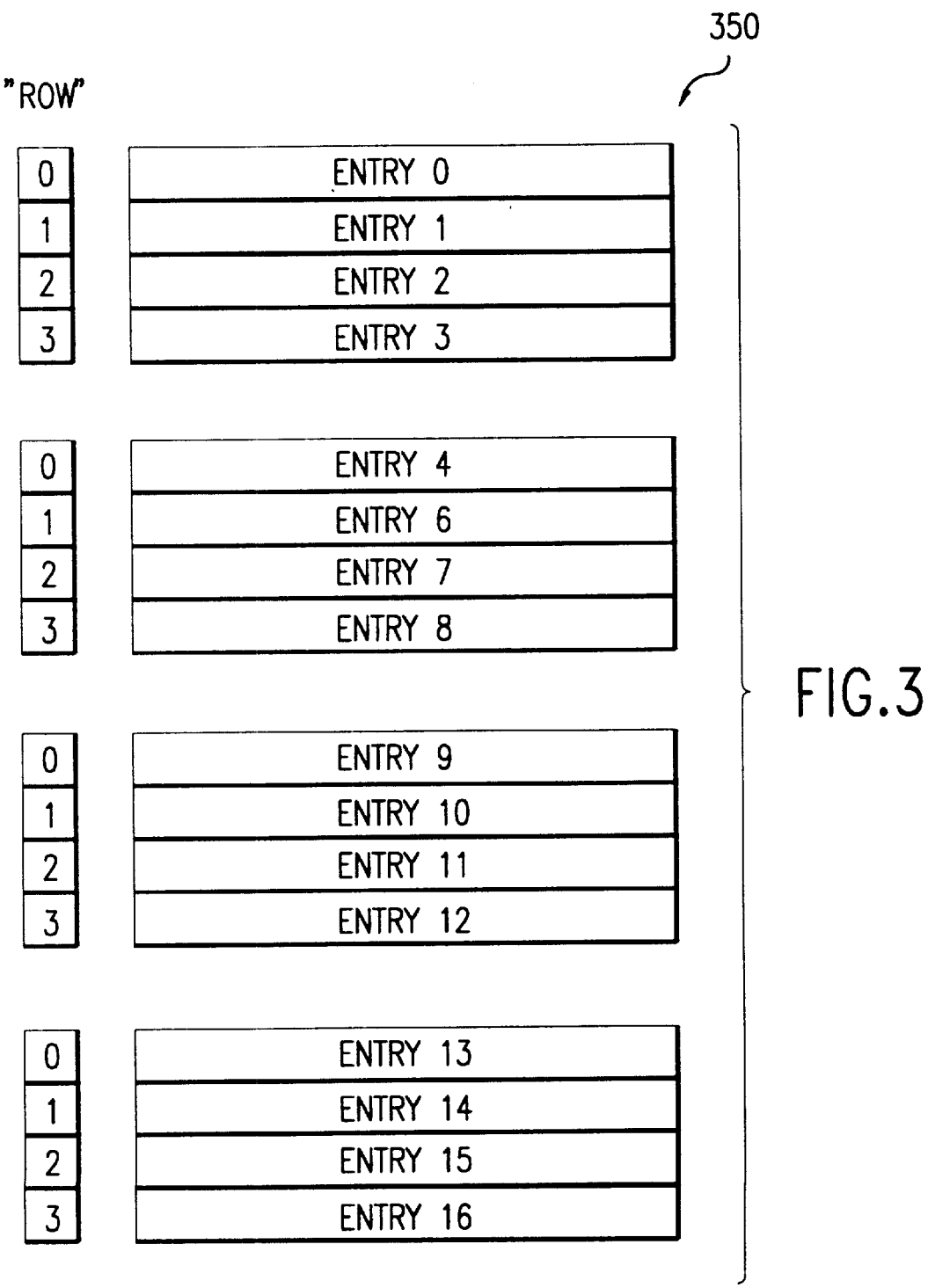
FIG. 3 discloses physical layout of address queue.

Processor 100 keeps decoded instructions in three instruction queues. These queues dynamically issue instructions to the execution units. Referring to FIG. 2, the entries in each queue are logically arranged in four rows (i.e., rows 220–226) of four entries 218, as shown in FIG. 2. (This "row" and "column" terminology is figurative only; the physical layout has one column of sixteen entries 350, as shown in FIG. 3.) While an instruction queue has four write ports 236–242, each queue entry 218 has only a single write port 219. Entries within each row share the same queue write port, but each row has a separate port. These inputs are fed from four four-to-one multiplexers 228–234 (MUXes) which can select any of the four instructions currently being decoded. These MUXes align new instructions with an empty entry. A new instruction can be written into each row if it has at least one empty entry.

1. Integer Queue

Integer queue 304, as shown in FIG. 1, issues instructions to two integer arithmetic units: ALU#1 412 and ALU#2 414. This queue contains 16 instruction entries. Newly decoded integer instructions are written into empty entries without any particular order. Up to four instructions may be written during each cycle. Instructions remain in this queue only until they have been issued to an ALU. Branch and shift instructions can be issued only to ALU#1 412. Integer multiply and divide instructions can be issued only to ALU#2 414. Other integer instructions can be issued to either ALU.

The Integer Queue controls six dedicated ports to integer register file 306. These include two operand read ports and a destination write port for each ALU.

2. Floating Point Queue

Floating-point queue 300, as shown in FIG. 1, issues instructions to floating-point multiplier 400 and floating-point adder 404. This queue contains 16 instruction entries. Newly decoded floating-point instructions are written into empty entries without any particular order. Up to four instructions may be written during each cycle. Instructions remain in this queue only until they have been issued to a floating-point execution unit.

The Floating-point queue controls six dedicated ports to floating-point register file 302. These include two operand read ports and a destination port for each execution unit. Queue 300 uses the issue port of multiplier 400 to issue instructions to square-root unit 410 and divide unit 408. These instructions also share the register ports of multiplier 400.

Further, Floating-Point queue 300 contains simple sequencing logic for multi-pass instructions, such as Multiply-Add. These instructions require one pass through multiplier 400 and then one pass through the adder 404.

3. Address Queue

Address queue 308, as shown in FIG. 1, issues instructions within load/store unit 416. It contains 16 instruction entries. Unlike the other two queues, address queue 308 is organized as a circular First-In-First-Out ("FIFO") buffer. Newly decoded load/store instructions are written into the next sequential empty entries. Up to four instructions may be written during each cycle. The FIFO order maintains the program's original instruction sequence so that memory address dependencies may be computed easily. Instructions remain in this queue until they have graduated. They cannot be deleted immediately after being issued, because load/store unit 416 may not be able to immediately complete the operation.

Address queue 308 contains more complex control logic than the other queues. An issued instruction may fail to complete, because of a memory dependency, a cache miss, or a resource conflict. In these cases, the queue must re-issue the instruction until it has graduated.

Address queue 308 has three issue ports; issue, access and store. The first two are dynamic (i.e., may issue instructions out of order) while the third issues instructions in order. First, address queue 308 issues each instruction once to address calculation unit 418. This unit uses a 2-stage pipeline to compute the memory address of an instruction and translate it in Translation Look-aside Buffer 422 ("TLB"). Addresses are stored in address stack 420 and in the dependency logic of the queue, as discussed below. This port controls two dedicated read ports to integer register file 306. This logic is similar to the other queues. Issue port may use tag check circuitry (discussed below) if it is not used by the access port.

Second, address queue 308 can issue "accesses" to data cache 424. The queue allocates usage of four sections of the cache, which consist of tag and data sections of the two cache banks. Load and store instructions begin with a tag check cycle, which checks if the desired address is already in cache. Load instructions also read and align a doubleword value from the data array. This access may be concurrent or later than the tag check. If the data is present and no dependencies exist, the instruction is marked "done" in the queue.

Third, address queue 308 can issue "store" instructions to the data cache. A store instruction may not modify the data cache until it graduates. Only one store can graduate per cycle, but it may be anywhere within the four oldest instructions, if all previous instructions are already "done".

The "Access" and "Store" ports share two integer and two floating-point register file ports. These "shared" ports are also used for "Jump and Link" and "Jump Register" instructions and for move instructions between the integer and register files.

D. Coprocessors

Processor 100 can operate with up to four tightly-coupled coprocessors (designated CP0 through CP3). Coprocessor unit number zero (CP0) supports the virtual memory system together with exception handling. Coprocessor unit number one CP1 (and unit three (CP3) in Mips-4 Instruction Set Architecture, discussed below) is reserve for floating-point operations.

E. Instruction Formats

Processor 100 implements the Mips-4 Instruction Set Architecture ("ISA") and is compatible with earlier Mips-1, Mips-2 and Mips-3 ISAs. The formats of these instructions are summarized in FIGS. 4–6. FIG. 4 shows jump and branch instruction formats. The "Branch on Floating-Point Condition" (CP1) instruction was enhanced in Mips-4 ISA to include eight condition code bits, instead of the single bit in the original instruction set. In Mips-3 or earlier ISA, the three-bit condition code select field ("CC") must be zero. FIG. 5 shows other formats in the Mips-3 and earlier ISAs. A discussion of Mips ISAs is provided in J. Heinrich, *MIPS R4000 User's Manual*, PTR Prentice Hall (1993) and G. Kane et al., *MIPS RISC Architecture*, Prentice Hall (1992), both hereby incorporated by reference in their entirety for all purposes. A description of Mips-4 ISA is provided in C. Price, *MIPS R10000—Mips IV ISA Manual*, MIPS Technologies, Inc. (1994), which is also hereby incorporated by reference in its entirety for all purposes.

The extensions for the MIPS-4 ISA are shown in FIG. 6. These new instructions facilitate floating-point and vector programs. These include floating-point multiply-add, double-indexed load and store floating-point, and conditional move instructions. The floating-point compare instruction has been modified to set any of eight condition bits.

II. ADDRESS QUEUE

Figure 7A:
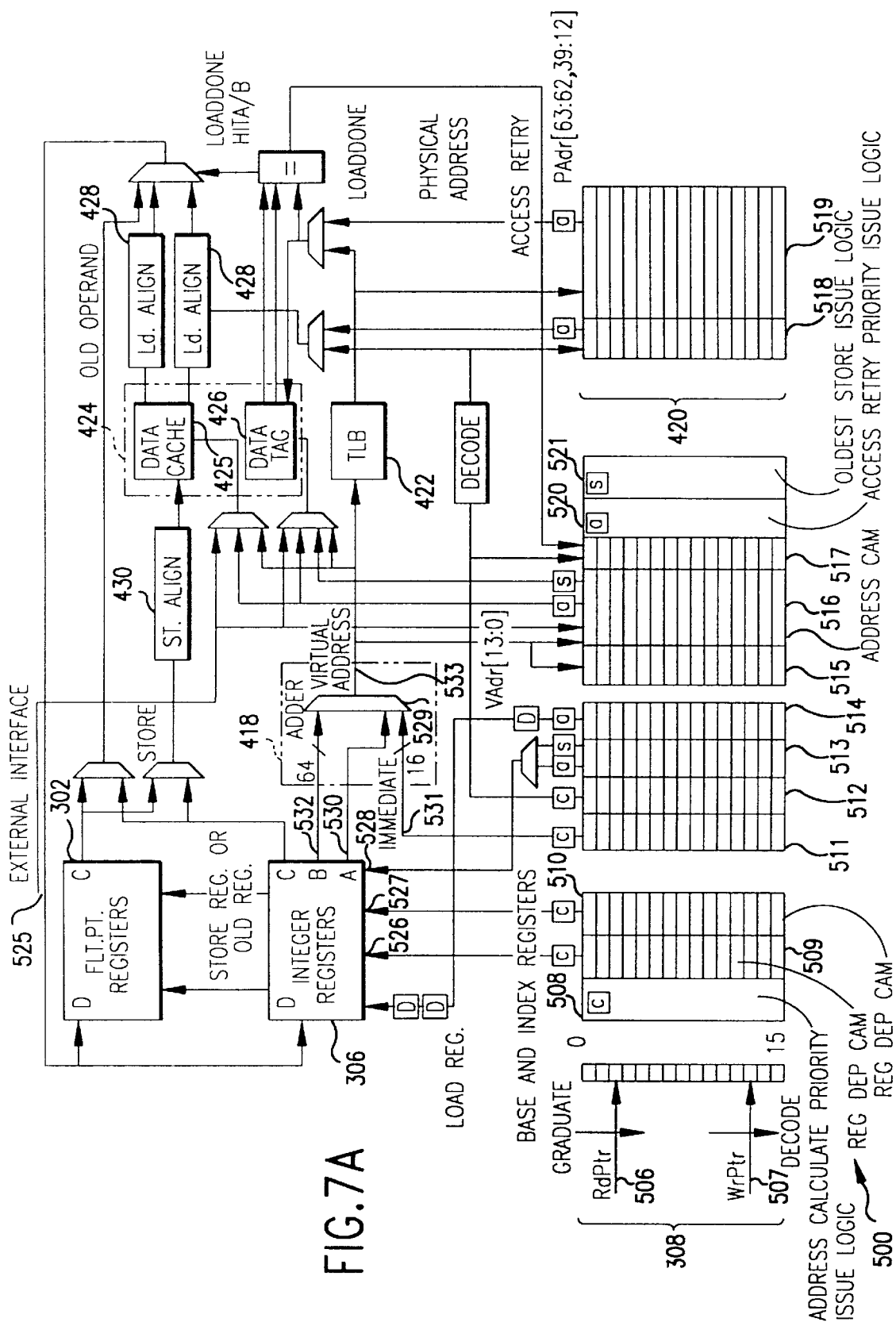
FIGS. 7A and 7B (collectively referred to as "FIG. 7") disclose connection of the address queue.
Figure 7B:
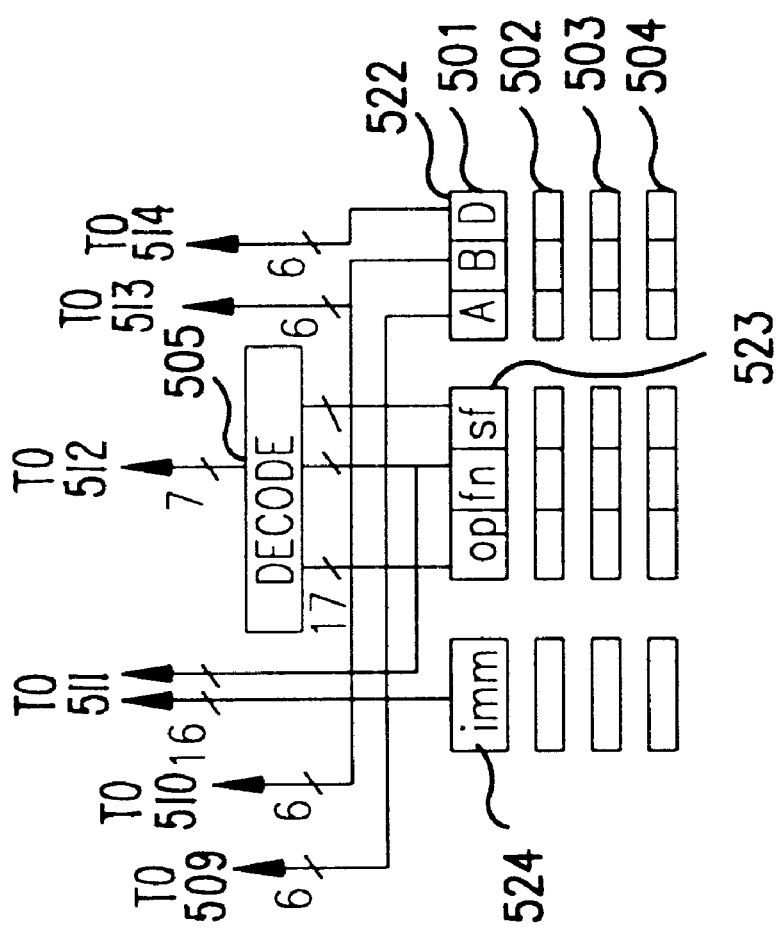

Address Queue 308 keeps track of all memory instructions in the pipeline. As noted above, it contains 16 entries, which are organized as a circular FIFO buffer or list 500, as indicated in FIG. 7. When a memory load or store instruction is decoded, it is allocated to the next sequential entry at the "bottom" of list 500, which includes list segments 509–514. Any or all of the four instructions (i.e., 501–504) decoded during a cycle may be loads or stores, so up to four instructions may be appended to address queue 308 in one cycle.

FIG. 7 shows the loading of an instruction containing portions 522–524 to list 500. Portion 522 contains mapped physical register numbers for operands A and B and destination D, which are appended to "A" segment 509, "B" segment 510 and "D" segment 514, respectively. Operand B is also appended to "C" segment 513 (see Table 1). Further, instruction portion 523 contains opcode ("op"), function ("fn") and subfunction ("sf") values which are decoded in decode logic 505 and appended to "function" segment 512. Finally, instruction portion 522 contains an "immediate" value (described below) which is appended to "immediate" segment 511 along with a portion of the "fn" value from portion 523.

Remaining portions of list 500 include "dependency" segment 515, "index" segment 516 and "state" segment 517. Also shown is address stack 420 which includes "control" segment 518 and "physical address" segment 519. Blocks 508, 520 and 521 represent issue logic which is described below.

The instruction fields sent to the address queue and address stack are summarized in FIG. 8. Symbols and footnotes used in this figure are defined below:

"1": Indexed address calculations add two 64-bit registers (base+index) to form an address. All other address calculations add a 16-bit signed offset to a 64-bit base register. Indexed calculations are used only for floating-point loads and stores.

"2": In Mips-1 and Mips-2 ISA, load and store instructions access either the low (even-numbered logical register) or high half (odd) of one of 16 double-precision registers. The low bit of the logical register number is stored in AQvFltHi in the Address Queue. For load instructions, the operand word must be merged with the other half of the old destination register.

"D": This bit is set unless the integer destination register is zero, which indicates no destination.

"V": This bit is set if there is a valid operand register (excluding integer register #0, which has a zero value).

"aaaaaa": The function field (instruction bits 5:0) is part of the immediate field (instruction bits 15:0).

"h": Prefetch instructions (LPF and PFETCH) contain a 5-bit "hint" field.

"-": These fields are not used. Their content is not specified.

Figure 9:
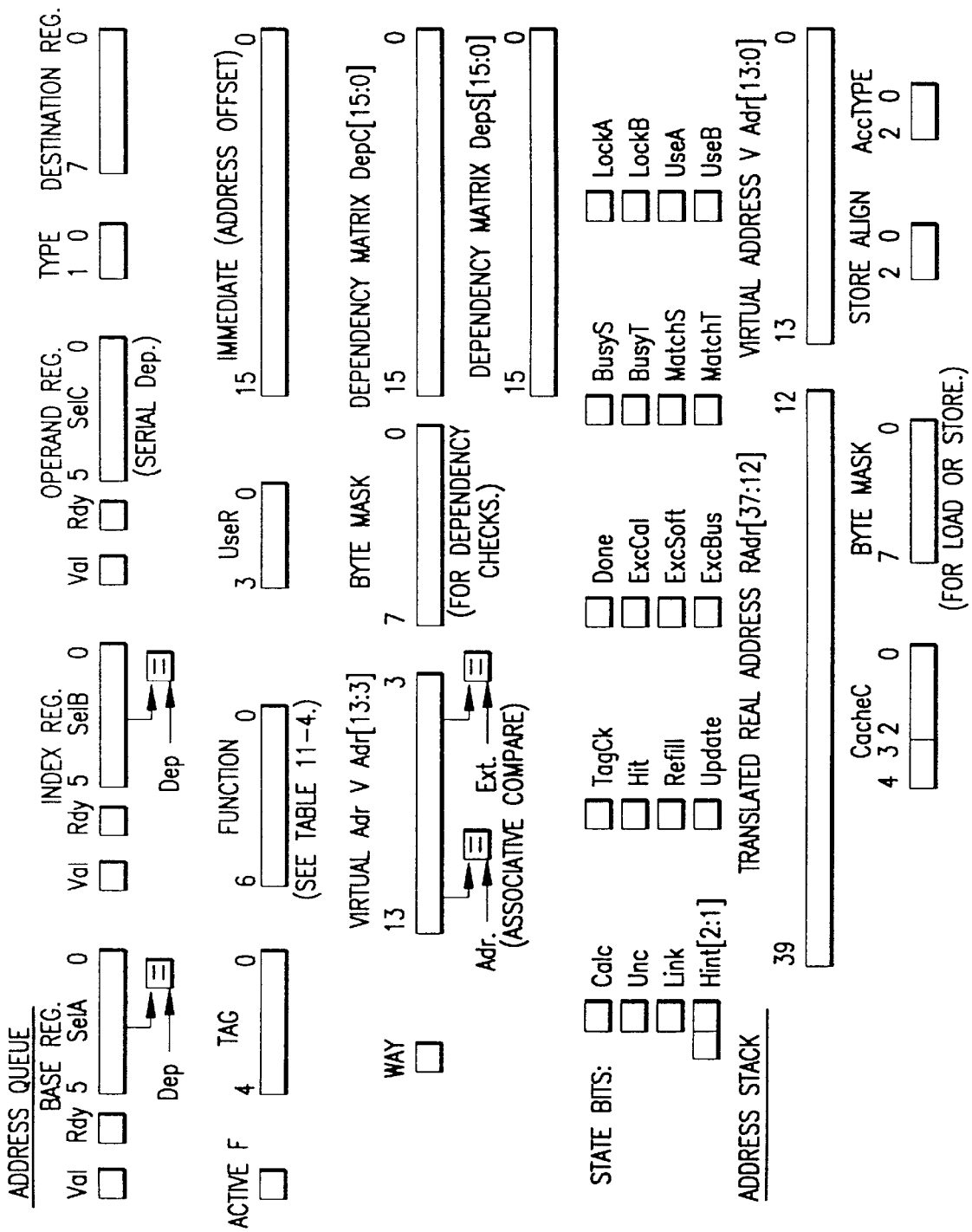
FIG. 9 discloses address queue and address stack contents.

Instructions are deleted from the "top" of list 500 when they graduate. Up to four instructions can graduate per cycle, but only one of these can be a "store". Instructions may also be deleted from the bottom when a speculative branch is reversed and all instructions following the branch are aborted. The queue is cleared when an exception is taken. Various address queue contents are summarized in FIG. 9.

The FIFO uses two 5-bit pointers 506 and 507, shown in FIG. 7. The low four bits select one of the 16 entries. The high bit detects when the bottom of the queue has "wrapped" back to the top. "Write" pointer 507 selects the next empty entry. "Read" pointer 506 selects the oldest entry, which will be the next to graduate. The write pointer is copied onto branch stack 216 (FIG. 1) in one of four "shadow" pointers whenever a speculative branch is taken. It is restored from the corresponding shadow if the branch decision is reversed.

Because of layout restrictions, address queue 308 is physically implemented in two sections. The "address queue" section (i.e., segments and blocks 508–517, 520 and 521), which is located between instruction decode 200 and integer register file 306, contains most of the control logic. It contains the base and index register fields, and address offset field, and it issues instructions to address calculation unit 418. It also issues load and store instructions to data cache 424 and resolves memory dependencies. The address stack section (i.e., segments 518, 519), which is located near TLB 422, contains the translated physical address.

The Address Queue has three issue ports. The "Calculate" port issues each instruction once to address calculation unit 418, TLB 422, and (if available) to data cache 424. The "Access" port is used to retry instructions. The "Store" port is used to graduate store instructions.

A. Contents

Address queue 308 contains "Load" and "Store" instructions, which access data cache 424 and main memory. It also contains "Cache" instructions, which manipulate any of the caches. This queue also controls address calculation circuit 418. For "Indexed" instructions, it provides two physical register operands via integer register file 306. For other load or store instructions, it provides one register operand and a 16-bit immediate value.

The fields within each address queue entry are listed in tables 1–3. Table 1 lists instruction fields, which contain bits that are loaded into segments 509–514 (FIG. 7) after an instruction is decoded.

TABLE 1

Address Queue Instruction Fields

| Field (AQv- ) | Description |
| --- | --- |
| ActiveF | Indicates entry is active. This signal is decoded from queue pointers 506 and 507, and then delayed one cycle in a register. This signal enables stack retry requests. (1 bit.) |
| Tag | Active List tag uniquely identifies an instruction within the pipeline. (5 bits.) |
| Func | Instruction opcode and function. Address queue 308 receives a 17-bit function code from decode logic 200. It condenses this to a 7-bit code. |
| 0nnnnnn | 6-bit major opcode (modified during instruction predecode), or |
| 10nnnnn | 6-bit function code from COP1X opcode. (AQ gets codes #00–#37 octal only.) |
| 11 fff cc | 5-bit subfunction code for CACHE operations (3-bit function, 2-bit cache select.) |
| Imm | The immediate field contains the address offset from instruction bits. During decode, the high 10 bits are from instruction portion 524 and the low 6 bits are from portion 523 (Fig. 7). (16 bits.) Base Register: |
| OpSelA | Operand A, select physical register # in integer register file 306. (6 bits.) |
| OpRdyA | Operand A is ready for address calculation. (1 bit.) |
| OpValA | Operand A is valid for address calculation. (Integer register # is not zero; 1 bit.) Index Register or Integer Operand: |
| OpSelB | Operand B, select physical register # in integer register file 306. (For integer stores, this value is duplicated in AQvOpSelC; 6 bits.) |
| OpRdyB | Operand B is ready. (1 bit.) |
| OpValB | Operand B is valid. (Integer register # is not zero; 1 bit.) Floating-point Operand: |
| OpSelC | Operand C, select physical register # in flt. pt. register file 302. (For integer stores, this field contains a copy of AQvOpSelB; 6 bits.) |
| OpRdyC | Operand C is ready. (1 bit.) |
| OpValC | Operand C is Valid. (1 bit.) |

TABLE 1-continued

Address Queue Instruction Fields

| Field (AQv- ) | Description |
|---|---|
| Dest | Destination, select physical register #. (6 bits.) |
| DType | Destination type (or hint; 2 bits): 00 = No destination register. (If prefetch instruction, hint = "shared".) 01 = No destination register. (If prefetch instruction, hint = "exclusive".) 10 = Integer destination register. 11 = Floating-point destination register. |
| UseR | Which ports of the shared register files are required to execute this instruction (4 bits)? Bit 3: Flt.pt. Write. Bit 2: Flt.pt. Read. Bit 1: Integer Write. Bit 0: Integer Read. |
| Store | This instruction is a store. (1 bit.) |
| Flt | This instruction loads or stores a floating-point register. (1 bit.) |
| FltHi | Load or store high half of floating-point register (if FR=0; 1 bit). |

With respect to the AQvFunc entry listed in Table 1, a "predecode" operation partially decodes an instruction as it is written into instruction cache 102 during a refill operation (i.e., refilling cache 102 in the event of a miss). This step re-arranges fields within each instruction to facilitate later decoding. In particular, the register select fields are arranged for convenient mapping and dependency checking. The destination and source register fields are put into fixed locations, so they can be used directly as inputs to mapping tables 204 and 206 (FIG. 1), without further decoding or multiplexing.

Table 2 below lists address and dependency bits, which are loaded from address calculation unit 418 and held in segments 515 and 516, respectively, as shown in FIG. 7. The dependency bits are updated continuously as previous instructions graduate and other instructions are calculated.

TABLE 2

Address Queue Dependency Bits

| Field (AQv- ) | Description |
|---|---|
| Index [13:3] | Primary cache index address. Bits [13:5] select a set within the primary data cache. Set contains two 8-word blocks. Bit [5] selects either Bank 0 (if 0) or Bank 1 (if 1) of the primary data cache. Bit [4:3] select a doubleword within an 8-word cache block. (Bits [2:0] are decoded into an 8-bit byte mask, which is stored in AQvBytes). |
| Bytes | 8-bit mask of bytes used with the addressed doubleword. (Approximate) A byte mask is used to determine if dependencies exist between load and store instructions which access the same double word in the cache. For simplicity, load or store "left/right" instructions are assumed to use the entire word. This may cause spurious dependencies in a few cases, but the only effect is to delay the load instruction. |
| DepC | 16 by 16-bit dependency matrix identifies all. previous entries which use the same cache set. Discussed below. |

TABLE 2-continued

Address Queue Dependency Bits

| Field (AQv- ) | Description |
|---|---|
| DepS | 16 by 16-bit dependency matrix identifies all previous entries which cause a store-to-load dependency (i.e., between stores and subsequent loads). Discussed below. |

As discussed below, Index [13:3] and bytes are also held in address stack 420. However, the byte mask contained in address stack 420 is more precise than that held in address queue 308.

Table 3 lists control bits, which are determined during the course of instruction execution and held in segment 517, shown in FIG. 7.

TABLE 3

Address Queue Control Bits

| Field (AQv- ) | Description (Each field is 1 bit) |
|---|---|
| Calc | Address has been calculated in the address calculation unit 418. This bit is set at the end of cycle "E2" of the address calculation sequence. The address must be calculated before any other operation can be completed. |
| TagCk | Entry has completed a tag check cycle with data cache 424. If it resulted in a "cache hit", the operation may proceed. Otherwise, the entry will wait until it can be executed sequentially. (i.e., If a retry is necessary, it is delayed until all dependencies are removed.) |
| Wait | This entry set its "hit" state bit but that bit was later reset by an external interface command from unit 434. Unless an exception was also set, this entry must retry its tag check cycle to fetch a new copy of its block. However, its request must wait until this entry becomes the oldest entry within the address queue 308. This bit set if a "mark invalid" command matches any entry, or if a "mark shared" command matches an entry containing a store instruction. The entry's request is delayed so that the cache will not be continuously thrashed by speculative reads. |
| Ref | Memory block is being refilled by external interface 434 into a primary cache (i.e., instruction cache 102 or data cache 424). |
| Upg | Memory block is being upgraded for a store instruction, so that it can be written. (This block's cache state will become "dirty exclusive, inconsistent".) |
| Hit | Memory block is in cache, or is being refilled into cache (if AQvRefill). More specifically, the "hit" bit is set if the queue gets a cache hit or if it initiated a refill operation for the addressed block. "Hit" only means that the entry's address matches a valid address in the cache tag; it can be set before the refill operation is completed. |
| Way | Way of the primary data cache in which this block is located. (When the queue gets a "hit" or initiates a cache refill, it records which way of the cache was used.) |
| Unc | This bit is set for cache-ops and loads or stores to addresses within "uncached" regions of memory. These instructions must be executed sequentially. |
| Done | This entry has been completed. (This bit is never set for store instructions.) |
| Exccal | This entry has an exception and will be aborted. ExcCal: The exception was detected during address calculation or translation. Invalid |

TABLE 3-continued

Address Queue Control Bits

| Field (AQv-  ) | Description (Each field is 1 bit) |
|---|---|
| | addresses or mis-aligned addresses are detected from the calculated address. Translation exceptions include TLB miss, invalid translations, or write protection violations. |
| Excsoft | Excsoft: A soft exception is detected when external interface 434 invalidates a cache block used by a load instruction which is already "done" but has not yet graduated. (Soft exceptions flush the pipeline to clear any use of stale data, thus preserving strong memory consistently, but they are not visible to the program.) |
| ExcBus | ExcBus: The exception was detected when external interface 434 signalled a bus error for a memory operation initiated by this entry. |
| BusyS | Stage "C1": Entry is busy. Either:<br>1) The entry was issued to the address calculation unit 418 during previous cycle, or<br>2) The entry is being retried by address queue 308. |
| BusyT | Stage "C2": Entry is busy. |
| MatchS | Entry is in pipeline state "C1" following end of refill state. |
| MatchT | Entry is in pipeline state "C2" following end of refill state. |
| MatchU | Entry is in pipeline state "C3" following end of refill state. |
| LoadReq | Entry requested a "freeload" cycle within the last three cycles. If this request was not granted, it will request a "justload" cycle instead. |
| LockA LockB | This entry has completed a tag check cycle, and has "locked" the block it needs into its cache set. Blocks can be locked out of a program sequence, but only one block can be locked per cache set. |
| UseA UseB | This entry is using a block which is not (usually) locked in the cache. This "use" is permitted only for the oldest entry within each cache set. |

The "C" numbers referenced in Table 3 identify pipeline "cycles" or "stages" associated with cache operations. As discussed below, address calculation uses a three-stage pipeline (i.e., C0–C2, and writes the result into address stack 420 during a stage C3). Similarly, "E" numbers identify pipeline "cycles" or "stages" associated with execution operations. Generally, cycles E1, E2 and E3 correlate with pipeline stages 4, 5 and 6, identified in FIG. 1. "E" and "C" numbers are essentially interchangeable.

Busy signals AQvBusyS and BusyT prevent any entry from requesting while it is still in the pipeline. Two entries can be busy simultaneously, whenever the queue calculates the address for one entry while it retries a second entry. These entries can be distinguished, because the AQvCalc bit has not yet been set within the first entry.

The "refill operation" referenced in Table 3 (in conjunction with match signals AQvMatchS, MatchT and MatchU) is the process of loading new data into a cache block. More specifically, if a load instruction gets a "miss" from data cache 424, it waits until the cache is refilled. During a primary cache refill, an 8-word data block is read from either secondary cache 432 or main memory and is written into data cache 424. Each block is transferred as quadwords (4 words or 16 bytes) on two cycles.

Refill state is reset after data is refilled into data cache 424 unless there was a secondary cache miss or ECC error. (A 9-bit "Error Check and Correction" (ECC) code is appended to each 128-bit doubleword in secondary cache 432. This code can be used to correct any single-bit error and to detect all double-bit errors.)

The three "block address match" signals are pipelined into stages "C1", "C2" and "C3." A miss or an error is detected during "C2". If neither occurs, refill state ends during phase 2 of cycle "C3."

The "freeload" cycle referenced in Table 3 (in conjunction with signal AQvLoadReq) is when address queue 308 bypasses data to register files 302 or 306 for a "load" instruction, while external interface 434 is writing this same data into data cache 424 during a cache refill. This "free" load avoids using an extra cache cycle for the load. (Only one register can be freeloaded per cycle.) However, if a requested freeload cycle is not granted, the entry will request a "justload" cycle. This cycle reads only the data array 425 of data cache 424—tag array 426 is not used.

The AQvLoadReq bit overrides the "refill" state to enable the freeload and justload requests for three cycles. After this, the "refill" state will have been reset, unless there was a secondary cache miss or ECC error.

The last entries in Table 3 (i.e., AQvLockA, LockB, UseA, UseB) are used to prevent cache thrashing. Once an entry either "hits" or "refills" a cache block, that block is kept in the cache until the associated entry graduates, unless it is invalidated by external interface 434. This procedure depends on the 2-way set-associative organization of data cache 424. That is, there are two blocks per cache set. The first entry to access a cache set may "lock" its block into that set. It remains locked as long as it is addressed by any active entry in queue 308. To prevent thrashing, the other block can be used only sequentially by the oldest entry which addresses that cache set. This is determined using AQvDepC (Table 2). This oldest entry marks its block as "used." (The "use" bits are required to keep the block in the cache. The "lock" bits could be reset if the locking instructions are aborted by a reversed branch.)

1. Address Queue Function Codes

FIG. 10 defines the 7-bit operation codes stored in the address queue 308 at segment 512 (as shown in FIG. 7). This code is condensed from 17 bits of the instruction through decode logic 505. The top two bits of the condensed function code indicate the type of function. (The subfield which is stored in the queue is underlined in the "Function" column of FIG. 8.)

"0nnnnnn" Bits 5:0 are a major opcode, from bits 31:26 of the original instruction. The opcode may have been modified during predecode. These opcodes include most load/store instructions.

"10nnnnn" Bits 5:0 are a COP1X function code, from bits 5:0 of the original instruction. These instructions use base-index addressing for floating-point registers or for prefetch.

"11nnncc" Bits 4:0 are a CACHE operation code, from bits 20:16 of the original instruction. The three high bits specify an operation; the low two bits select a cache.

The top section of the table shows modified opcodes (Instruction bits 31:26). Several opcodes are modified during predecode to facilitate decoding. The original opcodes of these instructions are shown in parentheses, as "(op=32)"; their previous positions are marked by their mnemonic in small italic letters, as "(ldr)". All modifications are limited to the high three opcode bits, so all changes are within a column. "LWC2" is mapped into the same box as "SWC2"; both instructions cause the same exceptions and do not load any destination register.

The COP1X opcode (octal #23), which is split and moved to two separate opcodes (octal#13 and #33) during predecode, and the CACHE opcode (octal #57) are replaced with their function and subfunction fields, respectively. Thus, these codes are not stored in the queue. (The corresponding boxes are shaded to indicate that these codes do not occur.)

The middle section of the table contains five function codes from "COP1X". These do "Load Indexed", "Store Indexed", and "Prefetch Indexed" operations. The function code is instruction bits 5:0. The two "Load" instructions are moved to #33, because they have a floating-point destination register. The prefetch and the two "Store" instructions are moved to #13, because they have no destination register.

The bottom section contains cache operations. There are eight operations which operate on the Instruction Cache (IC), Data Cache (DC) or Secondary Cache (SC).

There are two formats of "prefetch" instructions: the "LPF" opcode (#63 changed to #73) and the "COP1X" function "PFETCH" (#17).

2. Address Queue Operand Registers

Each address queue entry contains up to three operands. Operand A, stored in segment 509 (FIG. 7), is the integer register which contains the base address. Operand B, stored in segment 510, is an integer register. For integer "load modify" instructions (such as LWL and LWR), it contains the old destination register number. For integer store instructions, it contains the value to be stored. For indexed floating-point load/store instructions, operand B contains the index register. If "Register 0" was selected for either operand A or B, the operand is not "Valid", and its value is zero.

Operand C, stored in segment 513, contains a floating-point register number. For a floating-point store instruction, it is the register value to be stored. For a floating-point "load word" instruction in Mips-2, it contains the old destination register number.

Operands A and B each have a "Ready" bit (see FIG. 8), which indicates if the operand value is available yet. These bits are initialized from a Busy Bit Table (not shown), during the cycle following decode. This bit can later be set when the operand is written, using an array of associative comparators.

Operand A must be ready before issuing integer load/store instructions for address calculation. For floating-point, both operand A and B must be ready. (Both operands are used for indexed load/store; operand B defaults to "ready" for other floating-point load/store.). Before a stack operation can be requested, operand B (for integer) or C (for floating-point) must be ready. These operands are needed for "load/modify" instructions.

The ready bits are not checked when graduating store instructions, because all previous instructions must have graduated before the store is eligible to graduate.

3. Address Associative Ports

The Address Queue has two associative ports which compare cache index addresses. Each port uses dynamic comparators which are clocked on the leading edge of phase 2 (i.e., φ2) of the processor clock.

The dependency port compares the calculated memory address (VAdr[13:5]) generated by address calculation unit 418 to each entry of segment 516 (FIG. 7) to detect accesses to the same cache set. These comparisons occur during stage C1 of each address calculation sequence.

An external port 525 determines if an external request affects any entries in the stack. It compares the cache index (VAdr[13:5]), the doubleword address (VAdr[4:3]), and the cache way. These comparisons occur during stage C0 of each external operation sequence.

B. Address Calculation Sequence

Address queue 308 issues instructions to address calculation unit 418 when its base (and index for indexed load and store instructions) is ready. This sequence is illustrated in the timing chart shown in FIG. 11.

Figure 11:
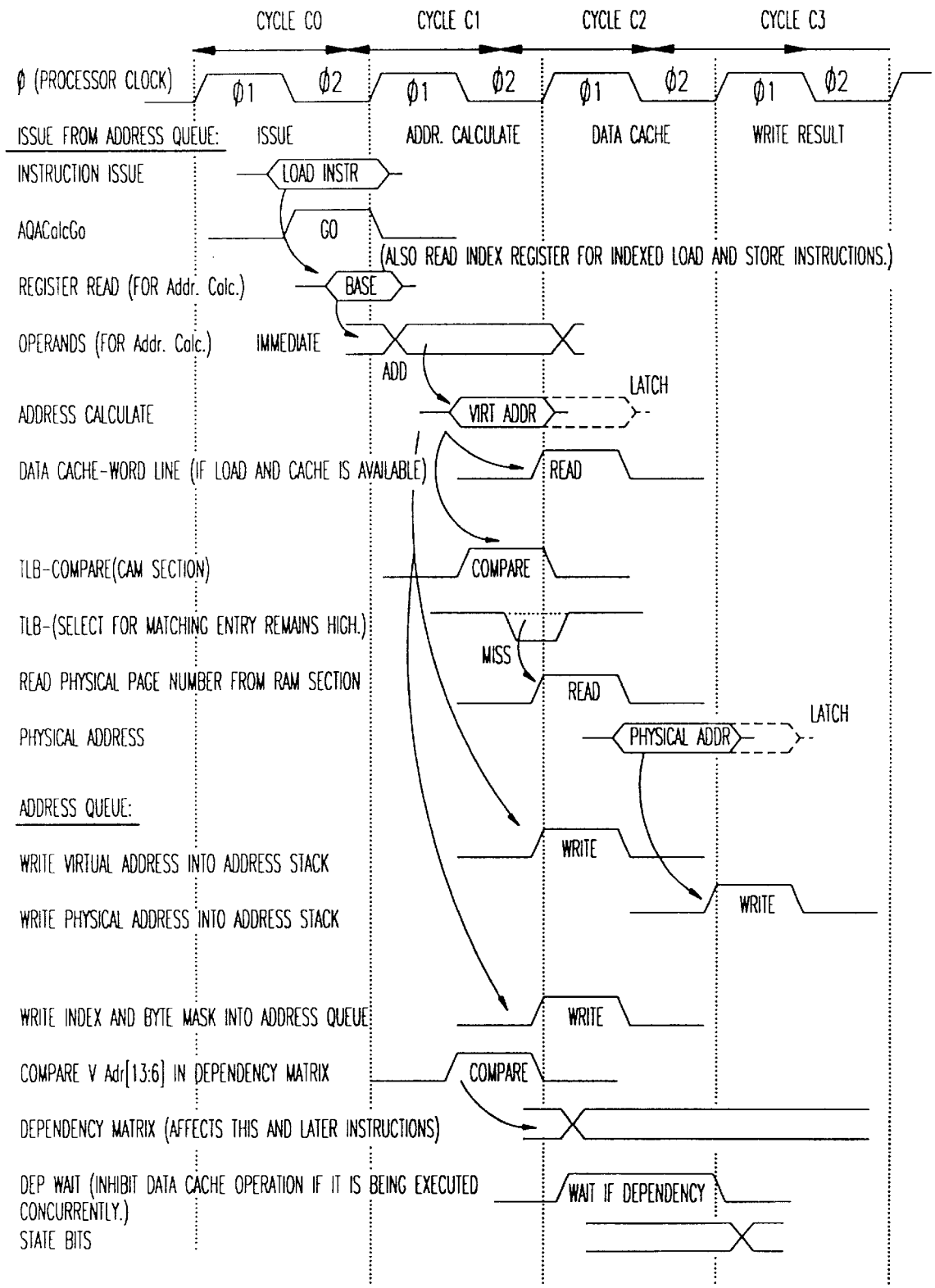
FIG. 11 is an address calculation timing diagram.

Address calculation requires a three-stage pipeline; i.e., stages C0 (issue), C1 (address calculation) and C2 (data cache) as shown in FIG. 11. This calculation is performed only once for each load/store instruction.

During phase 1 of stage C0, address queue 308 issues the oldest entry with a pending request. During phase 2, the base (and index) registers of the instruction are read from integer register file 306. At the end of cycle C0, the base register is latched in operand "A" and either the index register or the 16-bit immediate field is latched in operand "B." Either register may be bypassed from any of the three write ports 526–528 of integer register file 306 (FIG. 7).

For speed, data may be "bypassed" around a memory when reading a location during the same cycle that it is written. In other words, the newly written value is multiplexed directly to a read port without waiting for it to be actually written into the memory. A bypass multiplexer is selected whenever the operand register number of a current instruction equals the destination register number of a previous instruction. Bypassing is necessary to reduce instruction latency.

During phase 1 of stage C1, the address is calculated using 64-bit adder 529 disposed in address calculation unit 418 (FIG. 7). For "base+offset" format, adder 529 adds the base register on line 530 to the sign-extended 16-bit immediate field on line 531. For "base+index" format, adder 529 adds base register on line 530 and index register on line 532 together. The resulting virtual address on line 533 is sent to address queue 308 (i.e., segments 515 and 516) and TLB 422, as shown in FIG. 7.

During phase 2 of C1, TLB 422 compares "virtual page" address bits 63:62 and 43:13 to each of its entries. Also during phase 2, address queue 308 compares "index" bits VAdr[13:3] to the index stored in each entry in segment 516. This helps determine cache block and store-to-load dependencies, as discussed below. The newly calculated index is written into the new entry in segment 516.

During stage C2, a physical address is output from the entry of the TLB that matched.

Stage C3 (write result) is used for writing a calculated physical address to address stack 420 (i.e., segment 519 as shown in FIG. 7).

C. Issuing Instructions to the Data Cache

Data cache 424 is the subject of a copending application, as noted above, and therefore will not be discussed in detail. However, as background, the data cache contains 32K-bytes of memory. It is interleaved using two identical 16K-byte banks (i.e., banks #0 and #1). Each bank consists of a 256-row by 576-bit data array and 64-row by 35-bit tag array. The data array can access two 72-bit doublewords in parallel. The tag array can access two 32-bit tags in parallel.

The banks operate independently. For some operations, the tag and data arrays can operate independently. Thus, there are four arrays (two tag and two data) which are separately allocated.

The arrays are allocated among requests from four circuits. All four circuits can operate simultaneously, if they are allocated the cache array(s) they need. The highest priority request is used for external interface. The next-highest request is used for graduating store instructions if oldest in active list 212. The next-highest request is used for all other load/store operations which are retried from the Address Queue. The next priority is for instructions whose address is being calculated. The lowest priority is for a store that is not the oldest instruction in processor 100. (See Table 4).

Each bank is 2-way set associative. Two tags are read and compared in parallel for tag checks for the CPU and external "interrogate" operations. This determines which way of the cache, if any, contains the desired data. The way is remembered and used later for graduating stores, or for external refill or writeback operations.

The data cache is addressed by virtual address bits. Address bits [2:0] select a byte within a doubleword (i.e., 64 bits). Bits [4:3] select a doubleword within a block (8-words). Bit 5 selects bank #0 or bank #1. Bits [13:6] address a set within the bank. More specifically, these 8 bits are decoded to select one of 256 "word lines" in the cache data array. Each word line enables eight doublewords (16 words). Thus, the word line enables two blocks (i.e., one block in each way) which represent a single set in a 2-way set-associative cache. The desired block (i.e., way) is identified through tag checking.

Doublewords within these blocks are selected using 4-to-1 multiplexers in the sense amplifiers. Bits are interlaced so that the cache can access doublewords differently for processor or external interface operations. The processor associatively accesses doublewords within two blocks. The external interface accesses two doublewords within the same block in parallel.

As noted above, data cache 424 is shared between three processor units and external interface unit 434. The processor units perform tag checks, load instructions, and store instructions. These units compete for cache and register resources based on priorities described below. Each unit can do only one operation per cycle, but all four units may operate simultaneously, if their resource requirements do not collide. These operation are described in detail in copending application Ser. No. 08/324,124 which, as noted above, is incorporated herein by reference.

All load and store instructions are put in the address queue 308 after they are decoded. When their base and index registers are available, they are issued to address calculation unit 418 (FIG. 7), which computes a virtual address (VAdr [63:62,43:0]), and the TLB 422 which converts this into a physical address (PAdr[39:0]). These addresses are written into address stack 420. The "index" bits of the virtual address (i.e., VAdr[13:0]) are written into address queue 308 (at segments 515 and 516), for dependency checking. This sequence is performed by a dedicated pipeline.

Data cache 424 can be accessed in parallel with a TLB access, if the required bank's tag array is available. If the tag array generates a cache "hit" for a load instruction, that instruction can be completed immediately. Otherwise, or if there are "store-to-load" dependencies, the instruction must later be re-issued from the address queue 308. These later accesses can do tag checks, loads, or both. A separate unit controls writing register values into the cache, as part of graduating store instructions.

1. Data Cache Usage

As noted above, data cache 424 contains two identical banks. Each bank contains tag and data arrays which can operate separately. Thus, there are four separate cache arrays which can be allocated independently. Each request contains a 4-bit code which indicates which of these arrays it needs:

...UseC[3]: Bank 1 Tag Array.
...UseC[2]: Bank 1 Data Array.
...UseC[1]: Bank 0 Tag Array.
...UseC(0]: Bank 0 Data Array.

Usage signals are generated for the external interface (ExtUseC), queue retry (AccUseC), and store (StoUseC) during the request cycle ("C0"). This cycle is two cycles before the array is read or written. If none of these requests occur, the arrays are available for use by the instruction whose address is being calculated.

Priority for using the Data Cache is illustrated in FIG. 12 and Table 4. Each unit can request an operation from either Data Cache bank, depending on its address bit 5. Some operations require use of both the tag and data arrays within that bank. High priority requests are determined during the "C0" request cycle. Lower requests are not determined until the next cycle, because they depend on signals during "C1".

External interface 434 provides a 4-bit command code ("DCmd[3:0]") and a cache index ("Index[13:4]") to the processor (i.e., cycle C0), two cycles before it uses data cache 424. The command and address bit 5 are decoded to determine which cache arrays are needed. The external interface has highest priority; its requests are always granted. If this command refills a data quadword, and address queue 308 contains a "load" instruction in an entry waiting for this quadword, the queue selects and issues that entry to the load unit. This operation, as described above, is called a "freeload."

Store operations are requested only if the oldest store instruction is ready to graduate, its store value is ready from a register and any previous load has been completed without an exception. (The request for a shared read port is made one cycle earlier. This request has low priority, because it is unknown if the store could graduate.) If this store instruction is the oldest instruction (not just the oldest store instruction), it is given high priority for the cache, because it is guaranteed to graduate if ready. Otherwise, other queue accesses are given priority.

Queue retry accesses can perform tag checks, loads, or both. Each entry can generate one of four requests, based on its state and bit 5 of its address. For each bank, these include a request for the tag array (and perhaps the data array) and a request for only the data array. Address queue 308 uses four priority encoders to select one entry from each group of requests. One of these four is then selected, after it determines which arrays were needed by the external interface and guaranteed stores. Tag checks are given priority over data-only requests. Priority between the banks is alternated. (This makes use of the two banks more uniform. Also, if a tag check generates a refill, that bank's tag array will be busy during the next cycle, which would abort any new operation which uses that tag array.)

Lower-priority requests are resolved during "C1" cycle. Active list 212 determines which instructions graduate. If a store instruction graduates at the beginning of the "C1" cycle, it will use its data cache bank. For instructions whose address is being calculated, the bank is selected using VAdr[5], which becomes valid at about the middle of phase 1. A tag check cycle is performed, if the selected tag array is available. For load instructions, a data load operation is also performed, if the data array is also available. (It is useful to complete the tag check, even if the load must be repeated. If the tag check results in a "miss" or a memory dependency, the data array would not be used anyway. If it hits, the next retry from the queue will need only a data array.)

TABLE 4

Priority for using Data Cache

| Priority | Unit | Description |
|---|---|---|
| 1 | External Interface | External interface may preempt use of either bank of the data cache 424 by asserting a request on two cycles before the cache access. |
| 2 | Certain Store | A store instruction is given priority if it is guaranteed to graduate. |
| 3 | Retry Access | Instruction retrying access has priority over new address calculation. |
| 4 | Address Calculate | Until a new address is calculated, the priority circuit does not know which cache bank it requires. It will access the cache if the required bank is available. |
| 5 | Other Store | If a store is not the oldest instruction in the processor, it might not graduate. Thus, it has low priority so that it will not interfere with operations which are known to be needed. |

2. Shared Register Usage

Most processor requests require use of a shared register port. These ports are allocated independently of the cache, by a move unit (not shown). The move unit transfers data between register files 302, 306 and data cache 424 and branch unit 214. These units share control of one read and one write port to each of the integer and floating-point register files. These shared ports are used for all register accesses except for the dedicated ports assigned the integer and floating-point arithmetic units. An instruction cannot be completed if it does not get the register ports it requires. However, a tag check can be completed.

Most loads require a destination register in either the integer 306 or floating-point 302 register files. If an integer load specifies "register 0," however, no destination is stored. "Load/modify" instructions also require a read port to fetch the old value of the destination register. The required registers are determined in the decode unit, and are signaled to the queue as operand "valid" bits.

For uncached load instructions, registers are allocated at the end of the "C0" cycle. These requests have absolute priority, because these instructions cannot be retried. For other load instructions, the ports are allocated during "C1". These requests have low priority.

For a store instruction, the data register is located and the appropriate register file port is allocated one cycle before "C0". Stores have the lowest priority for ports, because it is not known if they can actually graduate. Stores are selected by default if no other request is present.

3. "Active" Signals in Address Queue

Figure 13A:
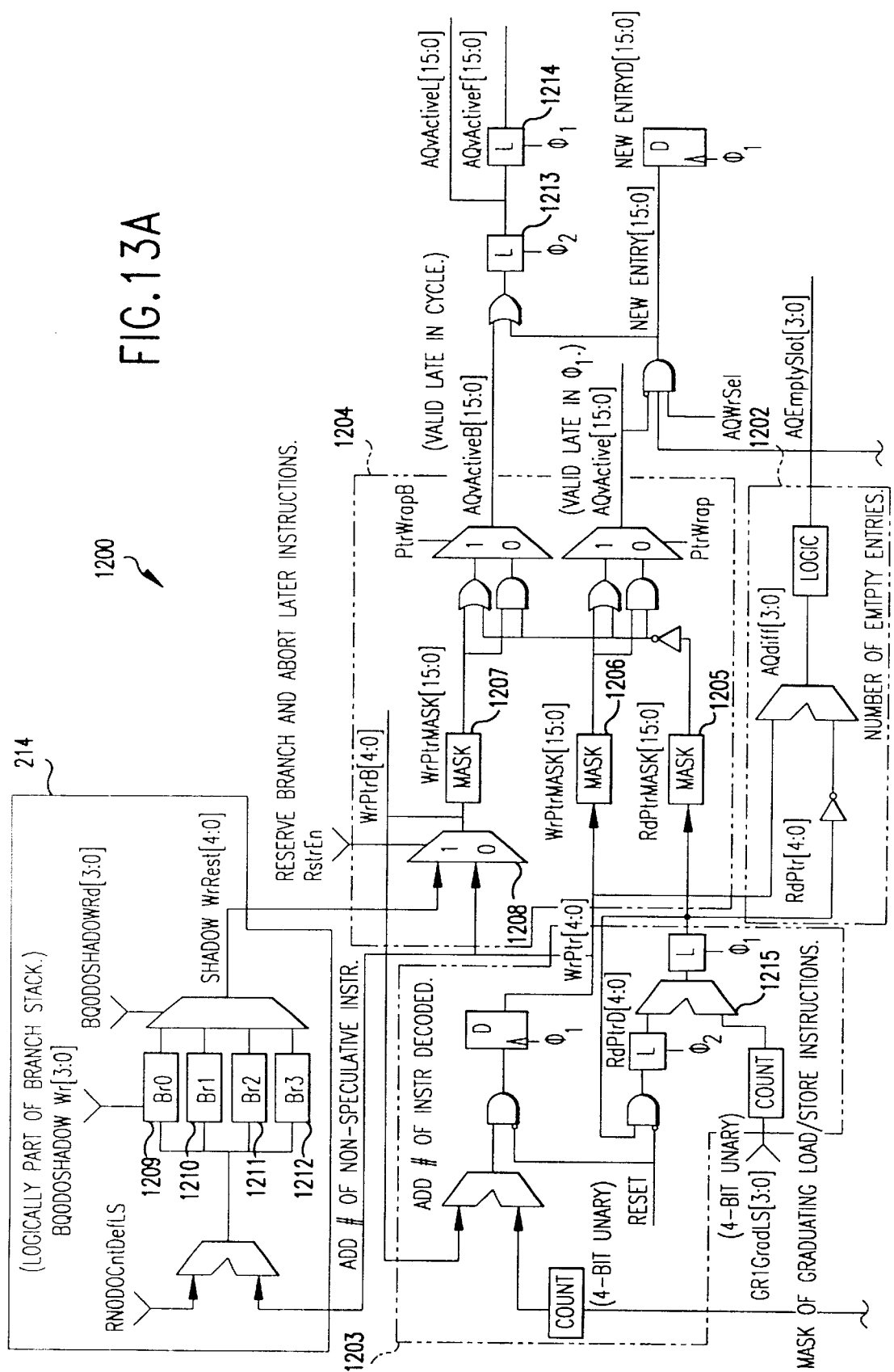
FIGS. 13A and 13B (collectively referred to as "FIG. 13") disclose active-signal logic of the address queue.
Figure 13B:
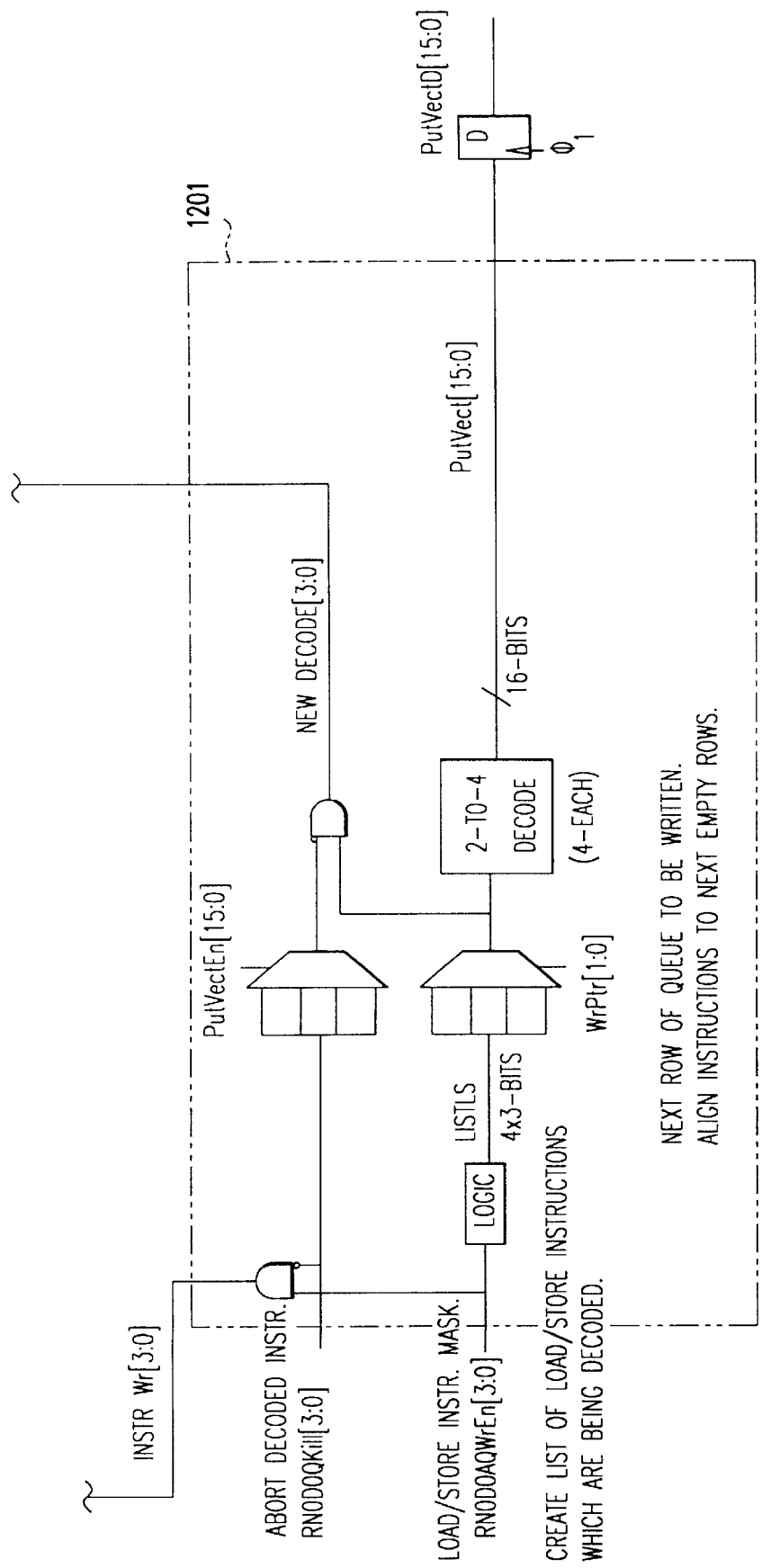

Each queue entry is "active" if it contains a valid instruction. For timing reasons, there are several sets of "active" signals. These signals are generated using read pointer 506 and write pointer 507 (FIG. 7) of the address queue. Only the primary "active" signals correspond exactly to the pointers. The other signals vary slightly logically, but have better timing for special uses. The associated logic 1200 is illustrated in FIG. 13. Active signals are defined as follows:

AQvActive[15:01]: Active bits determined directly from the "read" and "write" pointers. These signals become valid late during phase 1. ("Primary" signals.)

AQvActiveB[15:0]: AQvActive, but delete entries which are aborted if a branch is reversed. These signals become valid late during phase 2.

AQvActiveL[15:0]: AQvActiveB delayed in a phase-2 latch. These signals become valid at the end of phase 2, and can be read dynamically using a phase-i strobe.

AQvActiveF[15:0]: AQvActiveL delayed in a phase-1 latch. These signals switch cleanly at the beginning of each cycle. They are used to reset rows and columns of the dependency matrices discussed below. (The two latches create an edge-triggered register.)

Referring to FIG. 13, new decoded entries to address queue 308, identified by a 4-bit "load/store instruction mask," are processed by logic block 1201. Block 1201 generates a 16-bit "PutVect" signal which maps one of four input instructions to each of the address queue write ports. Block 1201 also informs logic block 1203 of the number of instructions written into address queue 308 each cycle via signal "InstrWr." Block 1203 calculates the next value of write pointer ("WrPtr") using the InstrWr signal. This block also calculates the next value of read pointer ("RdPtr") using the "mask of graduating load/store instructions" (i.e., a signal indicating the number of instructions graduating from address queue 308). The RdPtr and WrPtr signals are forwarded to logic block 1204 which generates read mask 1205 and write masks 1206 and 1207. (Mask 1207 is the same as 1206 except aborted entries may be deleted if a branch is reversed via MUX 1208.) These signals are further processed in block 1204 to generate "active" signals, discussed below. In the event of a reverse branch, branch unit 214 provides information to restore the WrPtr to its pre-branch state. Major elements of the conventional logic used to implement these blocks is illustrated in FIG. 13.

As discussed above, RdPtr and WrPtr are 5-bit counters which configure the queue's entries as a circular FIFO. The four lower bits select one of the queue's 16 entries. The fifth bit distinguishes between an empty queue (read and write pointers are identical) and a full queue (pointers differ in high bit only). This bit also indicates if the write pointer has "wrapped" to zero module 16, and the read pointer has not. In this case, the write pointer is less than or equal to the read pointer.

Figure 14:
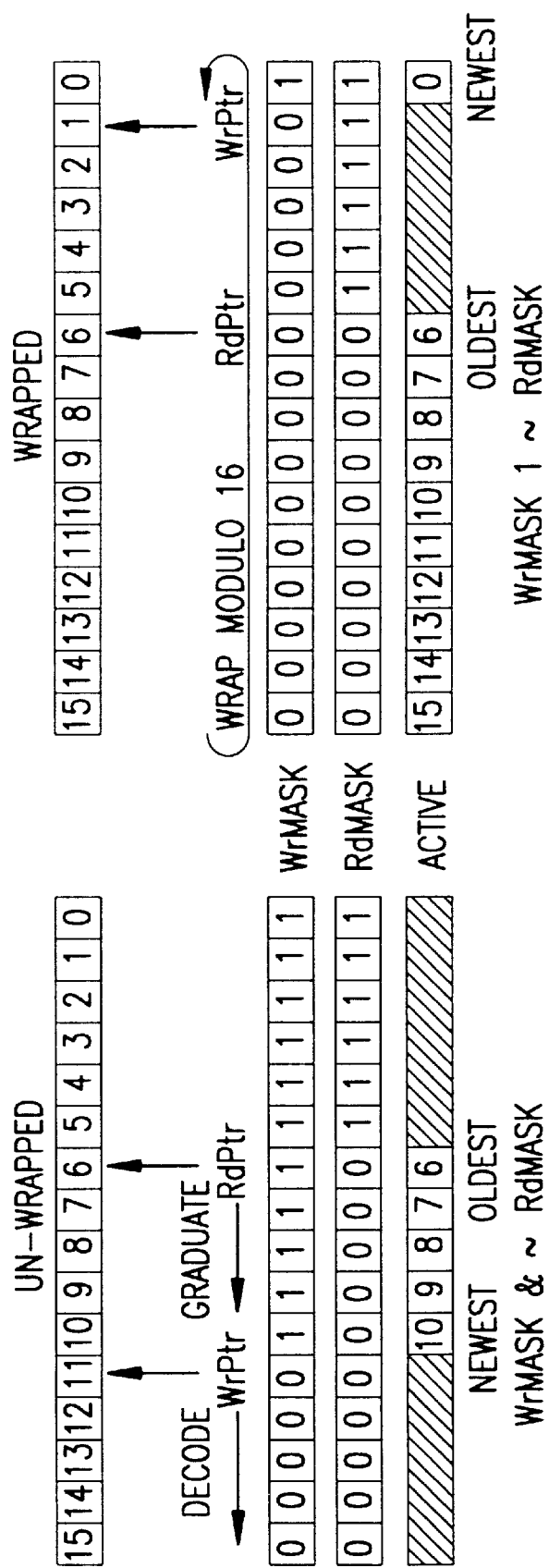
FIG. 14 discloses generating an active mask.

As shown in FIG. 13, "active" bits are generated from two masks formed from the two pointers. Each mask sets all bits lower than the pointer, as shown in FIG. 14. For example, when the read pointer equals '6', its mask has bits [5:0] set. The "active" bits are set for entries which have been decoded ("written" WrMask) but not graduated ("read" ~RdMask). If the write pointer has not wrapped, the masks are logically ANDed. If it has wrapped, the masks are logically ORed.

The write pointer is the counter output directly. It is incremented at the end of each cycle by the number of load/store instructions which were decoded in block 1203. These instructions are written into the queue, and become active, at the beginning of the next cycle.

If a speculative branch was mispredicted, the write pointer will be restored using a shadow register associated with that branch from branch unit 214. This deletes all the instructions which were speculatively decoded after the branch. The shadow register is loaded from the write pointer (plus the number of load/store instructions decoded before the branch, if any), when the branch is originally decoded. There are four shadow registers (i.e., 1209–1212), because the decode unit can speculatively fetch past four nested speculative branches. The restore signal (i.e., "RstrEn") is not valid until early in phase 2, so the write pointer and active mask are not updated until the next cycle.

However, the restore does delete entries from a later "active" signal; i.e., AQvActiveB[15:0). These signals are logically ORed with signal "NewEntry[15:0]," which indicates newly decoded entries. The results are saved in a register composed of latches 1213 and 1214. The output of latch 1213 (i.e., AQvActiveL[15:0]) becomes valid late during phase 2, and can be read dynamically during phase 1 of the next cycle. The output of latch 1214 is valid during the following cycle. These signals are used to reset rows and columns of the dependency matrices. These signals are logically equivalent to the original "active" signals, except that they go inactive one cycle later after an instruction graduates.

The read pointer is the output of adder 1215 in logic block 1203, which increments the read counter ("RdPtrD") by the number of load/store instructions which graduated at the end of the previous cycle ("GR1WOGradLS"). These signals occur too late to be added before the clock edge.

The pointers are subtracted to determine the number of empty slots in address queue 308 in logic block 1202. This information is sent to the decode logic 200 (FIG. 1), so it will not decode more load/store instructions than will fit in the queue. The subtraction uses 1s-complement arithmetic to simplify decoding. The signals "AQ0D0EmptySlot[3:0]" are a unary mask.

4. Priority Logic within Address Queue

Figure 15A:
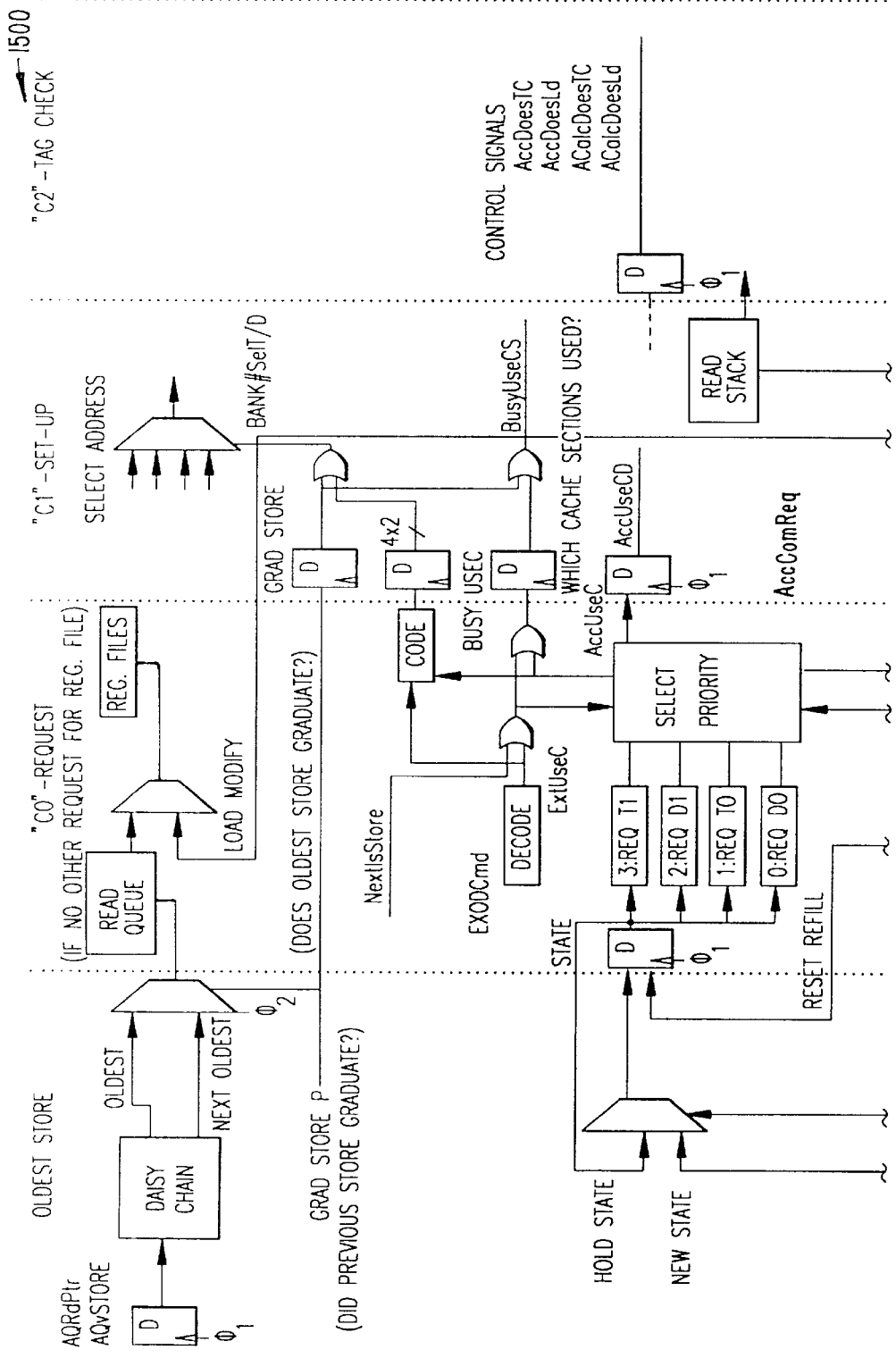
FIGS. 15A and 15B (collectively referred to as "FIG. 15") disclose priority logic of the address queue.
Figure 15B:
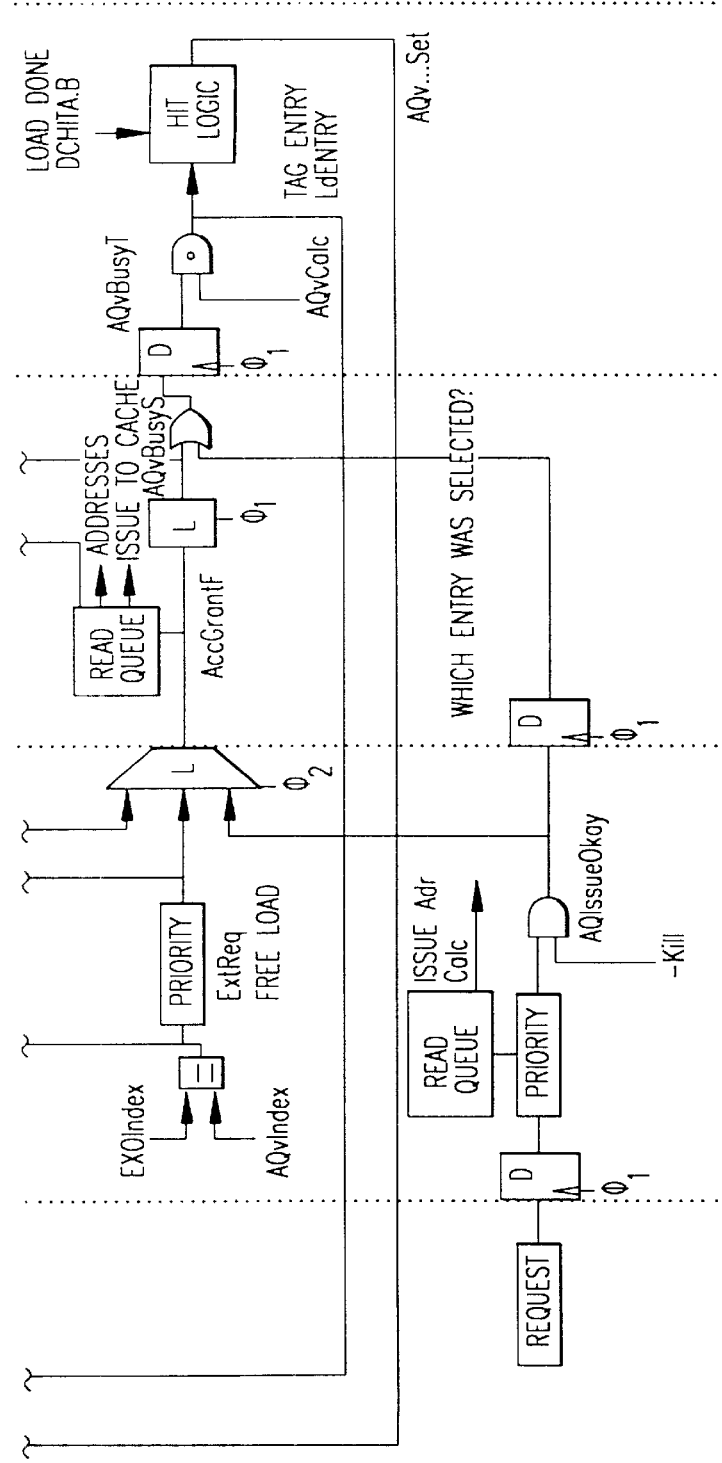

The Address Queue's priority logic 1500 is illustrated in FIG. 15. In this illustration, logic is arranged according to its pipeline position. This logic corresponds to four pipeline stages. The first stage locates the oldest and next oldest store instructions. The second "Request" stage allocates the cache arrays for external interface, guaranteed store, and retry accesses. The third "Set-up" stage allocates arrays for other stores which graduate, and for instructions in the Address Calculation unit. FIG. 15 shows the timing and relationship between major signals.

A "...UseR" signal contains four bits which indicate which shared register file ports of register files 302 and 306 are needed.

Bit 3: Floating-point Register File, shared write port.
Bit 2: Floating-point Register File, shared read port.
Bit 1: Integer Register File, shared write port.
Bit 0: Integer Register File, shared read port.

The External Interface Command code ("EX0DCmd" in FIG. 15) is decoded to determine which data cache sections are required by external interface 434 ("ExtUseC"). This code also indicates if refill data is available.

Requests for retry accesses of the Address Queue are determined during cycle C0. There are three groups of requests which compete: "freeload" (i.e., a load instruction in the queue can use data which is being refilled into the data cache 424), "retry access" (i.e., an instructions already in the queue can request that its operation be retried, if there are no dependencies, the required cache section is available, and the addressed block is not waiting for a refill to be completed) and "address calculate" (i.e., the cache can be accessed in parallel with address calculation and translation).

Freeload operations are given priority because they share use of the cache bank which the external interface is refilling. These operations do not have to compete for cache resources. However, they do have to compete for register ports. The operation may also fail if the secondary cache misses or has an ECC error.

Retry access uses four sets of requests which correspond to the data cache sections, as described above with respect to the "UseC" signal. One of these sets is selected, based on which sections are not used by external interface 434 or a store. Thus, each set of requests is enabled only if the corresponding cache section is available. This resource check only considers one section for each request. If both the data and tag arrays are needed, only the tag array is checked. The tag array is used for tag check operations. If the data array is also available, it can be used for loading data. But the tag check can be done even if the data array is not available, and the data array will be accessed independently later.

Newly calculated instructions have the lowest priority. First they tend to be newly decoded instructions, and older instructions are usually given higher priority. The older instructions are more likely to have later instructions dependent on them and are less likely to be speculative. Also, the bank which they require is not know during cycle "C0"; it depends on address bit VAdr[5], which is calculated early during cycle "C1". Thus, the availability of its cache sections is not known until that cycle.

These three sets of requests are combined into a single request set at the end of cycle "C0" identified as "AccComReq," as shown in FIG. 15. The highest priority request in the combined set is granted by a dynamic priority encoder at the beginning of cycle "C1". This encoder gives higher priority to older instructions, based on the read pointer (AQvRdPtr) of the address queue. (Generally, performance is improved by giving older instructions priority. Also, this avoids a possible deadlock case. In some cases, an entry will continually retry its operation every three cycles while it waits for a resource. This occurs, for instance, for "load-modify" instructions if the old value of their destination register is still busy. In rare cases, three such entries could monopolize all queue issue cycles, inhibiting lower priority instructions. If priority was not based on program order, this would create a deadlock if one of the inhibited instructions generates the old destination value.)

External interface 434 also sends the cache index address (i.e., "CC0PDIndex[13:4]" and "CC0PDWay"). If these match any queue entry which is in "refill" state, that entry's refill bit is reset. This allows that entry to request a load operation. For a load instruction, the refill data can be bypassed to the processor while it is being written into the cache. Because this bypass does not require an extra cache cycle, it is called a "freeload" operation, as described above. The refill may be aborted during the "C2" cycle if there was a Secondary Cache miss or an ECC error. If aborted, each corresponding entry must have its refill bit set again (AQvRefill). Thus, the match signals are pipelined in each entry (AQvFreeS and AQvFreeT; i.e., the freeload request signal is pipelined in analogous fashion to the match signals described above). If the refill is aborted during a freeload, the abort signal inhibits a "LoadDone" signal of the load instruction. If the load is retried later (but was requested before aborting), the AQvRefill bit of the subject entry is inhibited.

5. Access Priority Logic

Figure 16:
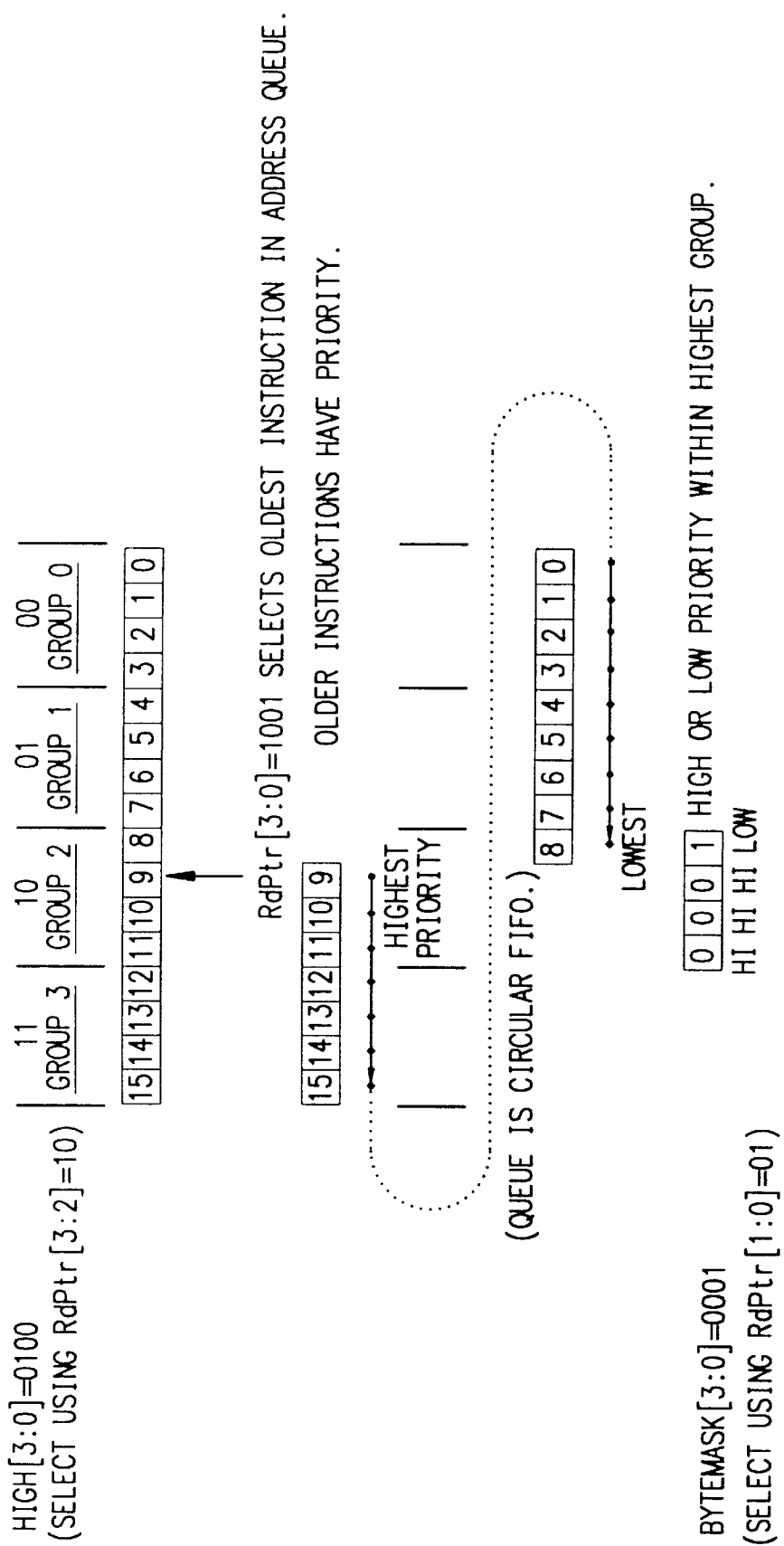
FIG. 16 is an example of retry access priority.

Older instructions have priority for retry accesses in the address queue 308. The read pointer 506 of the queue (FIG. 7), which points to the oldest instruction in the queue, selects the entry with highest priority. Subsequent entries have decreasing priority. An example is illustrated in FIG. 16. As shown, entry 9 is the oldest. Entries 10 through 15, and then entries 0 through 8, are next oldest. Entry 8 contains the newest instruction and has the lowest priority.

Figure 17A:
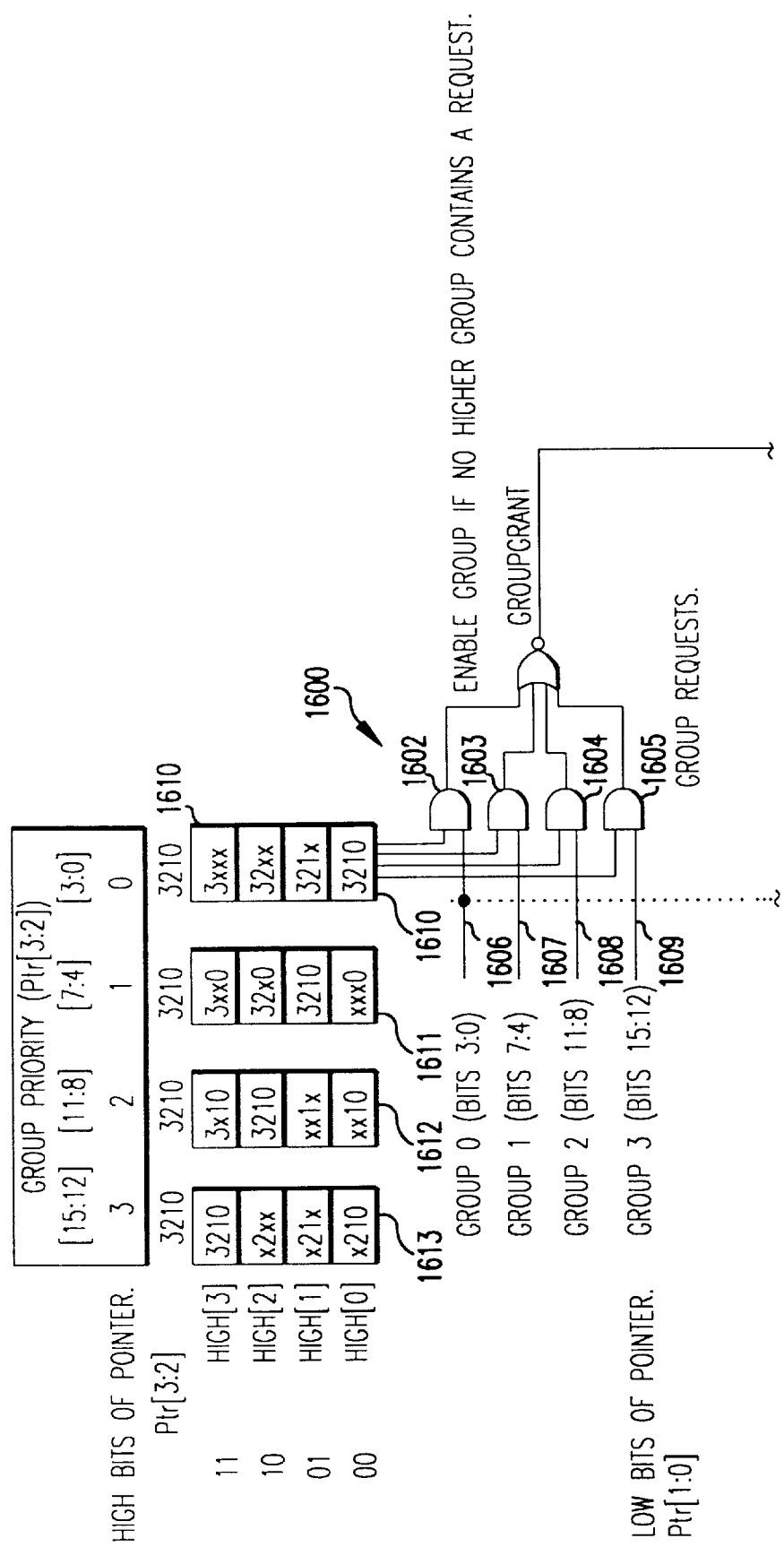
FIGS. 17A and 17B (collectively referred to as "FIG. 17") disclose retry access priority logic of the address queue.
Figure 17B:
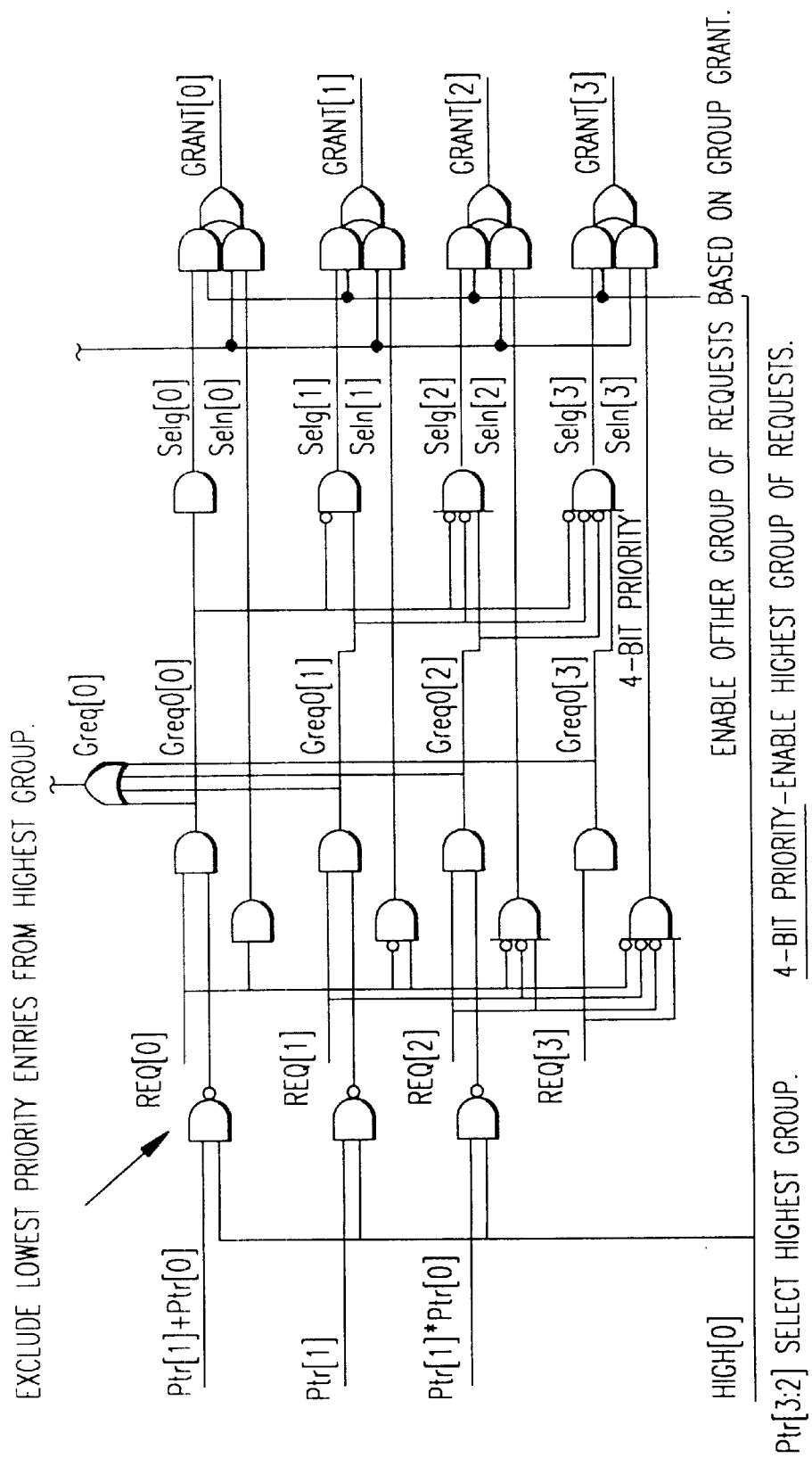

Implementing logic is shown in FIG. 17. The sixteen entries are divided into four groups of four entries. Each group is implemented with identical logic. The grant signal has two inputs. The first input (upper and-or input in drawing) is asserted by any request in the highest group of requests. This group is selected by decoding the upper two pointer bits: RdPtr[3:2]. This group may also contain several of the lowest requests, which are gated off using a bit mask generated from RdPtr[1:0].

Lower priority requests are granted using a 4-wide and-or gate which determines if any higher-priority group contains any request. The grant for the "highest" group enables the lowest entries, which were masked off from the group requests. This priority circuit includes the "highest" bits, but it will not be enabled if any of those requests are pending.

The tables in FIG. 17 (i.e., 1610–1613) identify which bits within each group are enabled for a selected group. A number indicates the bit is enabled while an "x" indicates the bit is disabled. Accordingly, if Ptr[3:2] is "00" then, all table 1610 outputs (coupled to AND gates 1602–1605) are high. Tables 1611–1613 operate in similar fashion.

Logic 1600, shown in FIG. 17, implements "Group 0" (i.e., containing bits 3:0). This logic is replicated four times for sixteen bits (i.e., Groups 0 through 3). RdPtr[3:0] selects the oldest entry in the queue. Ptr[3:2] identifies the associated group and "High[n]" is active for the nth group (i.e., if Group 0 contains the oldest entry, then High[0] is a logic "1"). "Req[0]" to "Req[3]" are retry requests from entries 0 through 3, respectively, in a particular group.

Lines 1606 to 1609 (i.e., "Group0" to "Group3") are a logic 1 when a request is present in the respective group (i.e., each line is coupled to an OR gate which is, in turn, coupled to a circuit identical to logic 1600 for that particular group). When a request in a group is granted, the appropriate "Grant" signal (i.e., Grant[0], [1], [2] or [3]) is high. Additional circuit functional description is provided in FIG. 17.

6. Synchronize Instruction ("SYNC")

A "SYNC" instruction ("SYNC", opcode 0 with function octal '17') provides a memory barrier, which may be used to control sequencing of memory operations in a loosely ordered system. Architecturally, it guarantees that the entire system has completed all previous memory instructions, before any subsequent memory instruction can graduate. Write-back buffers (for implementing a write-back protocol) of external interface 434 must be empty, and the external memory system of processor 100 has no pending operations. External interface 434 asserts signal "CD0SyncGradEn" whenever a SYNC instruction may graduate.

SYNC instructions are implemented in a "light-weight" fashion on processor 100. The processor continues to fetch and decode instructions. It is allowed to process load and store instructions speculatively and out-of-order following a "SYNC." This includes refilling the cache and loading values into registers. Because processor 100 graduates instructions in order, however, no data is stored and none of these instructions can graduate until after the SYNC graduates. One of these speculative loads could use a cache block which is invalidated before it is graduated, but it will be aborted with a "soft exception."

Whenever a primary data cache block is invalidated, its index is compared to all load instructions in address stack 420. If it matches and the load has been completed, a soft exception ("strong ordering violation") is flagged for that instruction. The exception prevents the instruction from graduating. When it is ready to graduate, the entire pipeline is flushed and the state of the processor is restored to before the load was decoded. Because this exception is soft (and must not be reported to the kernel), the pipeline immediately resumes executing instructions.

Address queue 308 continues to execute load and store instructions speculatively. If an external bus operation causes the needed cache line to be invalidated, the instruction will be aborted using the "soft" exception mechanism and then automatically retried.

A "SYNC" instruction is loaded into address queue 308, but the queue does not calculate an address or perform any operation. It is marked "done" after it becomes the oldest instruction in the address queue and external interface 434 asserts "CD0SyncGradEn." It can then graduate in order.

7. Synchronizing Cache-op Instructions

Cache-op instructions ("CACHE", opcode octal '57'; FIG. 10) are executed sequentially by the address queue 308. Whenever a cache-op instruction is in the queue, the execution of all later instructions is inhibited until it graduates. Address calculation is performed, but cache access is not enabled.

Figure 18A:
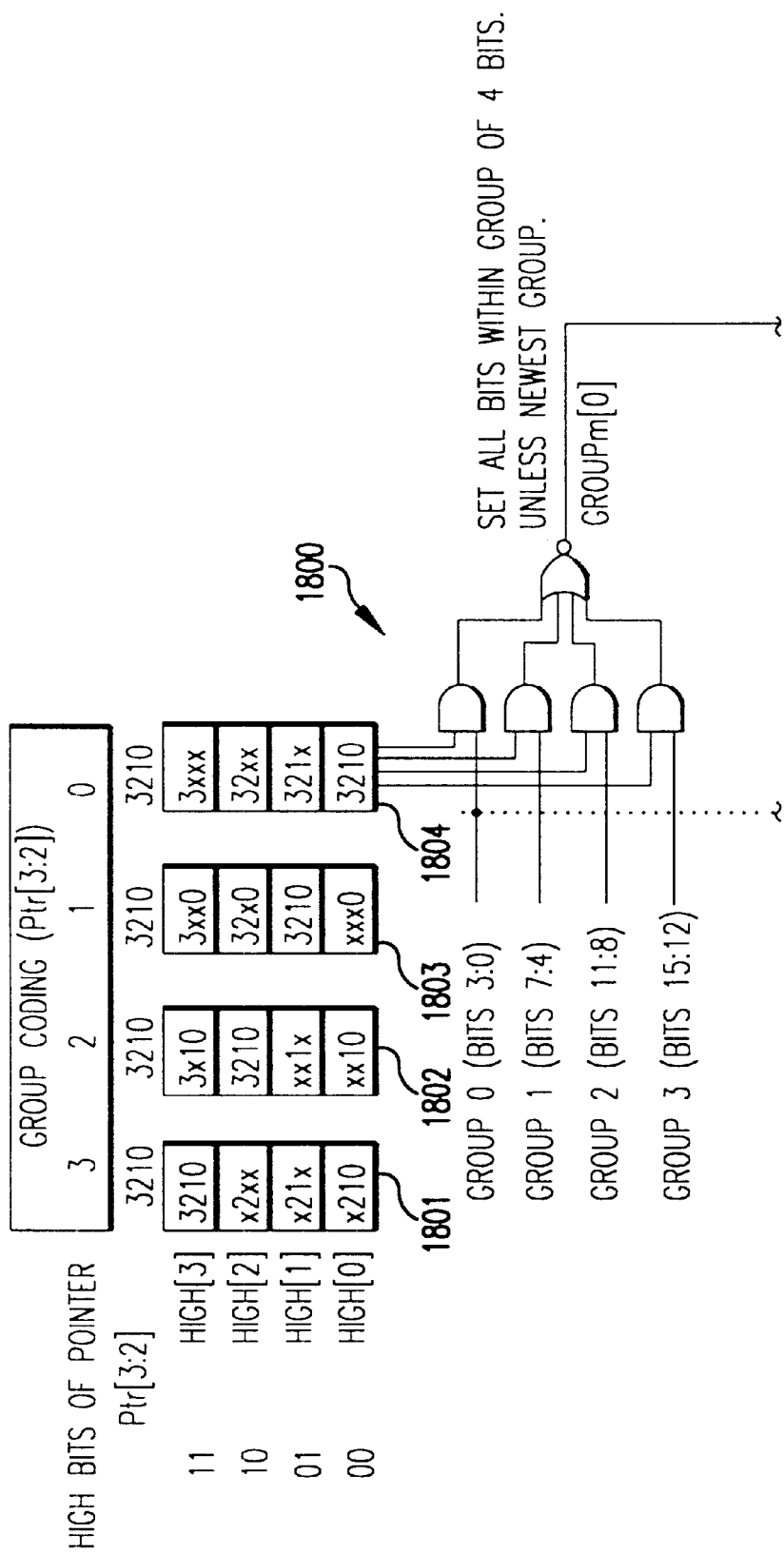
FIGS. 18A and 18B (collectively referred to as "FIG. 18") disclose synchronize mask logic of the address queue.
Figure 18B:
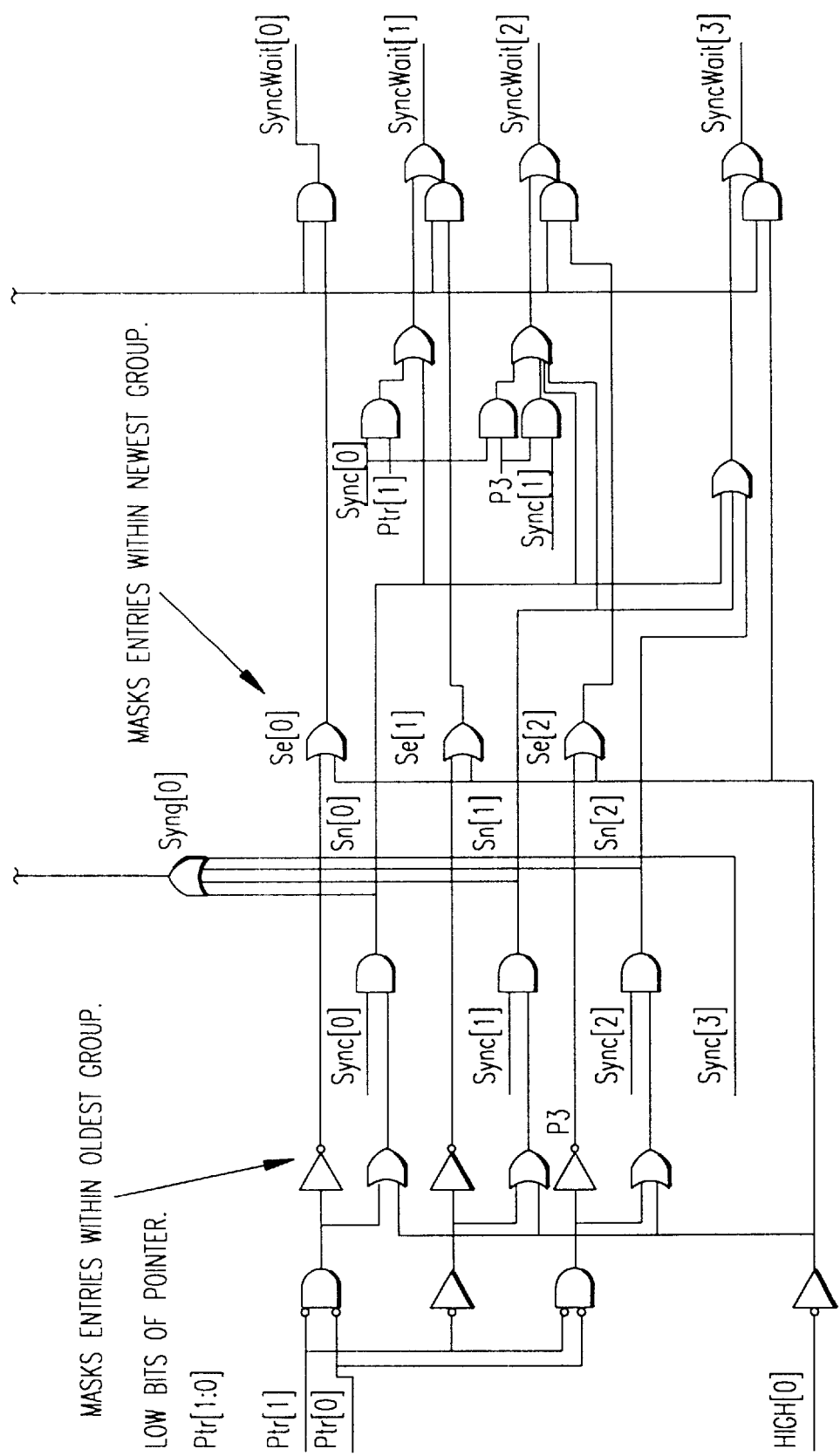

Whenever one or more cache-op instructions are in the address queue 308, they generate a mask which inhibits any subsequent instructions from completing a load instruction, or from requesting a retry access. The logic which generates this mask is illustrated in FIG. 18. This generates a mask which inhibits all entries after a sequential instruction. The 4-bit read pointer "Ptr[3:0]" selects the oldest instruction in the queue. The input "Sync[15:0]" is a 16 bit vector in which a '1' indicates that the entry is a cache-op. This circuit sets a '1' in all bits following the first input bit which is set.

The sixteen entries are divided into four groups of four entries. Each group is implemented with identical logic. The "SyncWait" signal has two inputs. The first input (upper and-or input in drawing) is asserted by any request in the highest group of requests. This group is selected by decoding the upper two pointer bits: RdPtr[3:2]. This group may also contain several of the lowest requests, which are gated off using a bit mask generated from Rdptr[1:0].

Like FIG. 17, the logic 1800 in FIG. 18 implements "Group 0," which contains bits 3 to 0. This logic is replicated four time for 16 bits. Only tables 1801, 1802, 1803 and 1804 change for each group. Ptr[3:0] selects the oldest entry. Sync[3:0] is input and SyncWait[3:0] is output. In tables 1801–1804, a number indicates an enabled (i.e., high) bit while an "x" indicates a disabled (i.e., low) bit.

Figure 19:
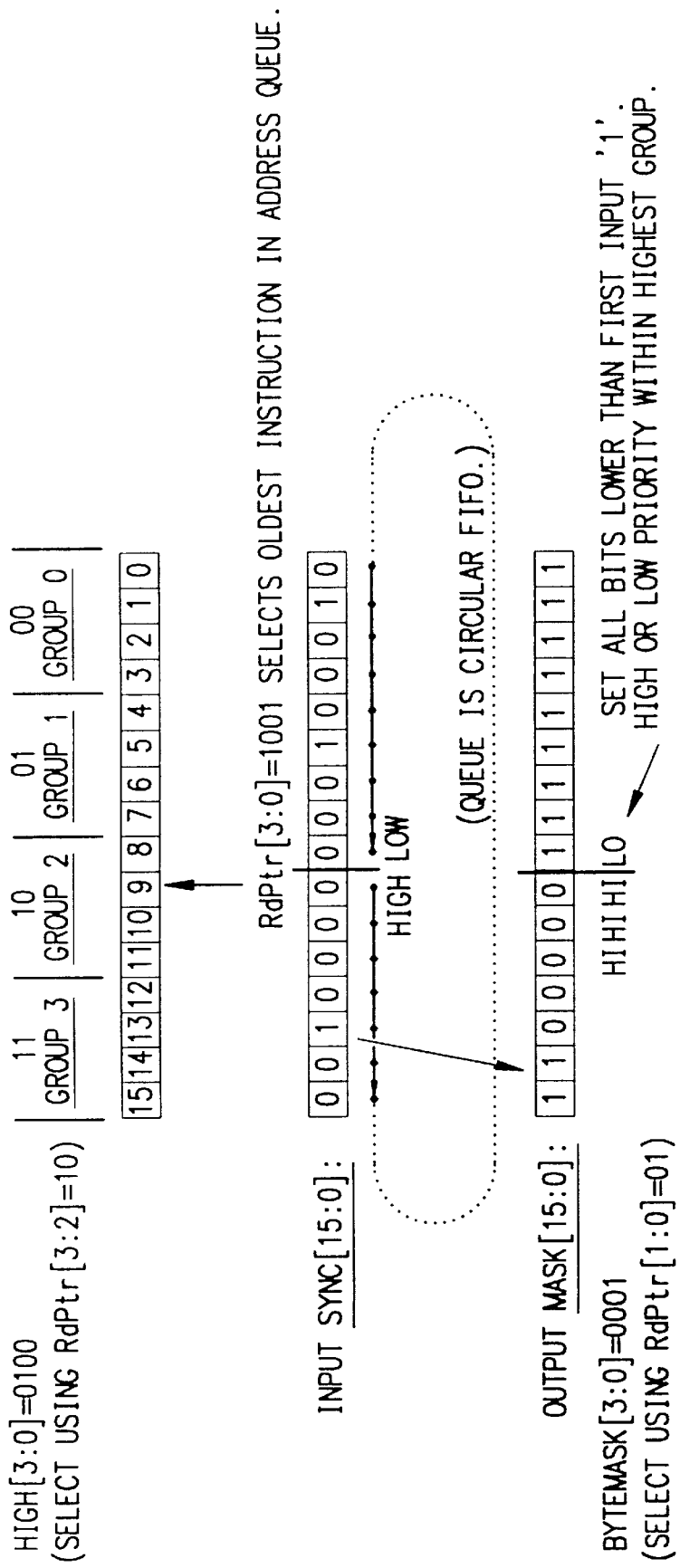
FIG. 19 is an example of a synchronize mask.
Figure 20:
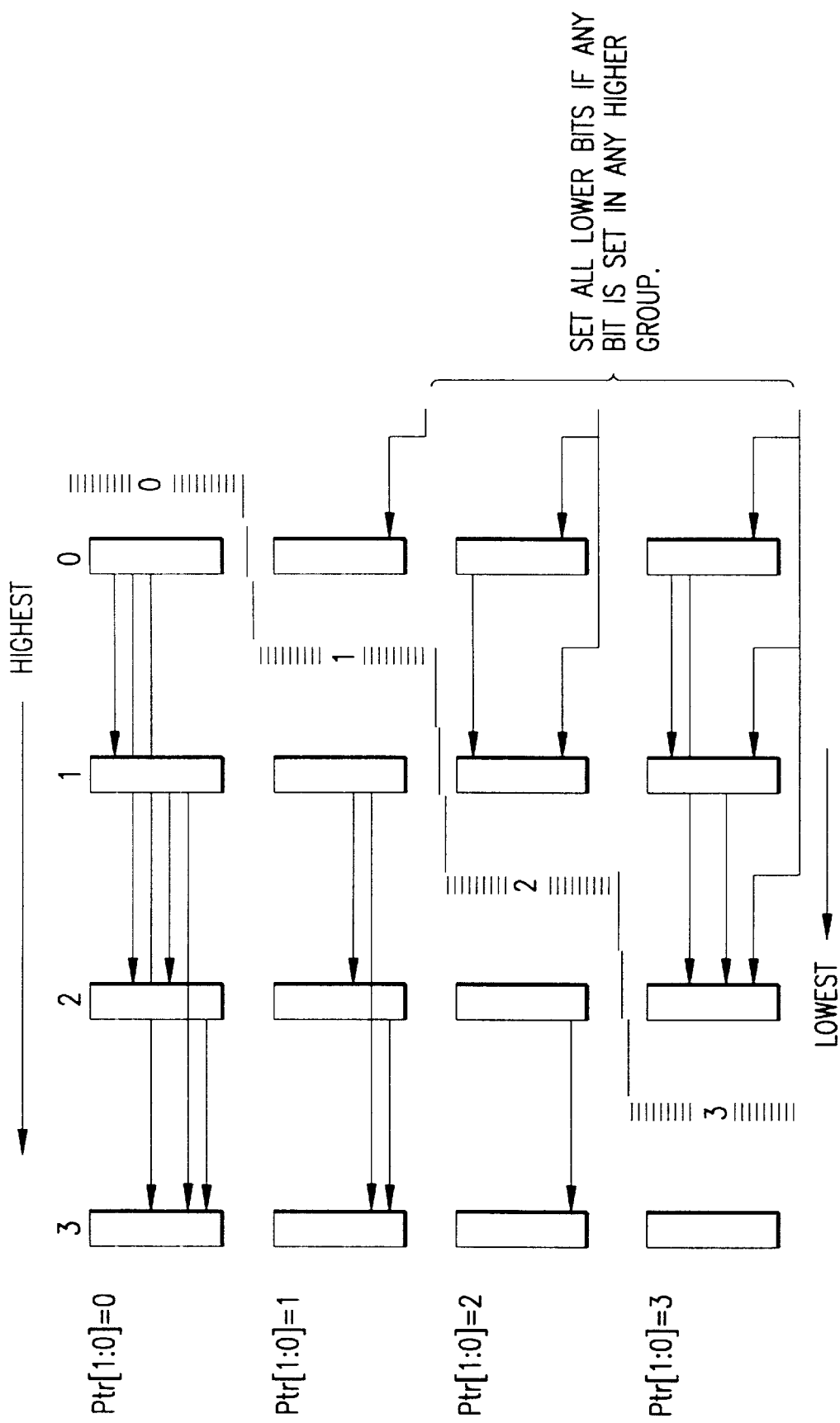
FIG. 20 illustrates a high group within the synchronize mask.

FIG. 19 provides an example of the synchronize mask and FIG. 20 shows how the low pointer bits affect bits within the high group. Specifically, the "high" group contains four entries which may vary between the highest and lowest priority, depending on the low two bits of the pointer. When both pointer bits are zero, all four entries are within the highest group and each can set mask bits for any entry to its left. For other pointers, some entries are within the lowest group. These entries can set mask bits within the lowest, but they cannot set any mask bits for the highest entries. All of the lowest mask bits are set if there is any bit set within any other group.

D. Retry Accesses

1. Access Request Logic

Each entry within the address queue 308 can generate a request to retry its operation. This logic is summarized in Table 5. Signals which are associated with retry accesses have a prefix "Acc...".

TABLE 5

Cache Access Requests (AccComReq)

| Request | 16-bit Select | Description (In order of decreasing priority.) |
|---|---|---|
| UncLd-ReqEn or E0Unc-Load | RdPtrVec [15:0] | Begin an uncached load when it becomes the oldest instruction. Finish an uncached load when data is returned by External Interface. |
| UncStReq | StSel [15:0] | An uncached store instruction needs both the tag and data sections of the |

TABLE 5-continued

Cache Access Requests (AccComReq)

| Request | 16-bit Select | Description (In order of decreasing priority.) |
|---|---|---|
| | | cache. It uses the tag section to send the address to the External Interface. |
| E0-GrantExt | ExtFreeReq [15:0] | A "free load" cycle is requested for a cacheable load instruction, while the cache is refilled from the External Interface. |
| ReqAnyAcc | AccReqMux [15:0] | An entry requests a retry operation for a cacheable instruction. The corresponding section of the data Cache is not being used by External Interface. |
| ~InhibitACalc | AQIssue [15:0] | An access is requested simultaneously with the initial address calculation, except when it is aborted or to re=calculate an address for an exception |
| default | 0 | No requests. |

Uncached Loads: Uncached load instructions are executed in program order. The request signal "UncLdReqEn" is generated when the oldest instruction in the processor is a load instruction whose address has an "uncached" attribute. This instruction is identified by active list 212. This instruction is requested in stage "C0" and is sent to external interface 434 during the tag check cycle in stage "C2". The instruction is limited to be in one stage at a time; new requests are inhibited while a previous request is still in stages "C1" or "C2". This request is always for the oldest entry in the queue, which is selected by queue's read pointer (RdPtrVec).

Uncached Stores: Uncached store instructions send their address to external interface 434 using the cache tag section. Thus, they require the access port of the queue as well as the store port. This request is for the oldest entry which contains a store instruction (StSel). This entry must be one of the oldest four entries within the queue. It is selected by the store logic.

Freeloads: Data may be bypassed directly to the processor, while it is being refilled into the Data Cache. Each refill addresses is compared to all entries during stage "C0". If this address matches any load entry which is in "refill" state, that entry requests a "freeload" access.

Access Requests: Each entry may request an "access retry" cycle, depending on its state and its dependencies on older instructions. It requests either a tag check or a data cycle. Either request is gated by the AccReqEn signal, which is summarized in Table 6.

TABLE 6

Enable Cache Access Requests (AccReqEn)

| Signals | Description |
|---|---|
| AQvActive | Entry is active. (It contains an active instruction.) |
| AQvCalc | Entry's address has been calculated. (Each entry is first issued to the Address Calculation unit to generate and translate its address. Subsequently, it can request a retry.) |
| ~AQvBusyS & ~AQvBusyT | Entry is not in pipeline stage C1 or C2. (An entry can only have one operation in progress at a time.) |
| ~AQvDone & ~AQvExc | No further activity is allowed if an entry has already been completed, or if any exception was detected for it. |
| ~AQvUnc | Cycles for uncached loads, uncached stores, or CacheOp instructions use separate request circuits. |
| ~AQvRef & ~AQvUpg | No requests are made while the queue is waiting for the External Interface to complete a cache refill or upgrade operation. |

Requests are enabled only if the entry is active (determined from the queue pointers), and the address has been calculated. Each entry may have only one operation in the pipeline at a time. Thus, new requests are inhibited if this entry is busy in stages "C1" (S) or "C2" (T). An entry cannot request another cycle after its instruction has been completed ("done"), or it has encountered an exception. Requests are delayed if there is any cache set or store dependency. (Because addresses are calculated out of order, some dependencies appear only until previous addresses have been calculated.)

Requests are inhibited for uncached instructions or Cacheop instructions. These instructions use separate requests, which are described above. Requests are delayed while the entry is waiting for external interface 434 to complete a cache refill (AQvRef) or upgrade (AQvUpg) operation.

Signal AccReqEn enables a "first" tag check. This tag check cycle sets AQvTagCk to indicate that this entry has already tried once. This bit may also be set during the initial address calculation sequence, if a tag check was completed. It is not set if the cache was busy, and the tag check could not be made. It is set if the tag check failed because of a memory dependency, however. This prevents the entry from being continuously retried when it has little chance of success.

If the latest tag check did not set the entry's "hit" bit it can request a tag check cycle again, if it has no cache or store dependency on a previous instruction.

When an entry requests a tag check, it also may use the data section of the cache if it needs it, and if it is available.

If a load instruction sets its "hit" bit, but it has not yet completed, it may request a data-only cycle, if it has no cache or store dependency on a previous instruction.

Address Calculate: If there are no other requests, access is granted to the entry (if any) whose address is being calculated. This provides data access simultaneously with the address translation ("C2" cycle). (Address Calculation logic 418 can use the tag section, if it is not used by a retry access. It does not require the access port to do this, because all the necessary signals come directly from address calculation 418.)

Figure 21:
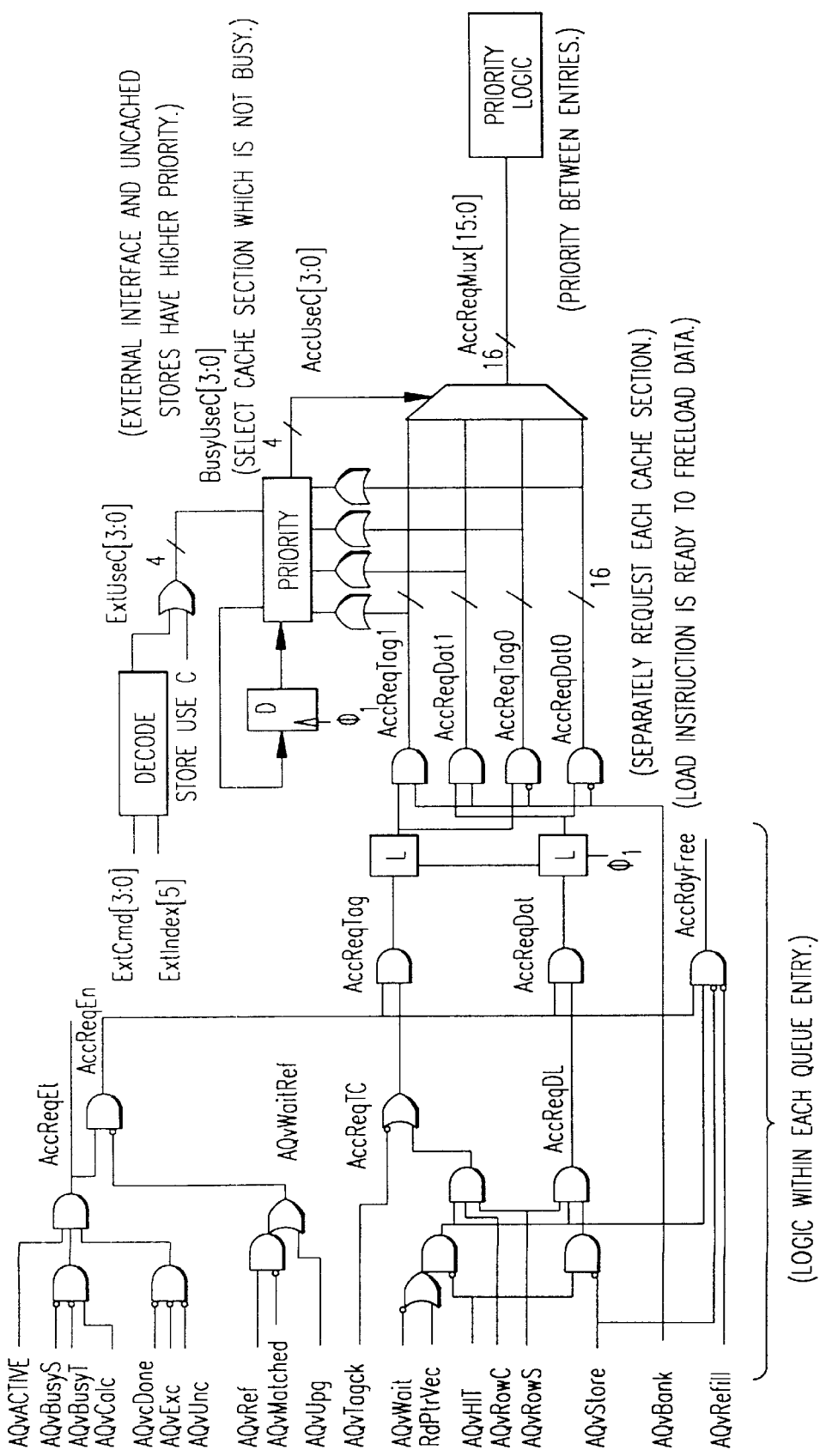
FIG. 21 discloses access request logic of the address queue.

Detailed access request logic 2100 is shown in FIG. 21.

2. Retry Load Hazard

Certain external events could create timing hazards when the Address Queue retries a load instruction which already has a cache "hit". For example, an invalidate operation resets the "hit" bit in the queue for any entry with a matching address. If that entry is already "done", a soft exception must be set.

3. Dependency CAN Logic

Figure 22:
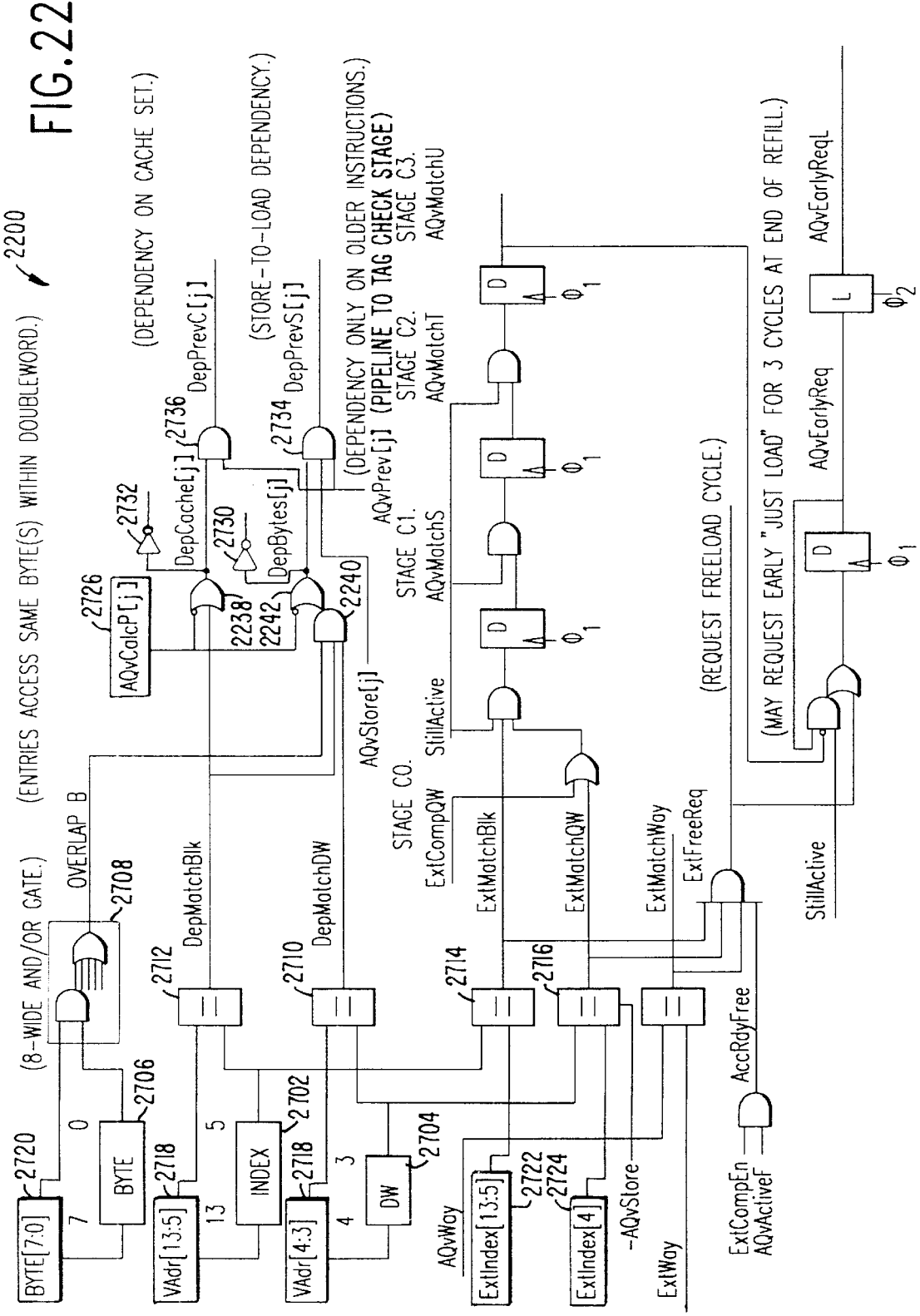
FIG. 22 discloses dependency comparators of the address queue.

Address queue 308 contains the index address field associated with each address entry. The value held in this field is used for, among other things, dependency operations. Implementing logic 2200 is shown in FIG. 22. This logic is discussed in greater detail below in conjunction with FIG. 27, which shows an alternative embodiment of a portion of logic 2200.

The "block match" signal (DepMatchBlk) compares address bits 13:5. This signal is pipelined into stages "C1", "C2", and "C3". If the entry becomes not active, these later signals are inhibited.

The ExtMatch signal generates a request for a free load. It is generated if the entry is ready to do a load (AccReqEt), and its block, doubleword, and way bits match the corresponding bit from external interface 434. This signal sets a LoadReq flipflop, which is normally kept on for three cycles. This allows earlier access to the data.

E. State Changes Within Address Queue

1. Gating of Data Cache Hit signals

Address queue 308 controls when Data Cache Tag logic does a tag check for any entry in the queue. Cache hit or refill can be inhibited by the queue's dependency logic.

If either way is "locked" into cache, that way cannot be selected for replacement.

If either way is "locked" into cache, and the entry has any cache dependency, the other way cannot be used. It is reserved for the oldest instruction which references that cache set. Thus, neither way of the cache may be refilled. The other way is inhibited from generating a cache hit.

Any refill is also inhibited if the external interface intends to use the same cache bank on the next cycle. Whenever a refill is initiated, the new tag must be written into the tag RAM during the next cycle. If this cycle is not available, no refill can occur.

F. Address Queue Timing

Figure 23:
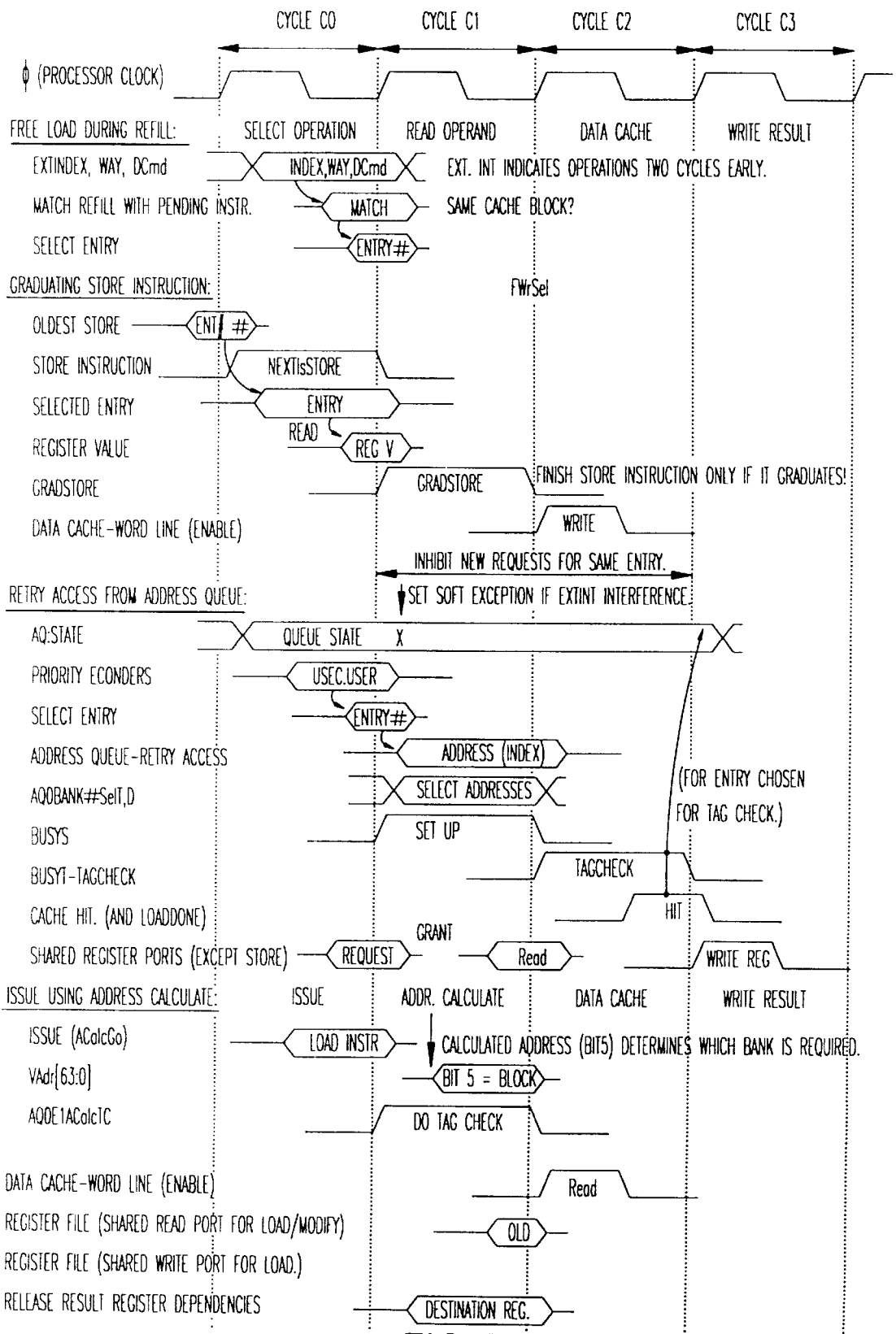
FIG. 23 is an address queue timing diagram.

Address Queue timing is illustrated in FIG. 23.

All cache operations use three pipeline stages. Stage "C0" (or"R") requests access. Stage "C1" (or"S") sets up the address and write data. Stage "C2" (or "T") does reads or writes the tag and/or data arrays during phase 1. Tag checks and data alignment occur during phase 2. For load instructions, a fourth stage ("U") is used to write the result into the integer or floating-point register file.

The "store" sequence requires an initial extra cycle ("CN") to find the oldest store instruction.

1. Address Queue Busy Mask

As mentioned above, address queue operations are pipelined in four 1-cycle steps:

"R" Cycle "C0" Request operation.

"S" Cycle "C1" Set-up cache.

"T" Cycle "C2" Tag check (and/or other cache operations).

"U" Cycle "C3" Update registers.

Each operation is requested during cycle "R" based on the entry's state. Its state is modified at the end of cycle "T", based on the result of the operation. Each entry is limited to a single, non-overlapped operation, so new requests are inhibited during that entry's cycles "S" and "T". These inhibits are implemented using two pipelined busy masks: AQvBusyS[15:0] and AQvBusyT[15:0]. AQvBusyS is set for an entry either when it is issued to address calculation unit 418, or when it is issued for a retry access. Thus, two bits in AQvBusyS may be set simultaneously. These will be distinguished by the state of the AQvCalc bit. AQvCalc is set after the address calculation finishes cycle "T" (regardless of whether it completed a tag check). Thus, AQvCalc is zero for the entry being calculated; it is one for any retry. AQvBusyT is simply AQvBusyS delayed one cycle.

The cache select signals are decoded during "E1" to determine which request generated either a tag check or data load cycle.

AccDoesTCN Instruction from address queue 308 will do tag check during next cycle.

AccDoesLdN Instruction from address queue 308 will do data load during next cycle.

ACalcDoesTCN Instruction from address calculation unit 418 will do tag check during next cycle.

ACalcDoesLdN Instruction from address calculation unit 418 will do data load during next cycle.

These signals are delayed one cycle, for use during the data cache access. (For this cycle, omit the postfix "N" from the signal mnemonics.)

The entry being tag checked is identified using AQvBusyT during a tag check cycle. If the tag check was issued as a retry, there is only a single operation, and the mask has only one bit set. Otherwise, the tag check used the entry with AQvCalc zero.

III. ADDRESS STACK

Address stack 420 (FIG. 7) is logically part of address queue 308, but is physically separate due to layout considerations. The address stack contains the physical memory address for each instruction in address queue 308. This address consists of two fields, the physical page number (RAdr[39:12]) and the virtual index (VAdr[13:0]). These fields overlap by two bits because data cache 424 is virtually indexed (i.e., virtual bits [13:3] select a data doubleword in the data cache) but physically tagged (i.e., cache tags store physical address bits RAdr[39:12]).

The translated real address (i.e., RAdr[39:12]) is latched from TLB 422 (FIG. 7). The low 12 bits of the real address equal corresponding bits of the virtual address Vadr[11:0].

The low 14 bits of the virtual address (i.e., VAdr[13:0]) are latched from the calculated address. These bits select a byte within the data cache array. The low 12 bits are an offset within the smallest virtual page. and are not modified by TLB 422.

Address stack includes additional information such as "access byte mask" (indicating which of the eight bytes of the accessed doubleword are read or written), "access type" (indicating which type of instruction is being executed; i.e., load, store, etc.) and "reference type" (indicating the length of the operand.

The address stack is loaded during the address calculation sequence (FIG. 11). Thus, it has a single write port. It has two read ports. A "stack" port is used when address queue 308 retries an operation. A "store" port is used when a store instruction is graduated.

IV. MEMORY DEPENDENCY

This logic is implemented in address queue 308; associated with segment 515 shown in FIG. 7.

A. Memory Dependency Checks

Load and store instructions are decoded and graduated in program order. However, to improve performance, memory operations to cacheable addresses may be performed out of order, unless there is a memory dependency. There are two types of dependency. First, a true memory dependency exists between a load instruction and any previous store which altered any byte used by the load. Second, accesses to the same cache set may be delayed by previous accesses to other addresses which share that set. This is an implementation dependency which prevents unnecessary cache thrashing. It is also necessary for proper operation of the dependency check procedure.

In a cache, a "set" is the group of blocks selected by each index value. In a direct-mapped cache, this index selects a set consisting of a single block. In an "n-way" set-associative cache, this index selects a set of "n" blocks. Cache addressing is described above in Section II.C.

Although memory loads are performed out of order, processor 100 appears (to a programmer) to have strong memory ordering. It detects whenever strong ordering might be violated, and backs up and re-executes the affected load instruction.

Accesses to non-cacheable addresses are performed in program order, when the corresponding instruction is about to graduate. All previous instructions have been completed, so no dependency check is needed. This is discussed below.

Memory dependencies are resolved within the address queue 308. A dependency may exist whenever two real addresses access the same cache set. Dependency checks must use real rather than virtual addresses, because two virtual addresses can be mapped to the same real address. For timing and cost reasons, however, the 40-bit real addresses are not directly compared. Instead, dependencies are detected in two steps.

Address queue 308 contains two 16-row by 16-column dependency matrixes. These matrixes are identical, except for the logic equations defining how bits are set. "Cache Dependency Matrix" 2400, shown in FIG. 24, keeps track of all previous entries which use the same cache set. "Store Dependency Matrix" 2450, also shown in FIG. 24, keeps track of all dependencies of load instructions on previous store instructions. Because store dependencies exist only between operations on the same doubleword (i.e., all memory accesses are within doublewords), bits set in store matrix 2450 are always a subset of those set in cache matrix 2400. The operations of store matrix 2450 and cache matrix 2400 are illustrated in FIGS. 25a and 25b, respectively.

In the first step of a dependency check, a 9-bit cache index (VAdr[13:5]) is associatively compared to each entry in address queue 308 (i.e., segment 516 of FIG. 7). This identifies all previous entries to the same cache set. This comparison occurs while the virtual address (VAdr[13:0]) is written into stack 420 at the end of the address calculate cycle. Each matching entry is flagged by setting a corresponding dependency bit in cache matrix 2400. (At about the same time, VAdr[4:3] and a byte mask derived from VAdr [2:0] are also associatively compared to each entry in address queue 308. This comparison, combined with additional signals described below, enables the setting of a corresponding dependency bit in store matrix 2450.)

Second, the translated real address (RAdr[39:12]) is associatively compared to the data cache address tags. If there is a hit on the same side (i.e., way) of the cache, the new address selects the same cache block. If there is a miss, the cache block must be refilled before all dependencies can be resolved. This tag check cycle usually occurs one cycle after the address calculation, but it may be delayed if the data cache is busy.

1. Dependency Checking if Virtual Coherency

The dependency circuit must function properly even if the program uses virtual aliases. A virtual alias occurs if two different virtual addresses are translated to the same real address. Aliases must be considered, because associative comparator uses two virtual address bits (VAdr[13:12]) as part of the translated real address. (The lower bits (11:5) are part of the page offset, which is the same in the virtual and real addresses.) If aliases differ in these bits, the dependency logic will mistake them for distinct real addresses, and will fail to detect any dependencies between them. However, Secondary Cache 432 stores the two "primary index" bits (PIdx; i.e., VAdr[13:12]) and generates a "Virtual Coherency" exception if a different index is used. That instruction will be aborted with a soft exception, so any dependency does not matter.

2. Cache Block Dependencies

Memory dependencies are resolved by comparing cache indexes and using the cache hit signals. This method requires that each address be brought into the data cache before all dependencies can be resolved. Once an instruction has used a cache block, that block must remain in the cache until that instruction has graduated. Although the processor does not invalidate any block that is still in use, external interface 434 may. If it invalidates a block which has been used to load a register before the load instruction has graduated, that instruction is flagged with a soft exception (described above) which will prevent it from being completed.

Data cache 424 is 2-way set associative. That is, it can store two independent blocks in each cache set. One of these blocks may be used for out-of-order operations. The second block must be reserved for in-order operations within that cache set. This guarantees that the processor can complete instructions in order without having to invalidate any block while it is still in use.

If a third block is needed, there is no room to bring that block into the cache. So that instruction and all subsequent accesses to this set must be delayed until all previous accesses to this set have graduated.

3. Load Dependency on Previous Stores

Whenever data is stored and then loaded from the same location, the load must get the newly stored data. A memory dependency exists between a load and a previous store if:

a. Both reference the same cache block (i.e., the dependency bits indicate the same cache set;

the load must have a cache hit on the same way as the store);

b. Both reference the same doubleword (i.e., address bits 4:3 are equal) and;

c. The byte masks have at least one byte in common.

Memory dependencies at the block level are detected during tag check cycles, because the cache hit signals are required to determine the selected way (which identifies the selected block).

The remaining information necessary to determine a block-level load dependency on a previous store is represented by the dependency bits in store matrix 2450, which are set based exclusively on virtual addresses. These dependency bits identify store-to-load dependencies based upon common cache set and doubleword addresses (i.e., VAdr [13:3]) and byte overlap (discussed below).

Referring to FIG. 25a, a store dependency mask 2501a of entry 2502a is used to select previous store entries #1, #2 and #3. Each selected entry (i.e., #1–#3 in this case) detects a store dependency if it has the same set, doubleword, and any of the same bytes identified in a byte mask (described below). Otherwise, the corresponding dependency bit is reset. A load instruction may be dependent on several stores; it must wait until all have graduated.

Referring again to FIG. 25a, a newly calculated virtual address and byte mask 2502a from an instruction input into address queue 308 is shown being loaded into entry #4. As represented by line 2503a, this value is compared with every index, doubleword and byte mask entry (i.e., entries #0–#7) in address queue 308 via comparators 2504a–2511a. However, only those entries identified through mask 2501a to be associated with store instructions (i.e., store entries) that are "previous" to entry #4 may be used to alter the dependency bits of entry #4. Accordingly, resulting comparison "states" 2512a, 2513a and 2514a associated with previous store entries #1–#3 may be used to set dependency bits 2520a, 2518a and/or 2516a in matrix 2500a if entry #4 is dependent on (i.e., has the same set, doubleword and any of the same bytes as) entries #1, #2 and/or #3, respectively. Alternatively, if the address of any previous store entry (i.e., #1–#3) has not yet been calculated, the dependency bit in entry #4 is set as a default, which can be reset when this earlier address is ultimately calculated.

Entries #5 and #6 contain later instructions that may depend upon entry #4. If, for example, the address of entry #5 is calculated before entry #4, bit 2522a of entry #5 will be set if entry #4 is a store entry. Although the address of entry #4 is not yet calculated, store dependency matrix 2500a follows a procedure that presumes dependency of earlier, uncalculated store instructions until such presumption is proven false. Accordingly, bit 2522a may be reset when the address of entry #4 is actually calculated. Of course, if entry #5 is calculated after entry #4, the standard operation described above controls.

For clarity, matrix 2500a shows only eight of the sixteen rows and columns present in the store-to-load dependency matrix of the preferred embodiment.

Address queue 308 uses somewhat simplified decoding for determining byte masks. It classifies each instruction by length—byte, halfword, fullword, or doubleword. The utilized bytes are identified in an 8-bit byte mask (doubleword contains 8 bytes) generated by address calculation unit 418. For simplicity, "Load Word/Doubleword Left/Right" instructions are treated as if they used the entire word or doubleword, even though some bytes may not be needed. These instructions are infrequently used in normal code, so this has negligible impact on performance. Byte masks generated from available combinations of instruction length and VAdr[2:0] values are illustrated in Table 7.

These checks cannot be completed if any previous store has not had its address calculated yet. In such case, the load will remain dependent on the previous store until the address of the store is calculated. If the new address selects the same cache set, the load will wait until the store instruction has graduated. Otherwise, the associated dependency bit is reset and the load can proceed as soon as all remaining dependency bits are reset.

4. Dependency Checks When Loading Addresses

Virtual address bits VAdr[13:0] are loaded into an entry in both address queue 308 and the address stack 420 (FIG. 7) during the second half of each address calculate cycle. (These bits are duplicated due to layout considerations for processor 100.) At the same time, the "index" address bits VAdr[13:5] are associatively compared to every other entry. These comparators define the initial value for the dependency bits in the cache-set dependency matrix 2400. This dependency check is based solely on the cache index, because the cache hit signals are not yet known. Usually, the next cycle does a tag check which determines the cache hit signals. However, it may be delayed due to tag update cycles or external intervention.

When loading an address for entry "n" into address stack 420, its fifteen dependency bits (i.e., Dep[n][k=0 . . . 15, k≠n]) of dependency matrix 2400 are set using the following method. As noted above, the cache "index" is bits VAdr [13:5]. Each dependency bit Dep[n][k] is set high (i.e., to a logic "1") when:

(1) Entry "k" contains an instruction previous to entry "n" (as defined by the cache dependency mask); and (2) The address for entry "k" has not been computed or index[n]=index[k].

The dependency bit of a previously calculated entry "k" may be reset. This dependency bit was previously set because the new entry's address had not previously been calculated. If entry "k" has index[k]≠index[n], then reset Dep[k][n]. (Note reversal of subscripts on Dep.)

FIG. 25b shows an example of newly calculated index 2502 (i.e., VAdr[13:5]) being loaded into entry #4. As represented by line 2503b, this value is compared with every index entry (i.e., entries #0–#7) in address queue 308 via comparators 2504b–2511b. However, only those entries

TABLE 7

Byte Masks

| Instruction | | Length | VAdr[2:0] | 8-bit Byte Mask (Little Endian) | | | | | | | | Instruction Abbreviations |
|---|---|---|---|---|---|---|---|---|---|---|---|---|
| | | | | 7 | 6 | 5 | 4 | 3 | 2 | 1 | 0 | |
| LB | SB | Byte | 000 | 0 | 0 | 0 | 0 | 0 | 0 | 0 | 1 | L: Load |
| | | | 001 | 0 | 0 | 0 | 0 | 0 | 0 | 1 | 0 | S: Store |
| | | | 010 | 0 | 0 | 0 | 0 | 0 | 1 | 0 | 0 | B: Byte |
| | | | 011 | 0 | 0 | 0 | 0 | 1 | 0 | 0 | 0 | |
| | | | 100 | 0 | 0 | 0 | 1 | 0 | 0 | 0 | 0 | |
| | | | 101 | 0 | 0 | 1 | 0 | 0 | 0 | 0 | 0 | |
| | | | 110 | 0 | 1 | 0 | 0 | 0 | 0 | 0 | 0 | |
| | | | 111 | 1 | 0 | 0 | 0 | 0 | 0 | 0 | 0 | |
| LH | SH | Halfword | 00X | 0 | 0 | 0 | 0 | 0 | 0 | 1 | 1 | H: Halfword |
| | | | 01X | 0 | 0 | 0 | 0 | 1 | 1 | 0 | 0 | |
| | | | 10X | 0 | 0 | 1 | 1 | 0 | 0 | 0 | 0 | |
| | | | 11X | 1 | 1 | 0 | 0 | 0 | 0 | 0 | 0 | |
| LWR | SWR | Word | 0XX | 0 | 0 | 0 | 0 | 1 | 1 | 1 | 1 | W: Word |
| LWL | SWL | | 1XX | 1 | 1 | 1 | 1 | 0 | 0 | 0 | 0 | R: Right |
| LW | SW | | | | | | | | | | | L: Left |
| LWC1 | SWC1 | | | | | | | | | | | C1: Coprocessor 1* |
| LD | SD | Doubleword | XXX | 1 | 1 | 1 | 1 | 1 | 1 | 1 | 1 | D: Doubleword |
| LDC1 | SDC1 | | | | | | | | | | | |
| LDL | SDL | | | | | | | | | | | |
| LDR | SDR | | | | | | | | | | | |

*Coprocessor 1 (i.e., floating point operations)

identified through mask 2501b to be "previous" instructions to entry #4 may be used to alter the dependency bits of entry #4. Accordingly, resulting comparison "states" 2512b, 2513b and 2514b associated with previous entries #1–#3 may be used to set dependency bits 2520b, 2518b and/or 2516b in matrix 2500b if entry #4 is dependent on (i.e., uses the same set as) entries #1, #2 and/or #3, respectively. Alternatively, if the address of any previous entry (i.e., #1–3) has not yet been calculated, the dependency bit in entry #4 is set as a default, which can be reset when this earlier address is ultimately calculated.

Entries #5 and #6 contain later instructions that may depend upon entry #4. If, for example, the address of entry #5 is calculated before entry #4, bit 2522b of entry 5 will be set. Although the address of entry #4 is not yet calculated, dependency matrix 2500b follows a procedure that presumes dependency of earlier, uncalculated instructions until such presumption is proven false. Accordingly, bit 2522b may be reset when the address of entry #4 is actually calculated. Of course, if entry #5 is calculated after entry #4, the standard operation described above controls.

For clarity, matrix 2500b shows only eight of the sixteen rows and columns present in the cache-set dependency matrix of the preferred embodiment.

5. Dependency Checks During Tag Check Cycles

Dependency is determined during tag check cycles using cache hit signals, and the state and dependency bits within the address stack 420, as shown in FIG. 26. This figure lists all legal combinations of input bits, which are not completely independent of each other. By means of explanation, abbreviations used in the figure are defined below:

"-": "don't care" for inputs, "no action" for outputs;
"D": cache block dependency (i.e., a previous entry uses the same cache set);
"L": indicates a store-to-load dependency, or possible dependency if previous store address not yet calculated;
"S": bit is set;
"C": bit is set conditionally, only if there is no store-to-load dependency ("L"=0);
Cache State: valid (V), refilling (R), not valid (N), valid or refilling (E); available (not refilling) (A).

Each entry includes five bits which indicate cache hit information. The two "Lock" bits (LockA and LockB) indicate that the subject entry is using the first (random order) block within the cache set, for either side A or B (i.e., way 0 and 1, respectively). This block is locked into the cache until all entries which use it have graduated. If new entries get a hit on a locked block, they will use it and set their corresponding lock bit.

The two "Use" bits (UseA and UseB) indicate that this entry is using the second (sequential order) block within the cache set, for either side A or B. This block is locked into the cache until this entry has graduated. Then this block may be replaced, if necessary, by the next sequential entry to access this cache set. If new entries get a hit on a "use" block, they cannot use it.

The "Dependency" signal indicates that this entry is dependent on a previous entry.

For each cache cycle scheduled by the processor, the corresponding entry in address stack 420 is read. This provides the address and dependency information.

The procedure must identify all entries which use the same cache set so it can determine if any block has already been locked. This identification uses the dependency bits held in dependency cells 3004a in matrix 2400 (FIG. 24) to select all other entries with the same index, or whose addresses have not yet been calculated. Bits in both the row and column are used. For entry #n, row bits Dep[n][j] identify which other entries (#j) this entry is dependent on. Column bits Dep[j][n] identify other entries which are dependent on this entry. These bits include uncalculated entries—which are reset when the address is calculated if it selects another cache set.

Before any cache block has been locked, every entry is dependent on, or depended on by, each other entry using the same cache set. When a block is locked, its dependency bits are no longer needed for sequencing. Instead, they simply identify all other entries using the same cache set. Thus, whenever any other entry selects the same set, it knows that the block is locked.

The dependency bits identify every entry which uses the same cache set, by logically ORing row and column bits. The row (bits within each entry) identify other entries on which this entry is dependent. The column identifies entries which are dependent on this entry. More specifically, the row and column dependency bits form 16-bit numbers which are ORed in a bit-wise fashion. Accordingly, the result is a single 16-bit number (i.e., mask) with a "1" in each position corresponding to an entry using the same cache set. This number is used to read lock/use array 2404, illustrated in FIG. 24.

Specifically, each bit that is set (i.e., a logic 1) in the foregoing 16-bit number (i.e., mask) enables the reading of LockA, LockB, UseA and UseB bits associated with that entry. Thereafter, all LockA bits are ORed together (i.e., column 2460) generating a single LockA value for the associated cache set. Similarly, all LockB bits (column 2462), UseA bits (column 2464) and UseB bits (column 2466) are separately ORed to generate a single value for each status bit of the associated cache set. These bits indicate current activity on this cache set.

B. Dependency Logic

Figure 24:
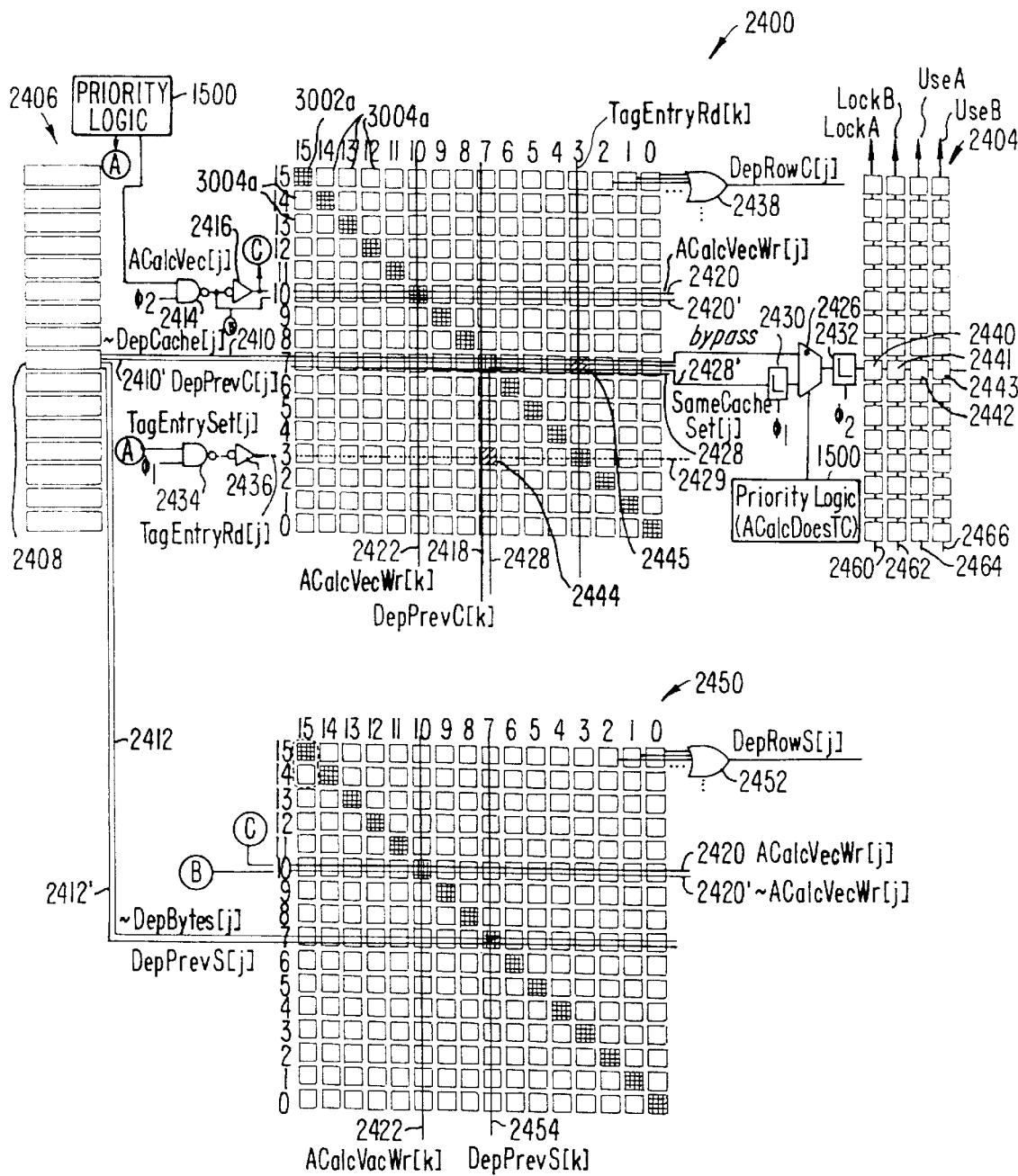
FIG. 24 discloses dependency matrixes in the address queue.
Figure 25A:
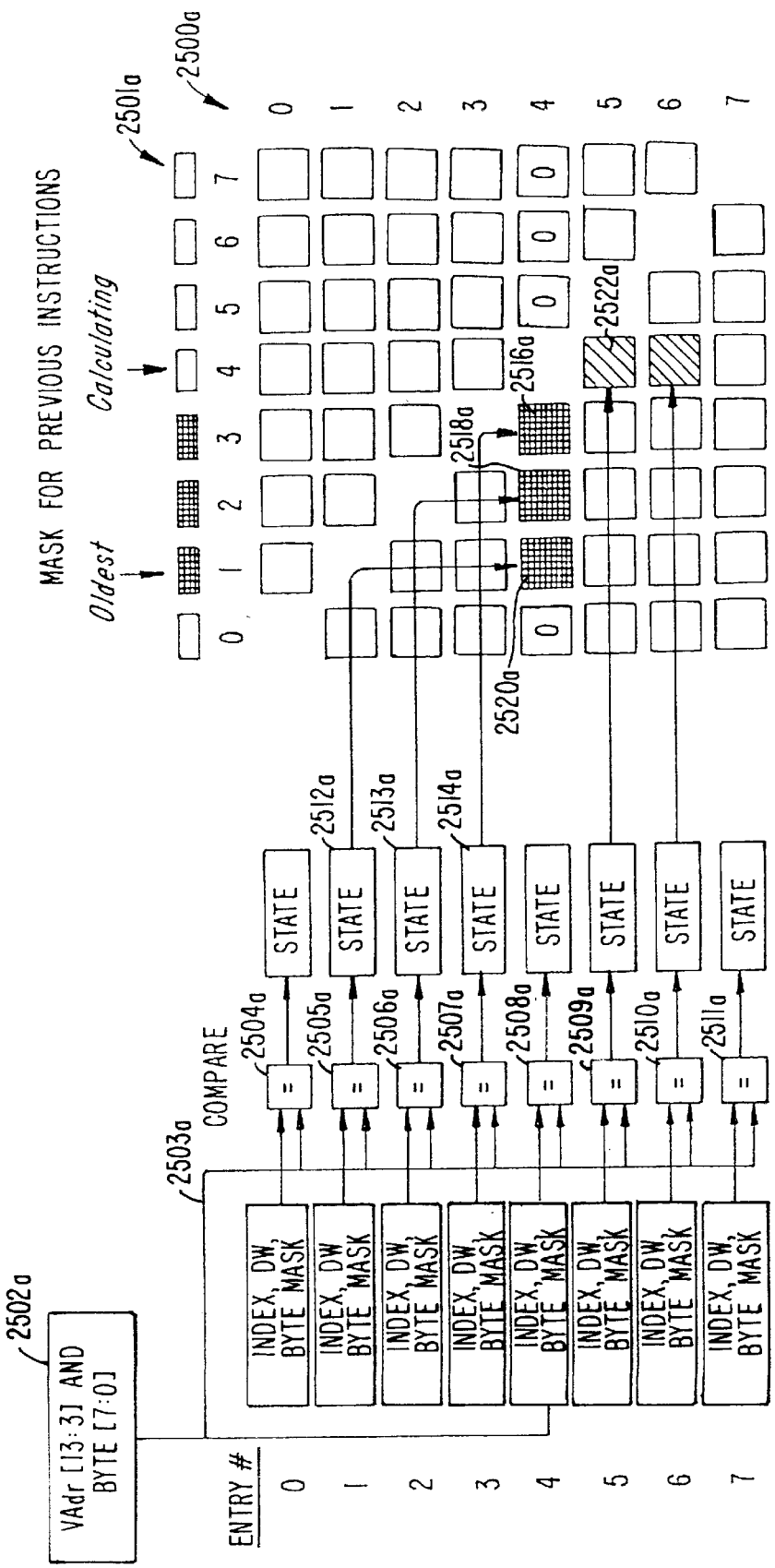
FIGS. 25a and 25b disclose dependency matrix operation in the address queue.
Figure 25B:
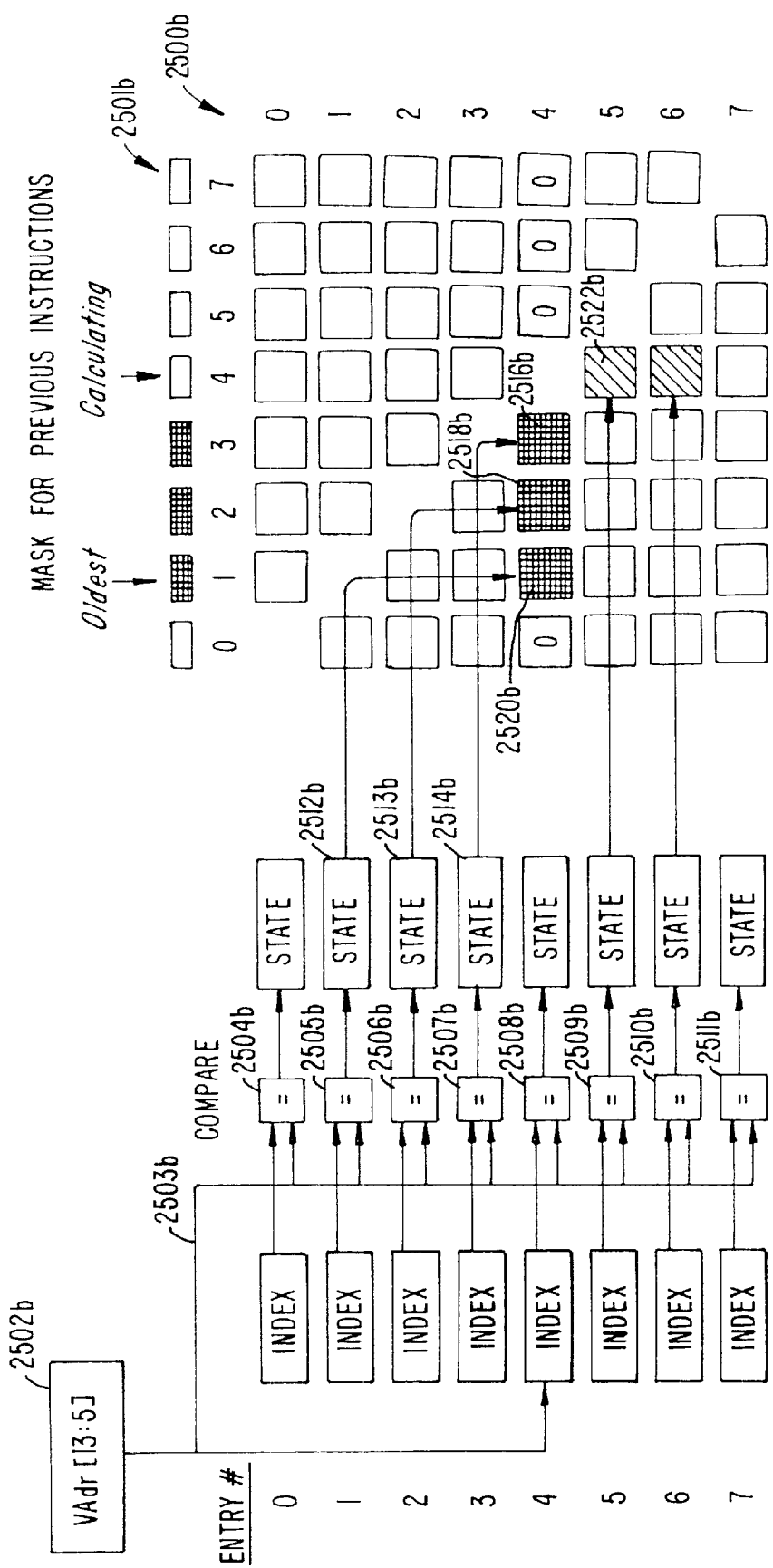

FIG. 24 shows dependency matrix 2400 and 2450 disposed in address queue 308. In the preferred embodiment, these two matrixes are configured in a single array because they share many signals. (This is discussed further in connection with FIG. 33.) Matrixes 2400 and 2450 are shown separately, however, for clarity.

Referring again to FIG. 24, a set of comparators 2406 identifies dependencies for recording in each matrix, and an array of lock and use bits 2404 describe activity for each active cache set. ~DepCache[j] and DepPrevC[j] signals forwarded to matrix 2400 indicate cache set dependencies while ~DepBytes[j] and DepPrevS[j] signals forwarded to matrix 2450 indicate store-to-load dependencies. (NB: a tilde (i.e.,~) placed in front of a signal name indicates a complemented value.) Each comparator in set 2406 is coupled to matrixes 2400 and 2450, like comparator 2408 (i.e., there are sixteen ~DepCache[j], DepPrevC[j], ~DepBytes[j] and DepPrevS[j] lines between comparator set 2406 and matrixes 2400 and 2450). Only a single connection is shown for purposes of discussion.

Generally, signals ~DepCache[j] and ~DepBytes[j] identify matching addresses. At the same time, signals DepPrevC[j] and DepPrevS[j] function as masks 2501b and 2501a, respectively (see FIGS. 25b and 25a).

~DepCache[j] signal on line 2410 in conjunction with DepPrevC[j] on line 2410' indicate whether any dependency exists between an index address (i.e., cache set) stored in comparator 2408 and an address being newly calculated (i.e., "cache-set" dependency). Similarly, ~DepBytes[j] signal on line 2412 in conjunction with DepPrevS[j] on line 2412' indicate whether any dependency exists between an entry stored in comparator 2408 and an address being newly calculated based on byte overlap (i.e., store-to-load dependency). In FIG. 24, a newly calculated address is at entry 10; identified by the ACalcVec[j] signal. This signal is gated by phase 2 of the processor clock (i.e., φ2) through NAND gate 2414 thereby generating ~ACalcVecWr[j] on line 2420'. ~ACalcVecWr[j] passes through inverter 2416 thereby generating ACalcVecWr[j] on line 2420. As shown in FIG. 24, these signals are applied to both matrix 2400 and 2450 over lines 2420 and 2420'.

Signal ACalcVec[j] identifies a newly calculated entry. Resulting signals ACalcVecWr[j] and ~ACalcVecWr[j] enable initial dependencies to be written into the corresponding row. As discussed below, signal ACalcVecWr[j] also provides a means for resetting dependency bits in other rows which erroneously indicate a dependence on this entry (i.e., through line 2422). Signal ACalcVec[j] is generated by priority logic 1500 (FIG. 15).

Referring to FIG. 15 and Section II.C.4 above, address queue 308 prioritizes three sets of requests that compete for queue resources: freeload, retry access and address calculate. These three sets of requests are combined into a single set at the end of cycle C0 (i.e., "AccComReq"), and the highest priority request in the combined set is granted by a dynamic priority encoder at the beginning of cycle C1. If an address calculate request is granted for a particular entry in address queue 308, priority logic 1500 generates a 16-bit mask with a single set bit (logic 1) identifying the single entry whose address is being calculated (i.e., ACalcVec[j]) and fifteen reset bits (logic 0) associated with the remaining entries whose addresses are not being calculated.

Referring to matrix 2400 in FIG. 24, the ~DepCache[j] signal on line 2410 and DepPrevC[j] on line 2410' pass through every cell in row 7. (As shown in FIG. 24, and discussed below, a row component of read bit line 2428 (i.e., ~DepCRead[j]) and a combined read bit line 2428' (produced from row and column components of line 2428) also pass through row 7.) ~DepCache[j] and DepPrevC[j] are logically combined and the result (DepPrevC[k]) is passed through every cell in column 7, as indicated by line 2418. (The logical combination is described below in connection with FIG. 30a.) Concurrently, ACalcVecWr[j] and ~ACalcVecWr[j] provide a pulse (when ACalcVec[j] and φ2 are high) to all cells in row 10 of matrix 2400, as shown by lines 2420 and 2420'. (Additionally, ACalcVecWr[k]— which is the same signal as ACalcVecWr[j]—is conveyed to all cells in column 10, as shown by line 2422.) If entry 10 is dependent on previous entry 7, dependency bit at row 10, column 7 is set through the combination of signals on lines 2418, 2420 and 2420'. (This combination is discussed below in connection with FIG. 30a.)

Referring to matrix 2450 in FIG. 24, the ~DepBytes[j] signal on line 2412 passes through every cell in row 7. This same signal is logically combined with DepPrevS[j] on line 2412', and the result (DepPrevS[k]) is passed through every cell in column 7, as indicated by line 2454. (The logical combination is described below in connection with FIG. 30b.) Concurrently, ACalcVecWr[j] and ~ACalcvecwr[j] provide a pulse (when ACalcVec[j] and φ2 are high) to all cells in row 10 of matrix 2450, as shown by lines 2420 and 2420'. (Additionally, ACalcVecWr[k]—which is the same signal as ACalcVecWr[j]—is also conveyed to all cells in column 10, as shown by line 2422.) If entry 10 is dependent on previous entry 7, dependency bit at row 10, column 7 is set through the combination of signals on lines 2454, 2420 and 2420'. (This combination is discussed below in connection with FIG. 30b.)

Any entries calculated prior to the newly calculated entry (i.e., entry 10 in this example) in matrixes 2400 and 2450 that could possibly depend on this entry will have previously set their dependency bit associated with this entry (i.e., bit 10) to a logic 1. As noted above, this is a default value when the earlier address is unknown. However, once the previously uncalculated entry is calculated, defaulted bit values may be reset if no dependency in fact exists. Referring to FIG. 24, line 2422 enables bit values located in column 10 of matrixes 2400 and 2450 to be reset if the associated row had previously been calculated. In other words, the ~DepCache[j] signals associated with each row j in matrix 2400 and the ~DepBytes[j] signals associated with each row j in matrix 2450 indicate whether or not a dependency exists. Each such signal is combined with the signal on line 2422 (i.e., ACalcVecWr[k]) to reset the corresponding bit 10 if no dependency exists. (This combination is discussed below in connection with FIGS. 30a and 30b.) Set bits in matrix 2400 are used for, among other things, reading lock/use array 2404.

For purposes of reading array 2404, ~Depcache[j] signal on line 2410 is forwarded to a complemented input of MUX 2426 as a bypass to the array. A second input to MUX 2426 is provided by read bit line 2428, which contains both a row and a column. (Each read word line (e.g. line 2429) and read bit line (e.g., line 2428) in matrix 2400 contain both a row and a column.) More specifically, readline 2428 is constructed from corresponding ~DepCRead[j] and ~ColumnC [k] values (signals internal to matrix cells) and enabled by a TagEntryRd[j] signal (discussed below in connection with FIGS. 30a and 30c). These values are combined into a single signal (i.e., SameCacheSet[j], see FIGS. 30a and 30c) and forwarded to MUX 2426 via latch 2430, as represented by combined read bit line 2428' in FIG. 24. Latch 2430 is gated by phase 1 of the processor clock (i.e., φ1). The MUX outputs a signal to lock/use array 2404 (through latch 2432 gated by φ2). This output value enables the reading of lock or use bits 2440–2443.

As noted above, dependency checking requires a two-step operation; i.e., comparing virtual address information in dependency matrixes (i.e., matrix 2400 and 2450) and comparing an associated translated real address with data cache address tags. In the course of the latter operation, the status of an accessed cache set is determined by reading any lock or use bits (held in array 2404) set by other entries accessing the same cache set.

Referring to FIG. 24, if the same entry is undergoing both steps of the dependency checking operation at the same time (i.e., virtual and real address comparing), signal ACalcDoesTC (generated by priority logic 1500) selects DepCache[j] through MUX 2426. If the entry associated with DepCache[j] matches the newly calculated entry (i.e., entry 10 in this example), DepCache[j] is high thereby reading out any associated lock or use bit (i.e., bits 2440–2443) in array 2404. An identical circuit consisting of a MUX and two latches is coupled to every row in Matrix 2400 enabling the same operation to be carried out in parallel. The net result is a 16-bit word (i.e., mask) defined by the contents of array 2400 that identifies any lock or use bits set (i.e., a logic 1) for the associated cache set.

Alternatively, if the same entry is not undergoing both steps of the dependency checking operation at the same time (i.e., there may be a pending address for tag check operations—subject to a "retry access" request—at the time matrixes 2400 and 2450 are accessed), signal ACalcDoesTC selects combined read bit line 2428' (passing through latch 2430) with MUX 2426. Line 2428' enables the reading of certain dependency bits associated with the entry undergoing tag check operations. These bits are used to access lock and use bits in array 2404. The signal on combined read bit line 2428' (i.e., SameCacheSet[j]; which is identified on line 3036a in FIG. 30a) is enabled by TagEntryRd[j].

Figure 30A:
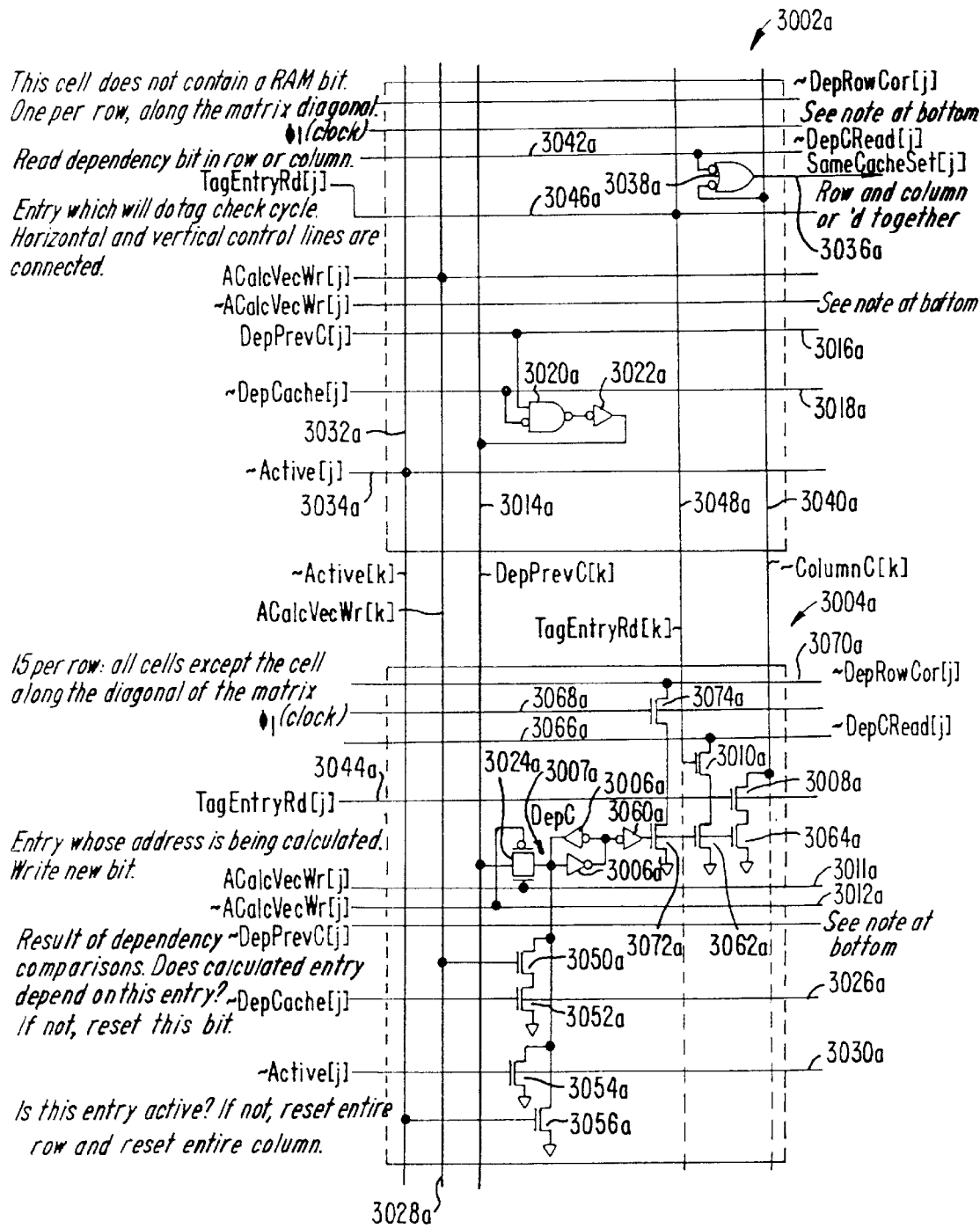
FIGS. 30a and 30b disclose dependency matrix logic cells of the matrixes of FIG. 24.

More specifically, an entry separately undergoing tag check operations enables signal TagEntrySel[j], which is gated by φ1 through NAND 2434 and passes through inverter 2436 thereby generating TagEntryRd[j] as shown in FIG. 24. (In the example of FIG. 24, the entry undergoing tag check operations is entry 3.) TagEntryRd[j] enables the dependency bits located on the jth row and kth column (where j=k) of matrix 2400 to be read out. The corresponding column signal (i.e., TagEntryRd[k]) is enabled through a simple electrical connection, as shown in FIG. 30a. (As the "j" designation indicates, a TagEntryRd[j] signal is available for each row (j) and corresponding column (k, where k=j) in matrix 2400.) Signal TagEntryRd[j] is generated by priority logic 1500 (FIG. 15).

Referring to FIG. 15 and Section II.C.4 above, address queue 308 prioritizes three sets of requests: freeload, retry access and address calculate. As discussed above, these three sets are combined and prioritized. Accordingly, if a "retry access" request is granted for a particular entry in address queue 308, priority logic 1500 generates a 16-bit mask with a single set bit (logic 1) identifying the single entry whose operation (Load, for example) is being retried (i.e., TagEntrySel[j]) and fifteen reset bits (logic 0) associated with remaining entries whose operations are not being retried.

Referring to FIG. 24, read bit line 2428 combines with TagEntryRd[j] and [k]0 to select dependency bits stored at bit locations 2444 (row 3, col. 7) and 2445 (row 7, col. 3). These values are complemented, ORed together (generating SameCacheSet[j]) and output to array 2404 (through MUX 2426) on combined read bit line 2428'. The value on line 2428' enables the reading of any lock or use bits that may be set if location 2444 or 2445 holds a set bit (i.e., logic 1). An identical operation is carried out for entries 0 through 2 and 4 through 15. Implementing logic and circuitry are shown in FIGS. 30a and 30c.

The net effect of this operation is to produce a 16-bit word consisting of all dependency bits on row j and column k (i.e., row and column 3 in this example) ORed together in a bit-wise fashion (i.e., 16 SameCacheSet[j] values). This word is then used to read out values from array 2404 that correspond to the associated cache set.

A TagEntryWrite[j] signal (not shown) is used to set corresponding lock and use bits in array 2404 one clock cycle after the associated TagEntryRd[j] signal. Using the same logic and circuitry of the TagEntryRd[j] signal, a TagEntryWrite signal updates state bits in array 2404 based on the results of the tag checking operation.

In addition to the foregoing, FIG. 24 discloses signals DepRowC[j] and DepRowS[j] which are output from OR gates 2438 and 2452, respectively. These signals represent the ORed value of all dependency bits in an associated row. An identical circuit is coupled to each row in matrix 2400 and 2450. These signals are used to identify any dependencies of a particular entry and inhibit the associated cache operation. In matrix 2400, each DepRowC[j] signal is used in combination with the lock and use bits to identify allowable operations.

The relationship between DepRowC[j] signals and corresponding lock bits of array 2404 is illustrated in Table 8. This table identifies allowable operations (i.e., refilling or hitting a way of a cache) based on associated DepRowC[j] and lock bit values.

TABLE 8

Allowable Operations Based on Lock Bits and DepRowC[j]

| DepRowC[j] | Lock A | Lock B | Refill A? | Refill B? | Hit A? | Hit B? |
| --- | --- | --- | --- | --- | --- | --- |
| 1 | 0 | 0 | Yes | Yes | Yes | Yes |
|  | 1 | 0 | No | No | Yes | No |
|  | 0 | 1 | No | No | No | Yes |
| 0 | 0 | 0 | Yes | Yes | Yes | Yes |
|  | 1 | 0 | No | Yes | Yes | Yes |
|  | 0 | 1 | Yes | No | Yes | Yes |

Referring to Table 8, if a queue entry has a dependency and either way 0 or way 1 (i.e., side A or side B, respectively) of the associated cache set is locked, then refills are inhibited on both ways of the set and hits are allowed only on the locked way. Conversely, if a queue entry has no dependency (for example, the oldest instruction pending in the queue associated with the subject cache set), and either way 0 or way 1 is locked, then refills are inhibited only on the locked way and hits are allowed on both ways.

The use bit for either way is set when an instruction with no dependencies (i.e., DepRowC[j]=0) hits or refills an unlocked block. This represents "sequential" or "in-order" operation, as discussed above. The use bit remains set until the associated instruction graduates, thereby preventing another instruction from refilling or hitting this block.

In matrix 2450, each DepRowS[j] signal is used to identify load operations with dependencies. In those situations where a load instruction is dependent on another entry (i.e., DepRowS[j]=1), that load instruction is aborted since the data it seeks to load may be invalid.

During processor operation, matrix 2450 is checked only when attempting to perform a load instruction. Store instructions are not performed until they are the oldest instruction in the queue. Hence, there is no need to check the corresponding entry (i.e., row) in matrix 2450 since it will contain all zeroes.

As noted above, matrixes 2400 and 2450 are identical except for the logic equations defining how bits are set. Further, matrix 2450 is not coupled to lock/use matrix 2404 nor are TagEntryRd[j] signals applied to its entries. Aside from these differences, the foregoing discussion related to matrix 2400 applies equally to matrix 2450. In particular, signals ~DepBytes[j], DepPrevS[j], ACalcVecWr[j] and ~ACalcVecWr[j] interact with matrix 2450 in the same manner as signals ~DepCache[j], DepPrevC[j], ACalcVecWr[j] and ~ACalcVecWr[j] interact with matrix 2400.

1. Comparators

Figure 27:
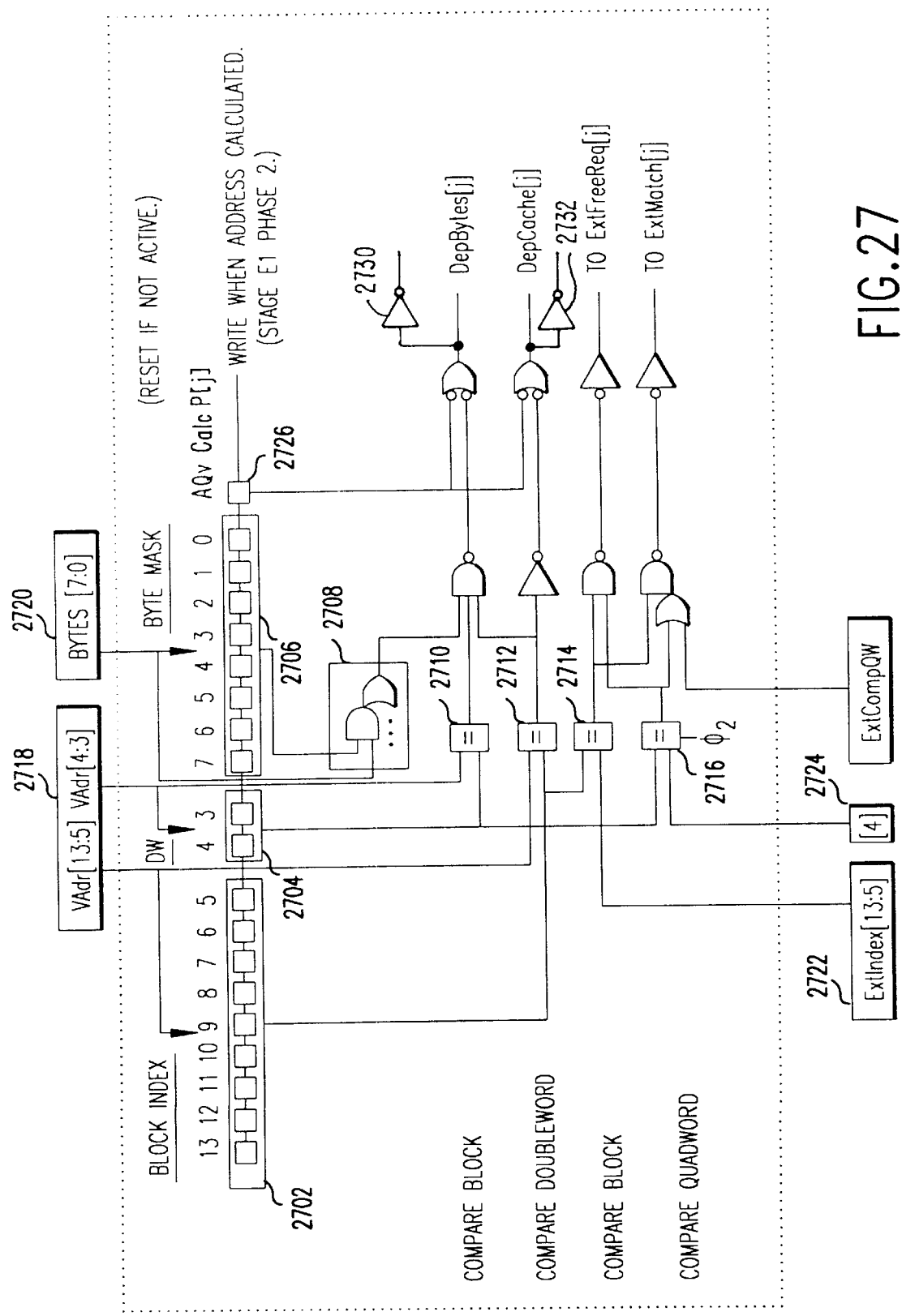
FIG. 27 discloses dependency comparator logic of the address queue.

A logic block diagram of each comparator in comparator set 2406 of FIG. 24 is provided in FIG. 22. An alternative embodiment of at least a portion of the circuit shown in FIG. 22 is provided in the comparator circuit of FIG. 27. The basic architecture of the circuits in FIGS. 22 and 27 are analogous, including many of the same signals and equivalent portions of circuitry. (Identical signals and circuits on these drawings are identified with identical signal names and reference numbers, respectively.) A significant different between these two architectures, however, is the presence of AND gates 2734 and 2736 in FIG. 22. FIG. 27 has no equivalent circuitry. These gates, as described below, enable the generation of signals DepPrevS[j] and DepPrevC[j], which function as masks 2501a and 2501b, respectively, when used in conjunction with matrixes 2450 and 2400 (FIG. 24).

Referring to FIGS. 22 and 27, each comparator-in set 2406 (FIG. 24) holds set index bits 2702, doubleword bits 2704 and byte mask value 2706 for the corresponding entry (the "saved entry"). These values were loaded at the time this entry was newly calculated. Each comparator also includes an AQvCalcP[j] signal 2726 whose value is determined by the presence of address information (i.e., index bits, doubleword bits and byte mask).

Should no value (i.e., address) be calculated for a particular entry (i.e., the particular comparator is inactive), the associated AQvCalcP[j] signal 2726 will be reset (logic 0) thereby setting signals Depcache[j] and DepBytes[j] high (i.e., logic 1). This facilitates a presumption of dependency for those entries whose addresses are not yet calculated, as described above in connection with FIGS. 25a and 25b. Once an entry has been calculated, the AQvCalcP[j] signal is set (i.e., logic 1), allowing comparators 2708, 2710 and 2712 to determine the value of DepCache[j] and DepBytes[j].

The AQvCalcP[j] signal is the same as the "AQvCalc" signal described in Table 3, except AQvCalcP[j] is valid one cycle earlier (i.e., in cycle E1).

Returning to FIGS. 22 and 27, AND/OR gate 2708 and comparators 2710–2716 enable the comparison of previously loaded values 2702, 2704 and 2706 with a newly calculated virtual address 2718, an associated byte mask 2720 and addresses from the external interface 2722.

The newly calculated address 2718 and external interface address 2722 each compare set address bits 13:5 with index address 2702 using comparators 2712 and 2714, respectively. The calculated address 2718 also compares the doubleword within a cache block (bits 4:3) using comparator 2710 and checks for byte overlap (derived from the operation type and bits 2:0, as discussed above) using AND/OR gate 2708. Bit 4 of the external address 2724 is compared using comparator 2716 to match quadwords during cache refill. The ExtCompQW signal is used to enable or disable a quadword comparison.

The comparison results are logically combined, as shown in FIG. 22. More specifically, OR gate 2238 receives the output of comparator 2712 and a complemented AQvCalcP[j] 2226 signal, and outputs a DepCache[j] signal. AND gate 2240 receives the output of AND/OR gate 2708 and comparators 2710 and 2712. Further, OR gate 2242 receives the output of AND gate 2240 and a complemented AQvCalcP[j] 2226 signal, and outputs a DepBytes[j] signal. Equivalent logic is illustrated in FIG. 27.

During comparison operations, signal DepBytes[j] is high when comparators 2708, 2710 and 2712 all identify matches—thereby indicating matching VAdr[13:3] and byte overlap. This signal is inverted by inverter 2730 (i.e., producing ~DepBytes[j]) before being forwarded to matrix 2450 (FIG. 24).

As mentioned above, the comparator of FIG. 22 also generates DepPrevS[j]. Specifically, at about the same time that inverter 2730 generates ~DepBytes[j], signal DepBytes[j] is combined with signals AQvstore[j] and AQvPrev[j] in AND gate 2734, generating DepPrevS[j] (i.e., mask 2501a). Signals AQvStore[j] and AQvPrev[j] are generated outside the comparator of FIG. 22. AQvStore[j] is high when the saved entry is associated with a store instruction. This signal is generated by decoding logic. Referring to FIG. 7, when an instruction is loaded into address queue 308, a portion of the instruction (e.g., function code) is decoded in decoder 505. As a result of this decoding operation, an "AQvStore" bit (held in the address queue) is set if the associated instruction is a store (see Table 1). An AQvstore bit is stored in address queue 308 for each queue entry, thereby enabling the queue to track which entries are store instructions.

AQvPrev[j] is high when the saved entry is older than the newly calculated entry. This signal is derived from the active mask shown in FIG. 14 and generated from the logic shown in FIG. 13. Although the mask in FIG. 14 relies on the write pointer signal of the address queue (i.e., "WrPtr") to identify the newest instruction, for purposes of dependency operations, ACalcVec[j] identifies the most recent instruction in queue 308. Accordingly, any instruction falling between this entry and the read pointer signal of the address queue (i.e., "RdPtr") is an active instruction and therefore is associated with a high AQvPrev[j] signal. (See the discussion of WrPtr and RdPtr in Section C.3, above.)

If ~DepBytes[j] and DepPrevS[j] are low and high, respectively, then a store-to-load dependency based on common set, common doubleword and byte overlap is established, and the appropriate bit in matrix 2450 is set.

Referring again to FIGS. 22 and 27, DepCache[j] is high when comparator 2712 identifies a match—thereby indicating a matching VAdr[13:5]. This signal is inverted by inverter 2732 (i.e., producing ~DepCache[j]) before being forwarded to matrix 2400 (FIG. 24).

As mentioned above, the comparator of FIG. 22 also generates DepPrevC[j]. Specifically, at about the same time that inverter 2732 generates ~Depcache[j], signal DepCache[j] is combined with signal AQvPrev[j] in AND gate 2736 generating DepPrevC[j] (i.e., mask 2501b).

As noted above, AQvPrev[j] is high when the saved entry is older than the newly calculated entry. If ~DepCache[j] and DepPrevC[j] are low and high, respectively, then a cache-set dependency is established and the appropriate bit in matrix 2400 (FIG. 24) is set.

Figure 28:
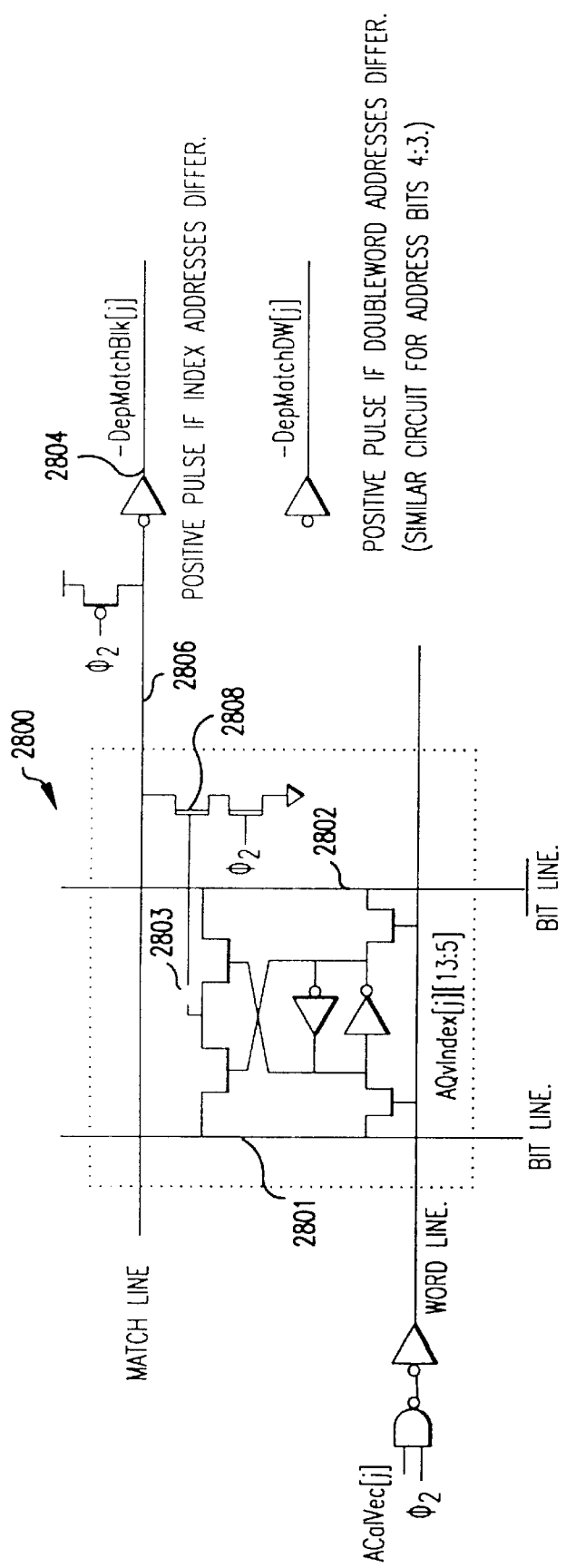
FIG. 28 discloses dependency comparator circuits of the address queue.

FIG. 28 shows the circuit implementation of the dependency comparators of FIGS. 22, 24 and 27. Each entry of comparator set 2406 in FIG. 24 (e.g. comparator 2408) has at least two comparators and an AND/OR gate used with newly calculated addresses as shown in FIGS. 22 and 27. The index comparator 2712 compares address bits 13:5 to determine if the new address selects the same cache set. The doubleword comparator 2710 compares address bits 4:3. The byte overlap circuit (i.e., 8-bit wide AND/OR gate 2708) determines if the new byte mask selects any of the same bytes.

The index comparator 2712 is constructed with nine conventional comparator circuits 2800 shown in FIG. 28. Signal ACalcVec[j] identifies the comparator circuit associated with the newly calculated entry. This entry is stored in the circuit when first calculated and functions as the index address for subsequent "new" addresses. These subsequent addresses are presented on bit lines 2801 and 2802, forcing line 2803 high if the new bit differs from the stored bit. If index address bits differ, a positive pulse coinciding with φ2 is presented on line 2804.

Similarly, the doubleword comparator 2710 is constructed with two conventional comparator circuits 2800 shown in FIG. 28.

Figure 29:
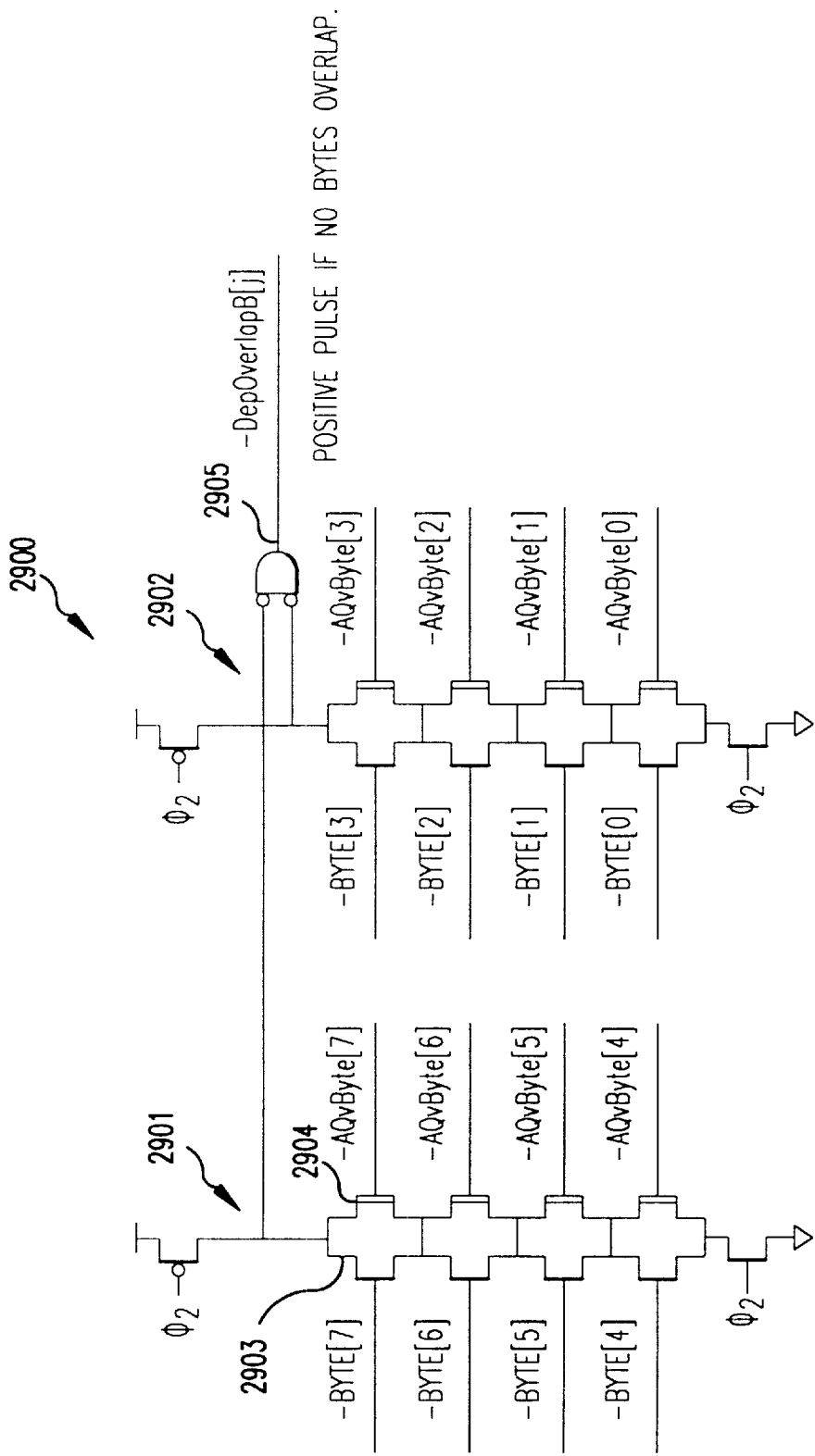
FIG. 29 discloses byte overlap circuit of the address queue.

Referring to FIG. 29, byte overlap circuit 2900 is constructed from stacks 2901 and 2902 of four transistors with complemented signals applied to their gates. Accordingly, a transistor is turned off only when an associated byte is present. If a pair of transistors are turned off (for example, transistors 2903 and 2904), line 2905 (i.e., ~DepOverlapB [j]) will remain low during φ2 thereby indicating an overlap (i.e., dependency). Byte overlap circuit 2900 is represented logically as AND/OR gate 2708 in FIGS. 22 and 27.

These circuits switch dynamically on the phase 2 clock edge. Their outputs are pulses which switch about 3 inverter delays later. So that these pulses can be gated together without generating glitches, each circuit generates a pulse if there is no dependency. Comparator 2800 generates a pulse if any address bit differs, using standard comparator circuits and a dynamic "OR" (i.e., all related comparators coupled to match line 2806 via transistor 2808). The byte overlap circuit 2900 generates a pulse if no bit is present in both masks. This requires an "AND" circuit. It is impractical to wire a stack of 8 bits in series, so the outputs of two parallel 4-high stacks are ANDed. (A parallel "OR" gate would be faster and simpler, but it would generate a pulse if the two masks overlap.)

2. Dependency and Diagonal Cells

FIG. 30*a* shows the logic within the two types of cells included in matrix 2400. These cell types are diagonal cell 3002*a* (one per row along the matrix diagonal) and dependency cell 3004*a* (15 per row at all locations except the matrix diagonal). Restated, diagonal cells are located at row j, column k, where j=k. In contrast, dependency cells are located at row j and column k, where j≠k. Each dependency cell 3004*a* stores one bit in a RAM cell using cross-coupled inverters 3006*a* and 3006*a*'. This bit is written from the comparator outputs (DepPrevC[j] and ~DepCache[j]) when the address is calculated. Bits can be reset when other addresses are calculated later, if it determines that there is no dependency (using signals ACalcVecWr[k] and ~DepCache[j]). Diagonal cells 3002*a* do not contain RAM cells, but they do connect horizontal and vertical control lines.

Referring to FIG. 30*a*, phase 1 of the processor clock (φ1) on line 3068*a* periodically enables the output of dependency cells 3004*a* in an associated row (this value is used every cycle E2). Specifically, φ1 outputs a complemented value of the bit held at node 3007*a* to line 3070*a* every half cycle. (The method for reading this value out using φ1 and transistors 3072*a* and 3074*a* is the same as described below using TagEntryRd[j] and transistors 3064*a* and 3008*a*.) This complemented value is logically ORed with all other values on row j, producing a ~DepRowCor[j] signal. This signal passes through an inverter and latch (not shown) to become a DepRowC[j] signal, shown in FIG. 24.

As shown in FIG. 30*a*, signals TagEntryRd[k] on line 3048*a* and TagEntryRd[j] on line 3044*a* enable the output of dependency cells in the associated row and column, respectively. These signals output a complemented column dependency bit value (i.e., ~ColumnC[k]) through transistor 3008*a*, and a complemented row dependency bit value (i.e., ~DepCRead[j]) through transistor 3010*a*. More specifically, a dependency bit value held at node 3007*a*, is forwarded through inverters 3006*a*' and 3060*a* and applied to the gates of transistors 3062*a* and 3064*a*. If the dependency bit value is high, transistors 3062*a* and 3064*a* conduct thereby coupling transistors 3010*a* and 3008*a*, respectively, to ground. Accordingly, when transistors 3010*a* and 3008*a* conduct, lines 3066*a* (~DepCRead[j]) and 3040*a* (~ColumnC[k]) are low.

Conversely, if the dependency bit value is low, transistors 3062*a* and 3064*a* do not conduct thereby decoupling transistor 3010*a* and 3008*a*, respectively, from ground. Accordingly, when transistors 3010*a* and 3008*a* conduct, lines 3066*a* (~DepCRead[j]) and 3040*a* (~ColumnC[k]) remain high. (At the beginning of a processor clock cycle, read bit lines such as 3066*a* and 3040*a* are charged high. These lines are charged periodically and therefore remain high unless pulled low (i.e., such as when transistors 3010*a* and 3062*a* conduct, and/or when transistors 3008*a* and 3064*a* conduct). This technique is called "dynamic logic," and is well known in the art.)

The use of TagEntryRd[j] and [k] to read out values in associated row and column cells is more clearly illustrated in FIG. 30*c*.

FIG. 30*c* shows a portion of dependency matrix 2400, including dependency cells 3004*c*', 3004*c*41 and diagonal cells 3002*c*' and 3002*c*". The internal circuitry of dependency cells 3004*c*' and 3004*c*" is identical to that of dependency cell 3004*a* in FIG. 30*a*. Similarly, the internal circuitry of diagonal cells 3002*c*' and 3002*c*" is identical to that of diagonal cell 3002*a* in FIG. 30*a*. For clarity, only a portion of the circuitry of dependency and diagonal cells in FIG. 30*c* is shown.

Referring to FIG. 30*c*, a TagEntryRd[j] signal on line 3046*c* and TagEntryRd[k] on line 3048*c* enables the output of bits stored in dependency cells 3004*c*" and 3004*c*'. Specifically, line 3046*c* enables transistor 3008*c* while line 3048*c* enables transistor 3010*c*. The complemented values of RAM cell 3006*c*" and 3006*c*' are conveyed to the complemented inputs of OR gate 3038*c*, which outputs a value on line 3036*c*. This output (i.e., line 3036*c*) is symbolically represented by combined read bit line 2428' in FIG. 24.

Returning to FIG. 30*a*, assuming dependency cell 3004*a* is in a row corresponding to a newly calculated entry, a bit (held by cross-coupled inverters 3006*a* and 3006*a*'; i.e., a RAM cell) may be written by enabling signals ACalcVecWr [j] (on line 3011*a*), ~ACalcVecWr[j] (on line 3012*a*), and data signal DepPrevC[k] (on line 3014*a*). As discussed above, ACalcVec[j] identifies a newly calculated entry. DepPrevC[k] is a product of DepPrevc[j] on line 3016*a* (which indicates whether an entry is previous to the newly-calculated entry; i.e., mask 2501*b* of FIG. 25*b*) and ~DepCache[j] on line 3018*a* (which indicates whether there is a cache index match (i.e., VAdr[13:5]) with the newly-calculated entry). Signal ~DepCache[j] is inverted, and then combined with DepPrevC[j] in NAND 3020*a*. The output of this NAND gate is inverted by inverter 3022*a*, generating a signal that is input to transistors 3024*a*, which feed the signal to inverters 3006*a* and 3006*a*'. In short, the DepC bit (maintained by inverters 3006*a* and 3006*a*' at node 3007*a*) is set when DepPrevC[j] is high and ~DepCache[j] is low.

Alternatively, assuming dependency cell 3004*a* is in a row corresponding to a previously calculated entry, and this cell was previously set based on an earlier entry whose address had not yet been calculated (as discussed above), this bit may be reset (if there is no dependency) using ~DepCache[j] on line 3026*a* and ACalcVecWr[k] (on line 3028*a*) generated from the now-calculated earlier entry. If no dependency exists, lines 3026*a* and 3028*a* will be high, coupling the DepC bit to ground through transistors 3050*a* and 3052*a*.

Also shown in FIG. 30*a* is signal ~Active[j] on line 3030*a* which resets an entire row if entry [j] is not active by coupling each DepC bit on a particular row to ground through an associated transistor 3054*a*. This signal is derived from the active mask illustrated in FIG. 14, which distinguishes between entries in the address queue that are active and inactive. Accordingly, inactive entries may be identified and cleared. Similarly, signal ~Active[k] on line 3032*a*, generated from ~Active[j] on line 3034*a*, resets an entire column if an entry is not active. Specifically, ~Active [k] on line 3032*a* couples each DepC bit on a particular column to ground through an associated transistor 3056*a*. Signal ~Active[k] is used in such situations as initializing a matrix or clearing an entry after the associated instruction graduates or aborts.

Also shown is OR signal 3036*a* which represents row and column output values ORed together through OR gate 3038*a* (i.e., signal SameCacheSet[j]). This signal is symbolically represented as combined read bit line 2428' in FIG. 24.

Figure 30B:
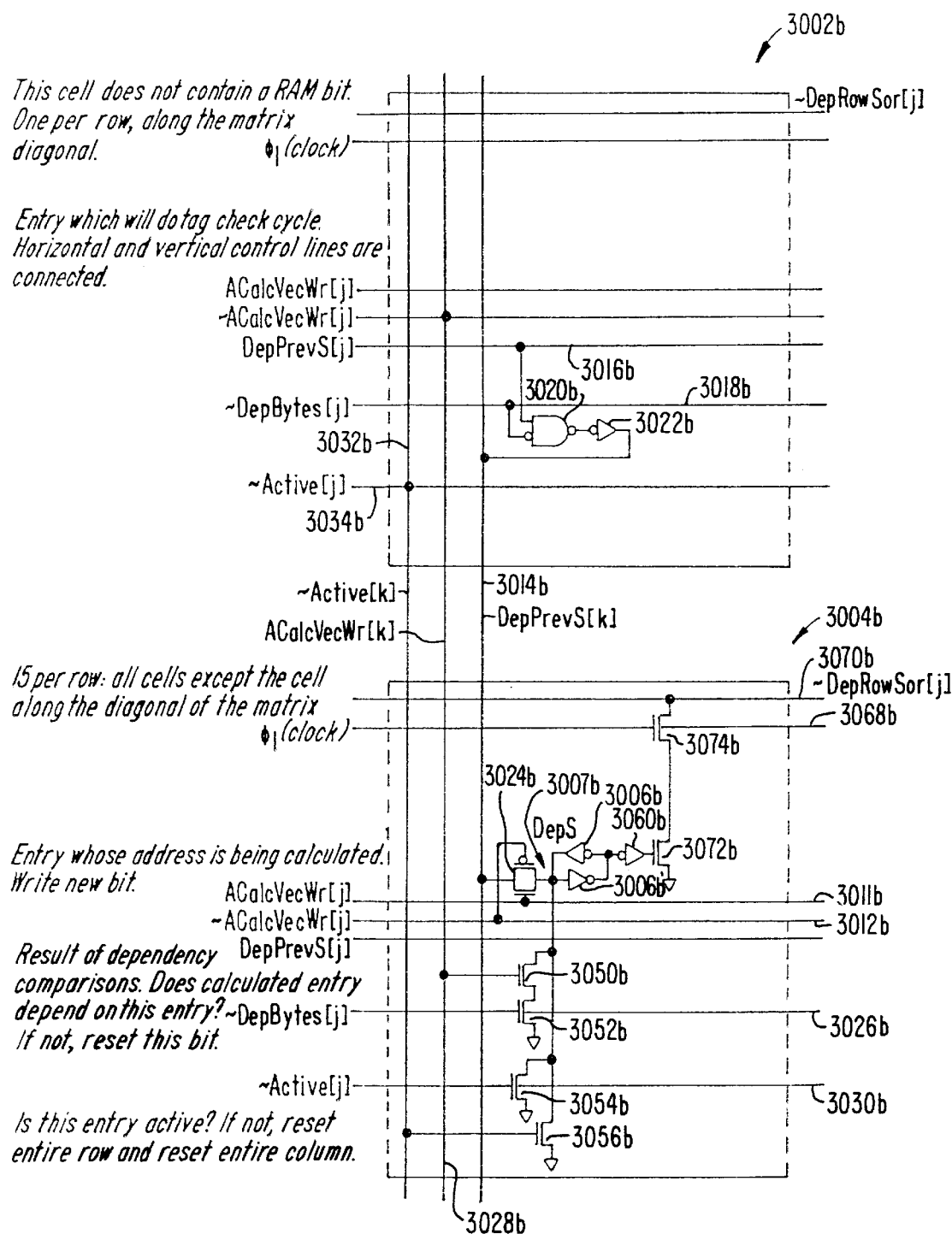
Figure 30C:
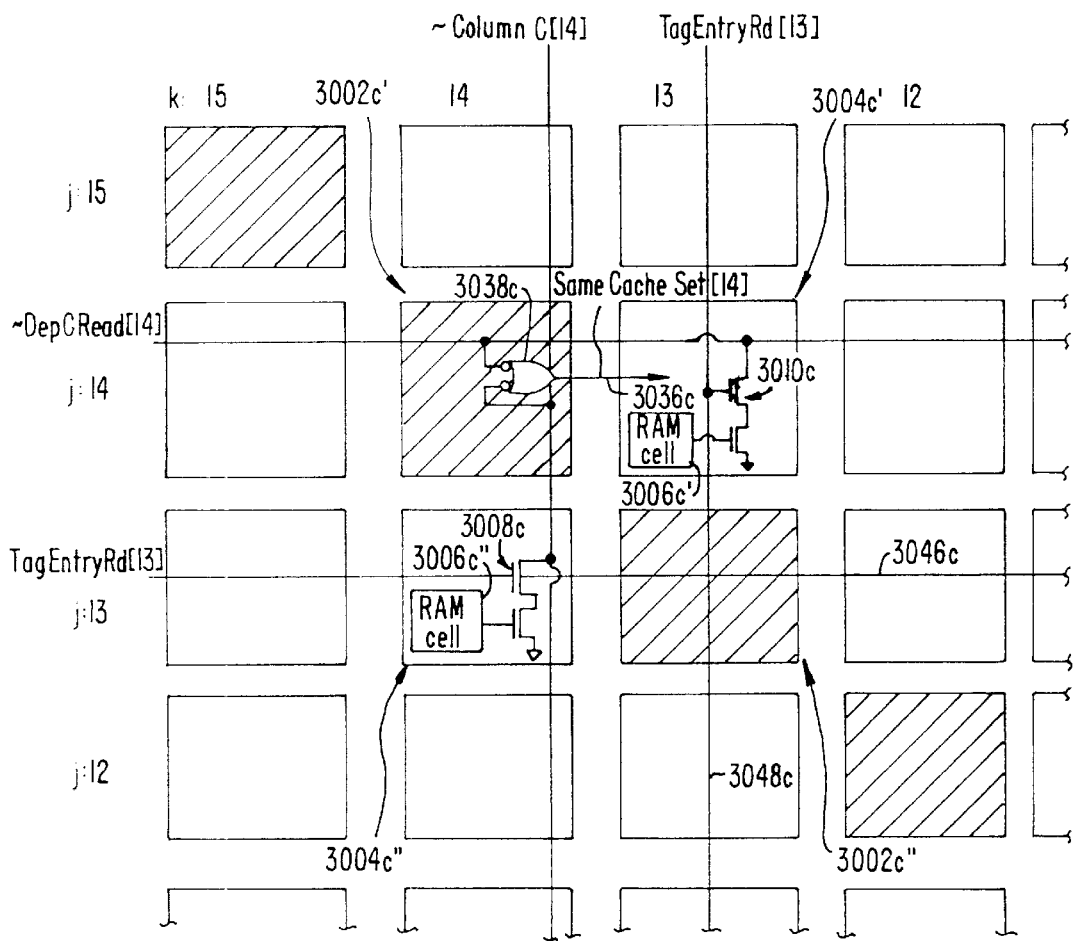
FIG. 30c shows a portion of dependency matrix 2400.

FIG. 30b shows the logic within the two types of cells included in matrix 2450. (As is apparent from FIGS. 30a and 30b, the circuitry present in the cells of matrix 2450 is identical to the corresponding circuitry in matrix 2400.) These cell types are diagonal cell 3002b (one per row along the matrix diagonal) and dependency cell 3004b (15 per row at all locations except the matrix diagonal). Restated, diagonal cells are located at row j, column k, where j=k. In contrast, dependency cells are located at row j and column k, where j≠k. Each dependency cell 3004b stores one bit in a RAM cell using cross-coupled inverters 3006b and 3006b'. This bit is written from the comparator outputs (DepPrevS[j] and ~DepBytes[j]) when the address is calculated. Bits can be reset when other addresses are calculated later, if it determines that there is no dependency (using signals ACalcVecWr[k] and ~DepBytes[j]). Diagonal cells 3002b do not contain RAM cells, but they do connect horizontal and vertical control lines.

Referring to FIG. 30b, phase 1 of the processor clock (φ1) on line 3068b periodically enables the output of dependency cells 3004b in an associated row (this value is used every cycle E2). Specifically, a dependency bit held at node 3007b is forwarded through inverter 3006b' and 3060b and applied to the gate of transistor 3072b. If the dependency bit value is high, transistor 3072b conducts thereby coupling transistor 3074b to ground. Accordingly, when transistor 3074b conducts (i.e., when φ1 is high), line 3070b (~DepRowCor [j]) is low.

Conversely, if the dependency bit value is low, transistor 3072b does not conduct and line 3070b remains decoupled from ground even when φ1 is high. Line 3070b (like lines 3070a, 3066a, and 3040a in cells 3004a) is periodically charged in accordance with the well-known technique of dynamic logic. Accordingly, decoupling line 3070b from ground thereby enables it to remain high.

In summary, φ1 outputs a complemented value of the bit held at node 3007b to line 3070b every half cycle. This complemented value is logically ORed with all other values on row j, producing a ~DepRowSor[j] signal. This signal passes through an inverter and latch (not shown) to become a DepRowS[j] signal, shown in FIG. 24.

Assuming dependency cell 3004b is in a row corresponding to a newly calculated entry, a bit (held by cross-coupled inverters 3006b and 3006b' at note 3007b i.e., a RAM cell) may be written by enabling signals ACalcVecWr[j] (on line 3011b), ~ACalcVecWr[j] (on line 3012b), and data signal DepPrevS[k] (on line 3014b). As discussed above, ACalcVec[j] identifies a newly calculated entry. DepPrevS [k] is a product of DepPrevS[j] on line 3016b (which indicates whether an entry is a store instruction and previous to the entry being calculated i.e., the mask 2501a of FIG. 25a) and ~DepBytes[j] on line 3018b (which indicates whether there is a cache index and doubleword match and byte overlap with the newly-calculated entry). Signal ~DepBytes[j] is inverted, and then combined with DepPrevS [j] in NAND 3020b. The output of this NAND gate is inverted by inverter 3022b, generating a signal that is input to transistors 3024b, which feed the signal to inverters 3006b and 3006b'. In short, the DepS bit (maintained by inverters 3006b and 3006b' at node 3007b) is set when DepPrevS[j] is high and ~DepBytes[j] is low.

Alternatively, assuming dependency cell 3004b is in a row corresponding to a previously calculated entry, and this cell was previously set based on an earlier entry that had not yet been calculated (as discussed above), this bit may be reset (if there is no dependency) using ~DepBytes[j] on line 3026b and ACalcVecWr[k] (on line 3028b) generated from the now-calculated earlier entry. If no dependency exists, lines 3026b and 3028a will be high, coupling the DepS bit to ground through transistors 3050b and 3052b.

ACalcVecWr[j], ~ACalcVecWr[j] and ACalcVecWr[k] are identified on different lines in FIG. 30a (i.e., lines 3011a, 3012a and 3028a, respectively) and FIG. 30b (i.e., lines 3011b, 3012b and 3028b, respectively) for purposes of discussion at the individual cell level. However, as shown in FIG. 24, the same signals lines convey these signals to matrix 2400 and 2450.

Also shown in FIG. 30b is signal ~Active[j] on line 3030b which resets an entire row if entry [j] is not active by coupling each DepS bit on a particular row to ground through an associated transistor 3054b. This signal is derived from the active mask illustrated in FIG. 14, which distinguishes between entries in the address queue that are active and inactive. Accordingly, inactive signals may be identified and cleared. Similarly, signal ~Active[k] on line 3032b, generated from ~Active[j] on line 3034b, resets an entire column if an entry is not active. Specifically, ~Active [k] on line 3032b couple each DepS bit on a particular column to ground through an associated transistor 3056b. Signal ~Active[k] is used in such situations as initializing a matrix or clearing an entry after the associated instruction graduates or aborts.

C. Dependency Logic—Alternative Embodiment

Figure 31:
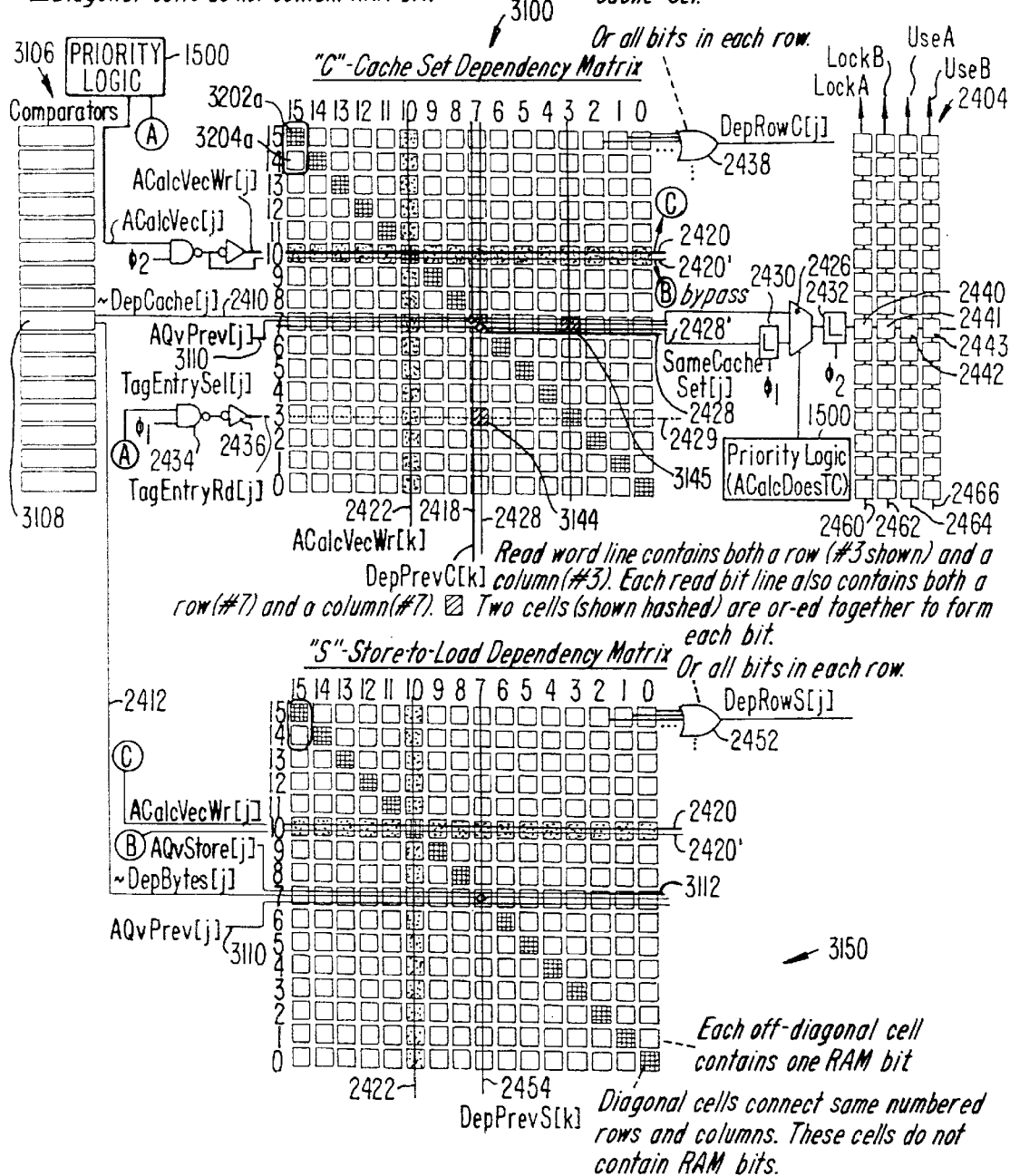
FIG. 31 discloses an alternative embodiment of dependency matrixes in the address queue.

FIG. 31 illustrates an alternative embodiment of the dependency matrix system shown in FIG. 24. The systems of FIG. 24 and FIG. 31 are identical except for the logic used to generate masks 2501a and 2501b (FIGS. 25a and 25b).

As shown in FIG. 24, comparator 2408 forwards signals ~DepCache[j] and DepPrevC[j] to matrix 2400, and signals ~DepBytes[j] and DepPrevS[j] to matrix 2450. The logic used to generate these signals (in comparator 2408) is illustrated in FIG. 22. Referring to FIG. 22, DepPrevC[j] is constructed from signals DepCache[j] and AQvPrev[j] combined in AND gate 2736. Similarly, DepPrevS[j] is constructed from signals DepBytes[j], AQvPrev[j] and AQvStore[j] combined in AND gate 2734. As discussed above, signal DepPrevC[j] functions as mask 2501b while signal DepPrevs[j] functions as mask 2501a.

Within cache-set matrix 2400, DepPrevC[j] is combined with ~DepCache[j] to generate DepPrevC[k], as shown in FIG. 30a. DepPrevC[k] is used to set a DepC bit at node 3007a. Within store matrix 2450, DepPrevs[j] is combined with ~DepBytes[j] to generate DepPrevS[k], as shown in FIG. 30b. DepPrevS[k] is used to set a Deps bit at node 3007b.

Like the system of FIG. 24, the system of FIG. 31 also uses comparators to generate and forward signal ~DepCache [j] and ~DepBytes[j] to a cache-set matrix (i.e., 3100) and a store matrix (i.e., 3150), respectively. Comparators 3106 in FIG. 31 may use the logic disclosed in FIGS. 22 or 27 to generate these signals. However, unlike the system of FIG. 24, the system of FIG. 31 forwards signals AQvPrev[j] and AQvStore[j] directly to the dependency matrixes. (AQvStore, as discussed above, is generated from a decoder in address queue 308 at the time the associated instruction is loaded into the queue. AQvPrev, also discussed above, is generated from priority logic in queue 308 which tracks active instructions.)

Referring to FIG. 31, AQvPrev[j] is forwarded to cache-set matrix 3100 and store matrix 3150 via line 3110, and AQvstore[j] is forwarded to matrix 3150 via line 3112. This configuration (i.e., forwarding AQvStore[j] and AQvPrev[j] directly to dependency matrixes) represents the preferred embodiment of the invention.

Figure 32A:
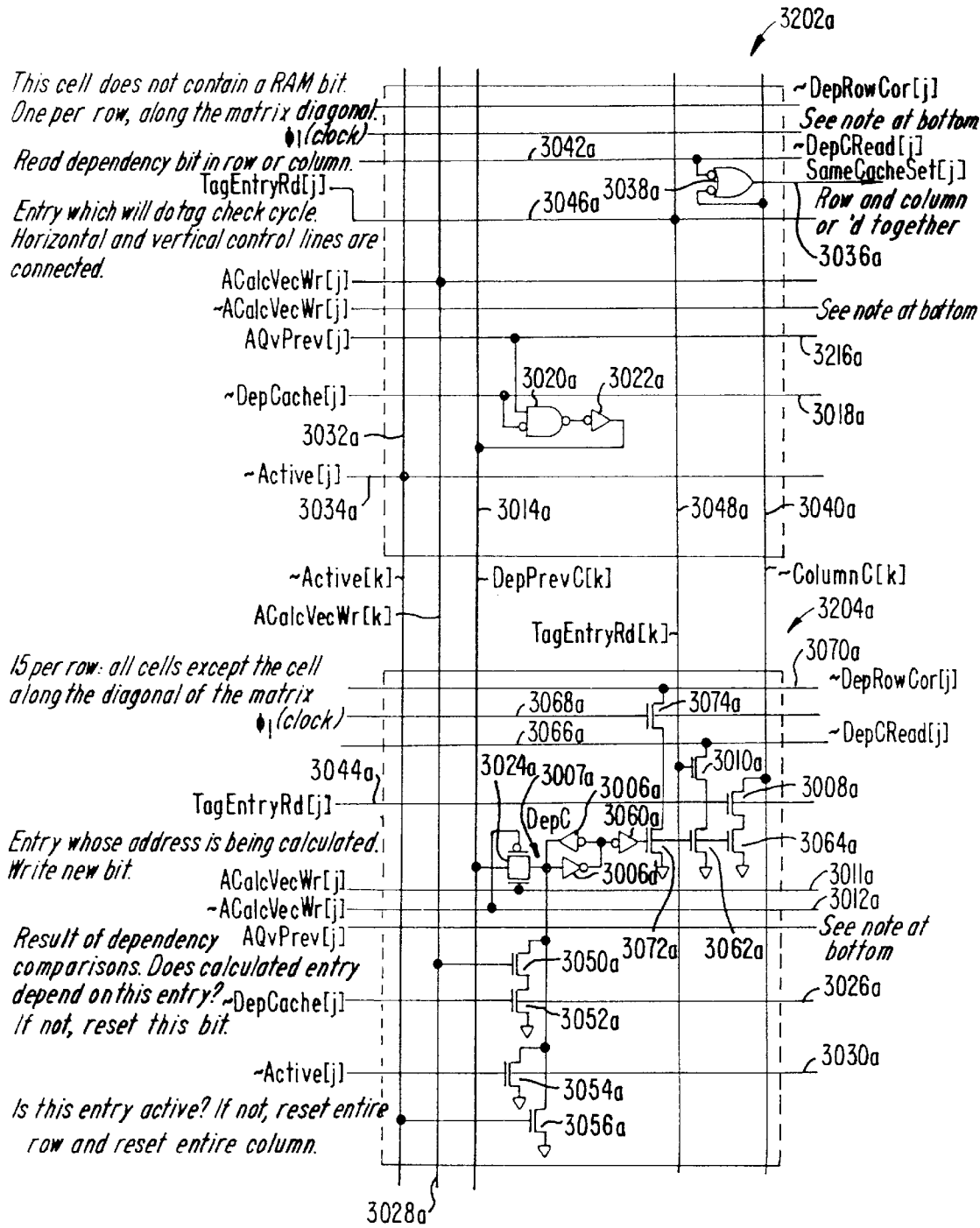
FIGS. 32a and 32b disclose dependency matrix logic cells of the matrixes of FIG. 31.

FIG. 32a shows the logic within the two types of cells included in matrix 3100. These cell types are diagonal cell 3202a (one per row) and dependency cell 3204a (15 per row). The architecture and operation of cell 3202a is the same as 3002a (FIG. 30a) except for the use of signal AQvPrev[j] on line 3216a. In short, cell 3202a receives signal AQvPrev[j] rather than DepPrevC[j] to generate mask 2501b (i.e., DepPrevC[k]). In contrast, cell 3002a receives a previously-calculated mask value (i.e., DepPrevC[j]) and simply gates this value with, a constituent element (i.e., DepCache[j]) in NAND gate 3020a. Referring to FIG. 32a, DepC#bit at node 3007a is set when AQvPrev[j] is high and ~DepCache[j] is low.

Similarly, the architecture and operation of cell 3204a is the same as 3004a (FIG. 30a) except AQvPrev[j] (rather than DepPrevC[j]) passes through the cell.

Figure 32B:
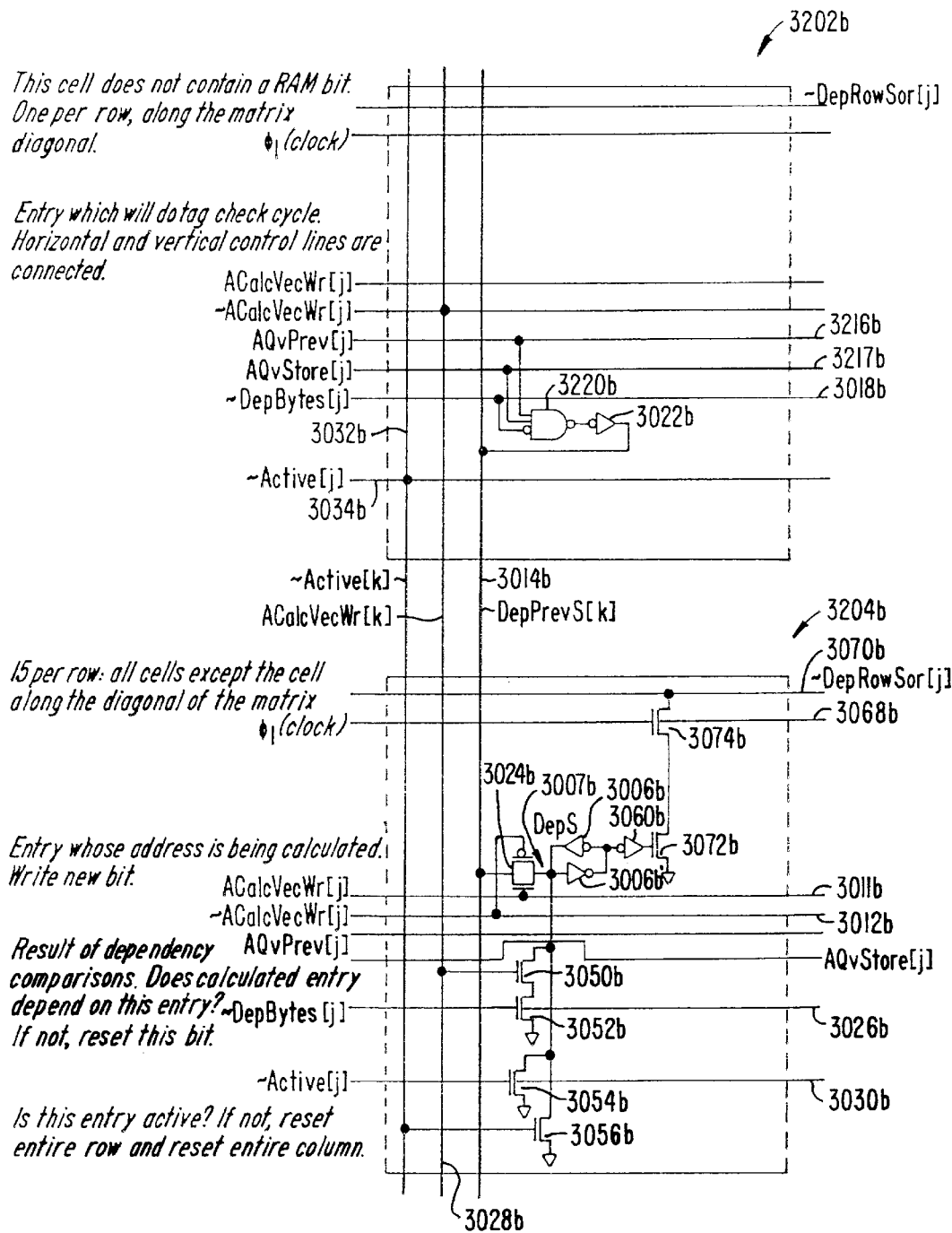

FIG. 32b shows the logic within the two types of cells included in matrix 3150. These cell types are diagonal cell 3202b (one per row) and dependency cell 3204b (15 per row). The architecture and operation of cell 3202b is the same as 3002b except for the use of signals AQvPrev[j] on line 3216b, AQvStore[j] on line 3217b and three-input NAND gate 3220b (having a complemented input for line 3018b). In short, cell 3202b receives signals AQvPrev[j] and AQvStore[j] rather than DepPrevS[j] to generate mask 2501a (i.e., DepPrevS[k]). In contrast, cell 3002b receives a previously calculated mask value (i.e., DepPrevS[j]) and simply gates this value with a constituent element (i.e., DepBytes[j]) in NAND gate 3020b. Referring to FIG. 32b, DepS bit at node 3007b is set when AQvPrev[j] and AQvStore[j] are high, and ~DepBytes[j] is low.

Similarly, the architecture and operation of cell 3204b is the same as 3004b (FIG. 30b) except AQvPrev[j] and AQvStore[j] (rather than DepPrevS[j]) pass through the cell.

Aside from the differences highlighted above, the operation and architecture of cache-set matrix 3100 and store matrix 3150 (FIG. 31) is identical to cache-set matrix 2400 and store matrix 2450 (FIG. 24), respectively. Accordingly, except for the direct use of signals AQvstore[j] and AQvPrev[j] by matrixes 3100 and 3150, the discussion presented herein related to the architecture and operation of matrixes 2400 and 2450 applies equally to matrixes 3100 and 3150.

As mentioned above, the preferred embodiment of the invention combines the cache-set matrix and store matrix in a single array since many signals are shared. This applies to matrixes 2400 and 2450 as well as 3100 and 3150. The preferred embodiment also requires signals AQvStore[j] and AQvPrev[j] to be forwarded directly to the dependency matrixes. Both requirements are satisfied by combining cache-set matrix 3100 with store matrix 3150.

Figure 33A:
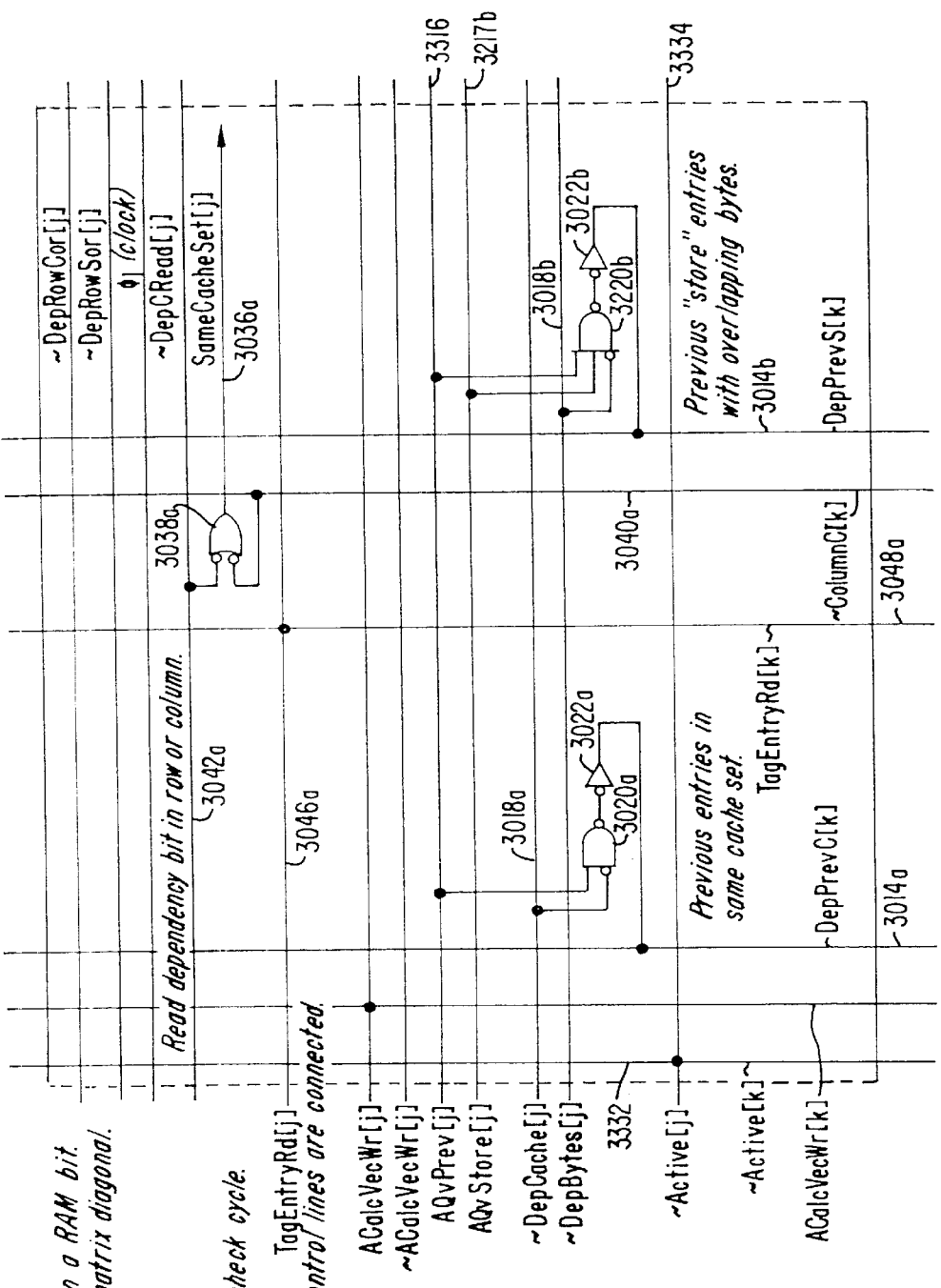

FIG. 33 shows the logic within the two types of cells included in a combined matrix of matrixes 3100 and 3150. These cell types are diagonal cell 3302 (one per row) and dependency cell 3304 (15 per row). The architecture and operation of cell 3302 is the same as cells 3202a (FIG. 32a) and 3202b (FIG. 32b). Similarly, the architecture and operation of cell 3304 is the same as cells 3204a and 3204b. Only the layout in each cell-type is changed. Moreover, FIG. 33 expressly shows the shared use of common control signals (e.g., AQvPrev[j] on line 3316, ACalcVecWr[j] on 3311, ~ACalcVecWr[j] on line 3312, ACalcVecWr[k] on line 3328, ~Active[j] on line 3334 and 3330, ~Active[k] on line 3332 and φ1 on line 3368). These signals are also shared in matrixes 3100 and 3150 (as well as 2400 and 2450—except for signal AQvPrev[j]), although different line numbers are used in the associated figures (i.e., 32a, 32b and 30a, 30b) for purposes of discussion.

Figure 34:
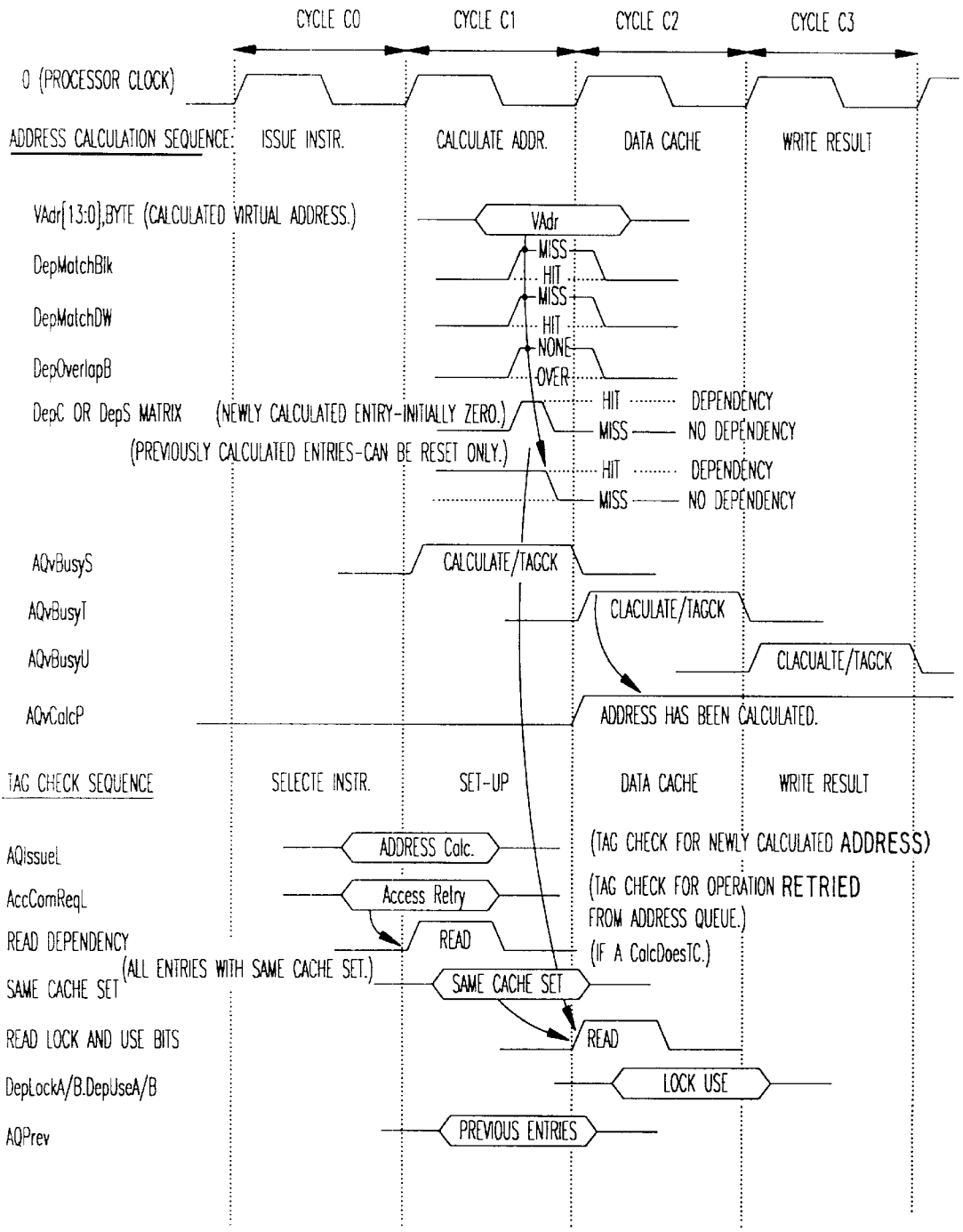
FIG. 34 is a dependency timing diagram.

FIG. 34 shows timing for the dependency circuits.

D. Uncached Memory Dependency

Load and store instructions to uncached memory addresses are executed strictly in program order.

Processor 100 does not check for dependencies between cached and uncached accesses. This is not an issue in unmapped regions, because the cached and uncached address regions are disjoint. For mapped regions, however, TLB 422 may select different cache attributes for the same page. Processor 100 does not prevent the programmer from alternatively accessing the same memory address as "cached" and "uncached." However, coherency is not guaranteed; the contents of the cache are not checked for any uncached address.

While the above is a complete description of the preferred embodiment of the invention, various modifications, alternatives and equivalents may be used. Therefore, the above description should not be taken as limiting the scope of the invention which is defined by the appended claims.

What is claimed is:

1. An address queue comprising:

a plurality of entries;

a comparator circuit, coupled to said plurality of entries, operable to compare information stored in a first entry derived from a first instruction with at least a portion of a virtual address derived from a second instruction, said comparator circuit generating a match signal when said information represents at least a portion of a stored address that matches said portion of said virtual address or said information represents an uncomputed address unavailable for comparison, and said comparator circuit generating a non-match signal when said information represents at least a portion of a stored address that does not match said portion of said virtual address;

a first fixed matrix of RAM cells coupled to said comparator circuit for identifying a first dependency relationship between said first and second instructions, said first matrix comprising a first row of RAM cells and a second row of RAM cells;

a match line coupling said comparator circuit to said first row of RAM cells, said match line being operable to carry said match signal and said non-match signal;

matching logic circuitry coupled to said match line, said logic circuitry using said match signal to set a first RAM cell to indicate a dependency when said first memory instruction precedes said second memory instruction in said address queue; and a resetting switch coupled to said match line and using said non-match signal to enable the resetting of a second RAM cell to indicate no dependency by said first instruction on said second instruction.

2. The address queue of claim 1 further comprising:

an array of status cells coupled to said first matrix of RAM cells, said array containing a plurality of rows of status cells, wherein a first row of status cells is coupled to said first row of RAM cells and a second row of status cells is coupled to said second row of RAM cells, said first row of status cells containing a first plurality of status bits for a first cache set; and wherein said match line couples said comparator circuit to said first row of status cells and enables reading of said first row of status cells when carrying said match signal.

3. The address queue of claim 1 further comprising a second fixed matrix of RAM cells coupled to said comparator circuit for identifying a second dependency relationship between said first and second instructions based in part upon instruction type.

4. The address queue of claim 2 further comprising a multiplexer disposed between said first matrix of RAM cells and said array of status cells, said multiplexer having an input coupled to said match line and an output coupled to said first plurality of status cells to read said plurality of bits.

5. The address queue of claim 3 wherein said first fixed matrix of RAM cells and said second fixed matrix of RAM cells are configured in a single array.

6. The address queue of claim 4 wherein said match line is selected by said multiplexer when a real address created from said virtual address is compared with a cache tag to identify a particular way in said first cache set at approximately the same time that said information is compared with said virtual address.

7. The address queue of claim 6 wherein said first row and said second row of RAM cells identify a first set of instructions which said first instruction is dependent upon and a second set of instructions which said second instruction is dependent upon, respectively, said first matrix further comprising:
   a third row of RAM cells identifying a third set of instructions which a third instruction is dependent upon;
   a first column of RAM cells identifying a fourth set of instructions which are dependent upon said third instruction;
   a fourth row of RAM cells identifying a fifth set of instructions which a fourth instruction is dependent upon;
   a second column of RAM cells identifying a sixth set of instructions which are dependent upon said fourth instruction;
   a read line coupled to each of said RAM cells in said third row of cells and said first column of cells enabling the output of bit values held in each RAM cell in said third row and each RAM cell in said first column; and
   a logic OR gate having a first input coupled to a first RAM cell in said third row and said second column, a second input coupled to a first RAM cell in said fourth row and said first column, and an output coupled to said multiplexer, said logic gate generating a logic signal based upon a certain dependency relationship by said third instruction upon a fourth instruction and by said fourth instruction upon said third instruction to indicate matching cache sets, said logic signal being used to read a fourth row of status cells residing in said array of status cells, said fourth row containing status bits for a second cache set.

8. A microprocessor comprising:
   an n-way, set associative cache;
   an adder coupled to said cache for calculating a plurality of virtual addresses from a plurality of memory instructions; and
   an address queue holding said plurality of memory instructions, said address queue comprising:
   a set of comparators for comparing pairs of said plurality of virtual addresses in parallel and generating a plurality of match signals to indicate matching portions of said virtual addresses that identify a particular cache set;
   a first fixed matrix of RAM cells, coupled to said set of comparators for indicating a first dependency relationship among plurality of memory instructions, said first matrix including a plurality of rows of RAM cells, each row including:
      a plurality of RAM cells that are operable to identify memory instructions which one of said plurality of memory instructions is dependent upon;
      a match line operable to transmit one of said plurality of match signals that indicates matching address portions between said one of said plurality of memory instructions and another memory instruction, said match signal operable to set at least one RAM cell of said matrix of RAM cells; and
   an array of memory status cells containing a plurality of rows of status cells representing status of each way in one or more sets of said cache, each row of status cells being coupled to a particular match line of one of said plurality of rows of RAM cells and capable of being read in parallel when said particular match line transmits said one of said plurality of match signals.

9. The microprocessor of claim 8 further comprising a second fixed matrix of RAM cells indicating a second dependency relationship among said plurality of memory instructions based upon portions of said plurality of virtual addresses, instruction order in said address queue, and memory instruction type.

10. The microprocessor of claim 8 wherein said array of memory status cells contains a plurality of columns of status cells, each of said plurality of columns being individually coupled in a logical OR circuit to generate a single set of status values based upon each row of cells being read, which represent a combined status of each way of said particular cache set.

11. The address queue of claim 8 wherein said match signal is generated before said one of said plurality of memory instructions and said another memory instruction are executed.

12. The microprocessor of claim 9 wherein said first dependency relationship is a cache-set dependency.

13. The microprocessor of claim 9 wherein said first fixed matrix of RAM cells and said second fixed matrix of RAM cells are configured in a single array.

14. The microprocessor of claim 12 wherein said second dependency relationship is a store-to-load dependency.

15. The microprocessor of claim 14 wherein each row of status cells in said array of memory status cells contains a pair of lock and use bits that record the status of each way in a cache set.

16. In a microprocessor, a method for processing memory instructions comprising the steps of:
   calculating a first virtual address from a first memory instruction and a second virtual address from a second memory instruction;
   generating a match signal when said first virtual address matches said second virtual address, said first and second virtual addresses identifying a common cache set;
   setting a first RAM cell in a first fixed matrix of RAM cells to indicate a first dependency relationship between said first memory instruction and said second memory instruction, said first dependency relationship being based upon said match signal and a relative order of said first and second memory instructions;
   determining a first real address for identifying a desired way of said common cache set based upon said first virtual address; and
   reading status bits of said common cache set using said match signal to determine accessibility of said desired way.

17. The method of claim 16 further comprising the step of setting a second RAM cell in said first matrix of RAM cells to indicate a preliminary first dependency relationship between said first memory instruction and an anticipated third memory instruction, said anticipated third memory instruction having an uncomputed third virtual address and previous in order to said first memory instruction.

18. The method of claim 16 wherein said status bits include a lock bit and a use bit.

19. The method of claim 17 further comprising the step of resetting said second RAM cell after computing said third virtual address and determining no dependency exists.

20. The method of claim 18 further comprising the step of setting a RAM cell in a second matrix of RAM cells to indicate a second dependency relationship between said first memory instruction and said second memory instruction, said second dependency relationship being based upon at least said match signal, a relative order of said first and second memory instructions and instruction type.

21. An address queue comprising:
   a plurality of entries;
   a comparator circuit, coupled to said plurality of entries, operable to compare first information stored in a first entry derived from a first instruction with second information derived from a second instruction, said comparator circuit generating a match signal when said first information matches said second information or said first information represents an uncomputed address, and said comparator circuit generating a non-match signal when said first information otherwise does not match said second information;
   a first fixed matrix of RAM cells coupled to said comparator circuit for identifying a first dependency relationship between said first and second instructions, said first matrix comprising a first row of RAM cells;
   a match line coupling said comparator circuit to said first row of RAM cells, said match line being operable to carry said match signal and said non-match signal;
   matching logic circuitry coupled to said match line, said logic circuitry using said match signal to set a first RAM cell to indicate a dependency when said first instruction precedes said second instruction in said address queue; and
   a resetting switch coupled to said match line and using said non-match signal to enable the resetting of a second RAM cell to indicate no dependency by said first instruction on said second instruction.

22. An address queue holding a plurality of instructions, said address queue comprising:
   a set of comparators for comparing addresses in parallel and generating a plurality of match signals based upon results of said comparing, each address being associated with one of said plurality of instructions;
   a first fixed matrix of RAM cells, coupled to said set of comparators, for indicating a first dependency relationship among said plurality of instructions, said first matrix including a plurality of rows of RAM cells, each row including:
      a plurality of RAM cells that are operable to identify at least one instruction which one of said plurality of instructions is dependent upon;
      a match line operable to transmit one of said plurality of match signals that indicates matching address information between said one of said plurality of instructions and another instruction, said match signal operable to set at least one RAM cell of said matrix of RAM cells; and
   an array of memory status cells containing a plurality of rows of status cells representing status of each way in one or more sets of a memory, each row of status cells being coupled to a particular match line of one of said plurality of rows of RAM cells and capable of being read in parallel when said particular match line transmits said one of said plurality of match signals.

* * * * *